(12) United States Patent
Beppu et al.

(10) Patent No.: US 10,703,575 B2
(45) Date of Patent: Jul. 7, 2020

(54) CONVEYANCE DEVICE

(71) Applicant: AZBIL CORPORATION, Chiyoda-ku (JP)

(72) Inventors: Hisashi Beppu, Chiyoda-ku (JP); Yoichi Okawa, Chiyoda-ku (JP); Shingo Masumoto, Chiyoda-ku (JP); Keiji Kanehara, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days.

(21) Appl. No.: 16/336,739

(22) PCT Filed: Sep. 26, 2016

(86) PCT No.: PCT/JP2016/078272
§ 371 (c)(1),
(2) Date: Mar. 26, 2019

(87) PCT Pub. No.: WO2018/055765
PCT Pub. Date: Mar. 29, 2018

(65) Prior Publication Data
US 2020/0055675 A1 Feb. 20, 2020

(51) Int. Cl.
*B65G 25/06* (2006.01)
*F26B 25/00* (2006.01)
(Continued)

(52) U.S. Cl.
CPC ............. *B65G 25/06* (2013.01); *B65G 25/10* (2013.01); *B65G 25/12* (2013.01); *F26B 25/003* (2013.01)

(58) Field of Classification Search
CPC ........ B65G 25/06; B65G 25/12; B65G 25/10; B65G 25/08; F26B 25/003
See application file for complete search history.

(56) References Cited

U.S. PATENT DOCUMENTS 3,385,419 A * 5/1968 Broser .................. B65G 25/10
198/751
3,827,549 A * 8/1974 Hunter .................. B65G 25/08
198/740
(Continued)

FOREIGN PATENT DOCUMENTS

JP 55-120609 U 8/1980
JP 61-166904 U 10/1986
(Continued)

OTHER PUBLICATIONS

International Search Report dated Dec. 13, 2016 in PCT/JP2016/078272 filed Sep. 26, 2016.

*Primary Examiner* — Mark A Deuble
(74) *Attorney, Agent, or Firm* — Oblon, McClelland, Maier & Neustadt, L.L.P.

(57) ABSTRACT

A conveyance device includes: moving members 3A and 3B that move along a table 7 for disposing an article 5 thereon; shafts 21A and 21B that are rotatably connected to the moving members 3A and 3B; a contact member 22 configured to come into contact with the article 5, the contact member 22 being connected to the shafts 21A and 21B; inhibiting mechanisms 23A and 23B that inhibit rotation of the shafts 21A and 21B so that the contact member 22 is held above the article 5, the inhibiting mechanisms 23A and 23B being disposed at the moving members 3A and 3B; and dogs 24A and 24B that come into contact, at a predetermined location with the inhibiting mechanisms 23A and 23B to deactivate inhibition of rotation of the shafts 21A and 21B by the inhibiting mechanisms 23A and 23B, thereby lowering the contact member 22 toward the table 7.

12 Claims, 95 Drawing Sheets

(51) Int. Cl.
*B65G 25/12* (2006.01)
*B65G 25/10* (2006.01)

(56) References Cited

U.S. PATENT DOCUMENTS

| | | | | |
|---|---|---|---|---|
| 4,600,099 | A * | 7/1986 | Peddinghaus | B23Q 7/001 198/468.6 |
| 5,042,392 | A * | 8/1991 | Brethorst | B61J 3/08 104/162 |
| 5,195,630 | A * | 3/1993 | Donovan | B65G 25/10 104/162 |
| 5,320,213 | A * | 6/1994 | McIntosh | B65G 25/10 198/468.9 |
| 7,695,230 | B2 * | 4/2010 | Selch | B65G 1/0435 34/236 |
| 2014/0231223 | A1 * | 8/2014 | Yokota | B23K 1/008 198/747 |

FOREIGN PATENT DOCUMENTS

| | | |
|---|---|---|
| JP | 8-198426 A | 8/1996 |
| WO | WO 2016/067872 A1 | 5/2016 |

* cited by examiner

CONVEYANCE DEVICE

TECHNICAL FIELD

The present invention relates to a conveying technology and relates, in particular, to a conveyance device.

BACKGROUND ART

For example, to convey out an article disposed inside a chamber, a conveyance device that includes a bar for pushing out the article is used. The conveyance device inserts the bar from the front of the chamber toward the back of the chamber and pushes the article to outside the chamber by using the bar (refer to, for example, PTL 1). During insertion of the bar toward the back of the chamber, the bar passes above the article. The bar is lowered at the back of the chamber to a height that enables the bar to come into contact with the article and push out the article. A driving mechanism that changes the height of the bar may include, for example, a rack-and-pinion or may include a servo motor.

CITATION LIST

Patent Literature

PTL 1: U.S. Pat. No. 7,695,230

SUMMARY OF INVENTION

Technical Problem

In the rack-and-pinion, however, dust may be generated due to abrasion that occurs at teeth of the rack. Moreover, grooves of the teeth of the rack are narrow, and thus, even when cleaning is performed, dirt remains easily due to poor drainage. Therefore, the rack-and-pinion is difficult in terms of maintenance. When a driving mechanism that changes the height of a bar includes a motor and a wire attached thereto, cleaning itself is difficult, and maintenance is also difficult. In addition, when the wire is broken, lifting and lowering of the bar is disabled.

Consequently, an object of the present invention is to provide a conveyance device that is easy in terms of maintenance.

Solution to Problem

An aspect of the present invention provides a conveyance device including: a moving member that moves along a table for disposing an article thereon; a shaft that is rotatably connected to the moving member; a contact member configured to come into contact with the article, the contact member being connected to the shaft; an inhibiting mechanism that inhibits rotation of the shaft so that the contact member is held above the article, the inhibiting mechanism being disposed at the moving member; and a dog that comes into contact, at a predetermined location, with the inhibiting mechanism to deactivate inhibition of the rotation of the shaft by the inhibiting mechanism, thereby lowering the contact member toward the table.

In the aforementioned conveyance device, the shaft for which the inhibition of the rotation by the inhibiting mechanism is deactivated may be rotated due to gravity applied to the shaft and to the contact member.

In the aforementioned conveyance device, the moving member may move between a first location and a second location, and the dog may deactivate the inhibiting mechanism when the moving member moves toward the first location. In this case, the dog may be fixed.

In the aforementioned conveyance device, the moving member may move between a first location and a second location, the dog may not deactivate the inhibiting mechanism when the moving member moves toward the first location, and the dog may deactivate the inhibiting mechanism when the moving member moves toward the second location.

In the aforementioned conveyance device, when the moving member moves toward the first location, the dog may be pushed and rotated by the inhibiting mechanism, and, when the moving member moves toward the second location, rotation of the dog may be suppressed, and the dog may push the inhibiting mechanism to deactivate the inhibiting mechanism.

The aforementioned conveyance device may further include a dog holding member that holds the dog. When the moving member comes into contact with a portion of the dog holding member on a side of the second location, the dog may move to a location where deactivation of the inhibiting mechanism is not possible, and, when the moving member comes into contact with a portion of the dog holding member on a side of the first location, the dog may move to a location where deactivation of the inhibiting mechanism is possible.

The aforementioned conveyance device may further include a dog holding member that holds the dog. The dog holding member may be rotatable. The dog holding member may hold the dog on a side of the second location with respect to a rotating shaft of the dog holding member. When the moving member comes into contact with a portion of the dog holding member on a side of the second location, the dog holding member may descend on the side of the second location, and the dog may not deactivate the inhibiting mechanism. When the moving member comes into contact with a portion of the dog holding member on a side of the first location, the dog holding member may ascend on the side of the second location, and the dog may deactivate the inhibiting mechanism.

In the aforementioned conveyance device, the rotating shaft of the dog holding member may be positioned at a centroid of the dog holding member and the dog.

The aforementioned conveyance device may further include a dog holding member that holds the dog. The dog holding member may include a first link that is disposed on a side of the first location and that is capable of coming into contact with the moving member and a second link that is disposed on a side of the second location and that is capable of coming into contact with the moving member, the second link being connected to the first link with a movable pin. When the moving member comes into contact with the second link, the dog may descend, and the dog may not deactivate the inhibiting mechanism. When the moving member comes into contact with the first link, the dog may descend, and the dog may deactivate the inhibiting mechanism.

In the aforementioned conveyance device, the first link may include a first horizontal shaft portion and a first contact portion that vertically projects with respect to the first horizontal shaft portion and that is capable of coming into contact with the moving member. The first horizontal shaft portion may include a rotating shaft, and the dog may be connected between an end of the first horizontal shaft portion on the side of the second location and the rotating shaft.

In the aforementioned conveyance device, the second link may include a second horizontal shaft portion and a second contact portion that vertically projects with respect to the second horizontal shaft portion and that is capable of coming into contact with the moving member. The second horizontal shaft portion may include a rotating shaft on the side of the second location, and a portion of the first horizontal shaft portion on the side of the second location and a portion of the second horizontal shaft on the side of the first location may be connected to each other with a movable pin.

In the aforementioned conveyance device, when the moving member comes into contact with the first contact portion, the rotating shaft of the first horizontal shaft portion, the movable pin, and the rotating shaft of the second horizontal shaft portion may be aligned with each other.

In the aforementioned conveyance device, the rotating shaft of the first link may be positioned on the side of the second location with respect to the centroid of the first link and the dog.

The conveyance device may further include a dog holding member that holds the dog. The dog holding member may include: a first contact link that is disposed on a side of the first location and that comes into contact with the moving member to receive a force; a first follower link that is connected to the first contact link with a movable pin and that receives a force toward the second location; a second contact link that is disposed on a side of the second location and that comes into contact with the moving member to receive a force; and a second follower link that is connected to the second contact link with a movable pin and that receives a force toward the first location. The dog may be pushed by the second follower link and may move, due to an orthogonal slide mechanism, to a location where deactivation of the inhibiting mechanism is not possible. The dog may be pushed by the first follower link and may move, due to an orthogonal slide mechanism, to a location where deactivation of the inhibiting mechanism is possible.

In the aforementioned conveyance device, when the dog is pushed by the second follower link, the dog may move, due to an orthogonal slide mechanism, in a direction parallel to the table and perpendicular to an advancing direction of the moving member and may become away from a path of the inhibiting mechanism.

In the aforementioned conveyance device, when the dog is pushed by the first follower link, the dog may move, due to an orthogonal slide mechanism, in the direction parallel to the table and perpendicular to the advancing direction of the moving member and may become close to the path of the inhibiting mechanism.

In the aforementioned conveyance device, when the shaft is lifted to a predetermined location, the inhibiting mechanism may inhibit rotation of the shaft.

In the aforementioned conveyance device, the inhibiting mechanism may include a first rotary member that is pushed and rotated by the dog and a second rotary member that becomes rotatable when the first rotary member is rotated. The shaft may be connected to a rotating shaft of the second rotary member.

In the aforementioned conveyance device, the first rotary member may inhibit rotation of the second rotary member until the first rotary member is pushed by the dog.

In the aforementioned conveyance device, the amount of the rotation of the second rotary member that has become rotatable may be greater than the amount of rotation of the first rotary member that has been pushed by the dog.

In the aforementioned conveyance device, a rotation-angle regulating member that regulates the angle of rotation of the first rotary member may be further included.

The aforementioned conveyance device may further include a bar-shaped member that is disposed parallel to the table and that contains a magnetic body and a driving unit that rotates the bar-shaped member about a center axis of the bar-shaped member. The moving member may contain a magnetic body, may face a portion of a side surface of the bar-shaped member, and may move along the bar-shaped member in response to the rotation of the bar-shaped member.

In the aforementioned conveyance device, at least a portion of the bar-shaped member may be disposed inside the chamber.

In the aforementioned conveyance device, the chamber may be a temperature-controlled chamber that has a space in which the article is disposed and in which temperature is controlled.

In the aforementioned conveyance device, the driving unit may be disposed outside the chamber.

In the aforementioned conveyance device, the driving unit may be disposed outside the space in which temperature is controlled.

In the aforementioned conveyance device, the temperature-controlled chamber may be a freeze-drying chamber.

In the aforementioned conveyance device, the article may contain a medicine.

Advantageous Effects of Invention

According to the present invention, it is possible to provide a conveyance device that is easy in terms of maintenance.

DESCRIPTION OF EMBODIMENTS

Hereinafter, embodiments of the present invention will be described. In the following description with reference to the drawings, portions identical or similar to each other are referred with identical or similar reference signs. Note that the drawings are schematic. Accordingly, specific dimensions and the like should be determined with reference to the following descriptions. Needless to say, portions that differ from each other, between the drawings, in terms of dimensional relation and ratio are included.

First Embodiment

As illustrated in FIG. 1 to FIG. 8, a conveyance device according to a first embodiment includes a table 7 for disposing an article 5 thereon, bar-shaped members 2A and 2B that are disposed parallel to the table 7 and that each contain a magnetic body, moving members 3A and 3B that each face a portion of a side surface of a respective one of the bar-shaped members 2A and 2B and that each contain a magnetic body, and driving units 4A and 4B that each rotate a respective one of the bar-shaped members 2A and 2B about a center axis of the bar-shaped member 2A or 2B corresponding thereto to move the moving members 3A and 3B along the bar-shaped members 2A and 2B.

The moving members 3A and 3B move, along the table 7, between a first location and a second location.

The conveyance device according to the first embodiment further includes shafts 21A and 21B that are rotatably connected to the moving members 3A and 3B, respectively, a contact member 22 that is configured to come into contact with the article 5 and that is connected to the shafts 21A and 21B, inhibiting mechanisms 23A and 23B that inhibit rotation of the shafts 21A and 21B so that the contact member 22 is held above the article 5 and that are disposed at the moving members 3A and 3B, respectively, and dogs 24A and 24B that are configured to come into contact, at a predetermined location, with the inhibiting mechanisms 23A and 23B to deactivate inhibition of the rotation of the shafts 21A and 21B by the inhibiting mechanisms 23A and 23B and thereby lower the contact member 22 toward the table 7.

At least a portion of each of the bar-shaped members 2A and 2B is disposed inside a chamber 1, for example, on the side of the first location. The chamber 1 is, for example, a temperature-controlled chamber that has a space in which the article 5 is disposed and in which temperature is controlled. The temperature-controlled chamber may be, for example, a freeze-drying chamber. The article 5 is, for example, a vial or the like in which a medicine is input. When the chamber 1 is a freeze-drying chamber, the article 5 is disposed on the table 7 that is inside the chamber 1, and a medicine or the like inside the article 5 is freeze-dried. The table 7 is, for example, a shelf plate.

Figure 9:
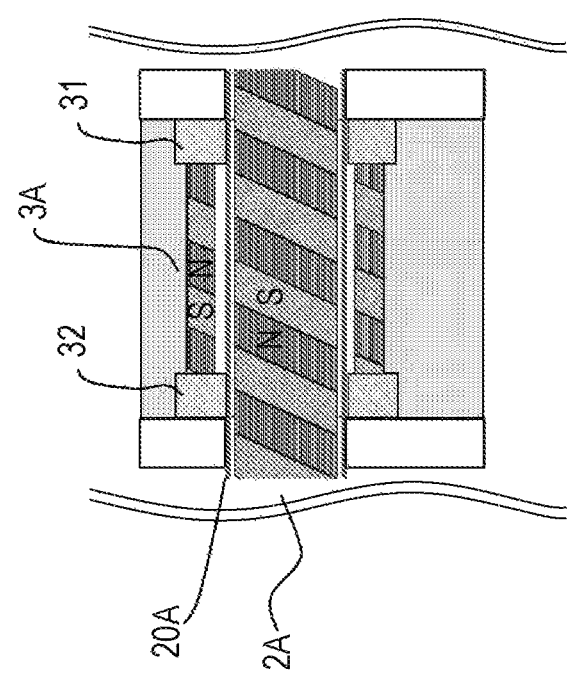
FIG. 9 is a schematic view of a bar-shaped member and a moving member according to the first embodiment.

The columnar bar-shaped member 2A is held by a bearing. As illustrated in FIG. 9, the bar-shaped member 2A is a magnetic screw containing a magnetic body. The bar-shaped member 2A includes, on the outer circumferential surface thereof, an S-pole magnetized zone and an N-pole magnetized zone that are alternately provided in a spiral form. The bar-shaped member 2A may be inserted into a non-magnetized thin-walled pipe 20A. The pipe 20A is made of, for example, stainless steel. The bar-shaped member 2A and the pipe 20A are integral with each other. When the bar-shaped member 2A rotates, the pipe 20A also rotates about the center axis of the bar-shaped member 2A.

The moving member 3A includes a magnetic nut containing a magnetic body and has a hole having an inner circumference larger than the outer circumference of the bar-shaped member 2A. The bar-shaped member 2A extends through the hole of the nut-shaped moving member 3A. An S-pole magnetized zone and an N-pole magnetized zone are alternately arranged in a spiral form on the inner circumferential surface of the hole of the moving member 3A. The pitch of the magnetized zones of the moving member 3A is substantially identical to the pitch of the magnetized zones of the bar-shaped member 2A. The inner circumferential surface of the moving member 3A may include guide rings 31 and 32, such as bushes. The inner circumference of each of the guide rings 31 and 32 is smaller than the inner circumference of the moving member 3A and is in contact with the outer circumferential surface of the pipe 20A. Consequently, a certain gap is maintained between the magnetized zones of the bar-shaped member 2A and the magnetized zones of the moving member 3A. The guide rings 31 and 32 are made of, for example, a material, such as a fluororesin, having a small coefficient of friction.

Figure 1:
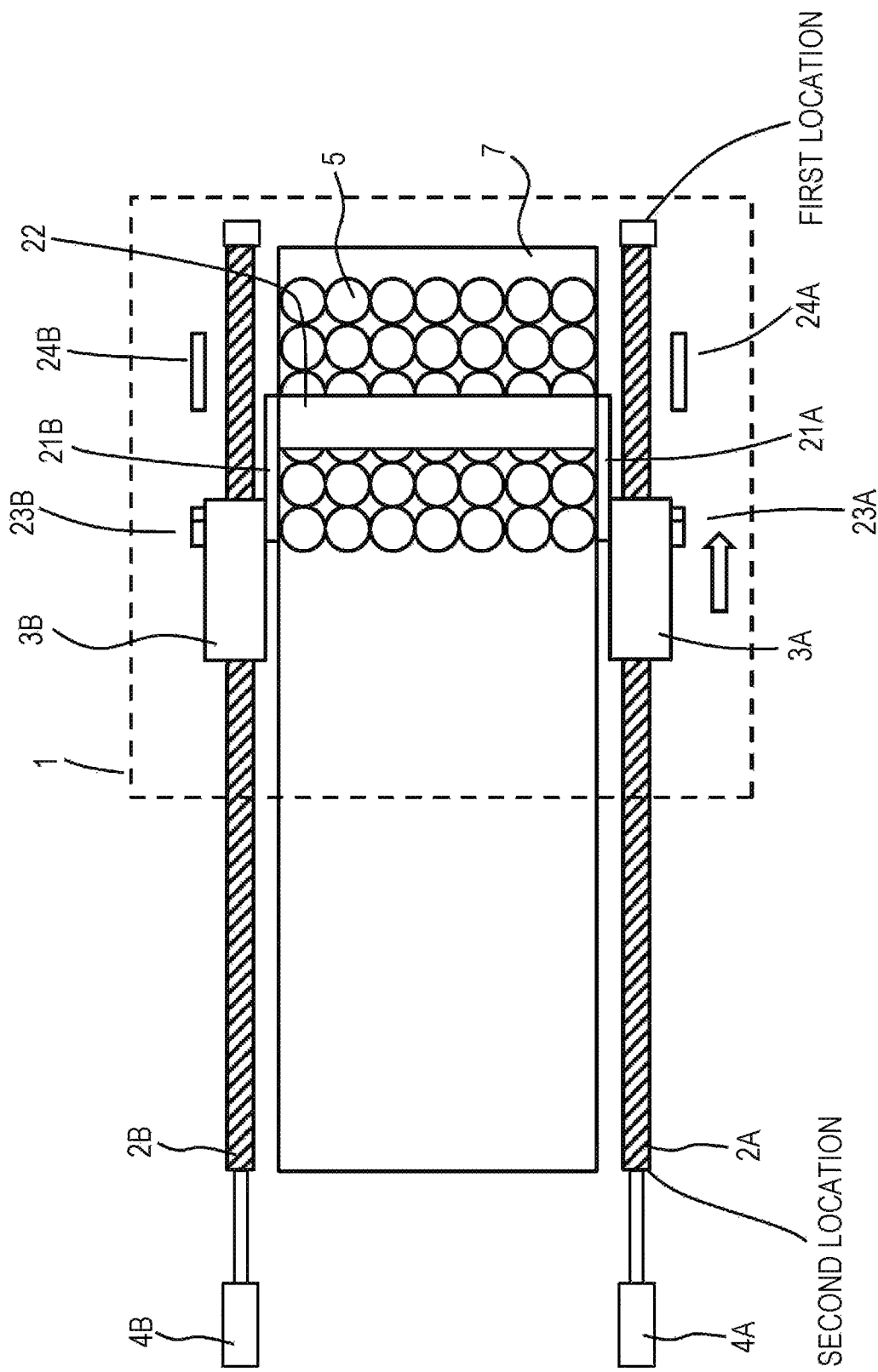
FIG. 1 is a schematic top view of a conveyance device according to a first embodiment.

As illustrated in FIG. 1, the columnar bar-shaped member 2B is held by a bearing so as to be parallel to the bar-shaped member 2A. The configuration of the bar-shaped member 2B is identical to that of the bar-shaped member 2A. The configuration of the moving member 3B is identical to that of the moving member 3A.

The driving units 4A and 4B each include, for example, a rotary motor and are disposed outside the temperature-controlled space of the chamber 1. The driving units 4A and 4B may be disposed outside a housing of the chamber 1 and may be disposed inside the housing of the chamber 1 and outside the temperature-controlled space. Each of the driving units 4A and 4B may be covered with a shield or the like that prevents diffusion of dust and the like that may be generated. The driving unit 4A and a portion of the bar-shaped member 2A on the side of the second location are connected to each other with, for example, a shaft. The driving unit 4B and a portion of the bar-shaped member 2B on the side of the second location are connected to each other with, for example, a shaft.

The driving units 4A and 4B synchronize with each other to rotate the bar-shaped members 2A and 2B. When the driving unit 4A rotates the bar-shaped member 2A, a magnetic force acts between the magnetized zones of the bar-shaped member 2A and the magnetized zones of the moving member 3A. The moving member 3A is connected to the moving member 3B with the shafts 21A and 21B and the contact member 22 and is thus non-rotatable. Thus, when the bar-shaped member 2A is rotated, the moving member 3A moves along the center axis of the bar-shaped member 2A. When the driving unit 4B rotates the bar-shaped member 2B, a magnetic force acts between the magnetized zones of the bar-shaped member 2B and the magnetized zones of the moving member 3B, and the moving member 3B moves along the center axis of the bar-shaped member 2B. In response to the movement of the moving members 3A and 3B, the shafts 21A and 21B and the contact member 22 connected between the moving members 3A and 3B also move, above the table 7, along the center axis of each of the bar-shaped members 2A and 2B.

Figure 2:
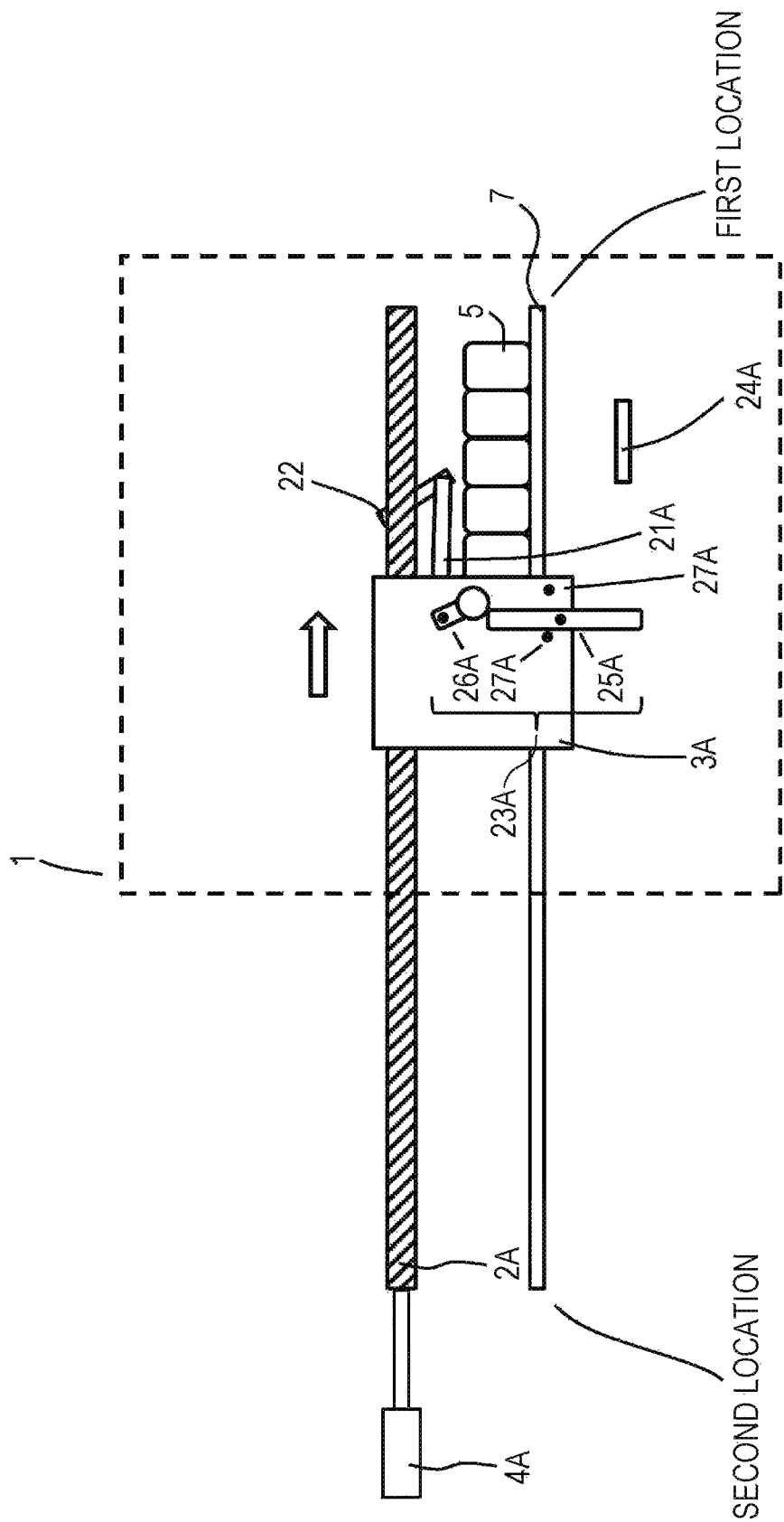
FIG. 2 is a schematic side view of the conveyance device according to the first embodiment.
Figure 3:
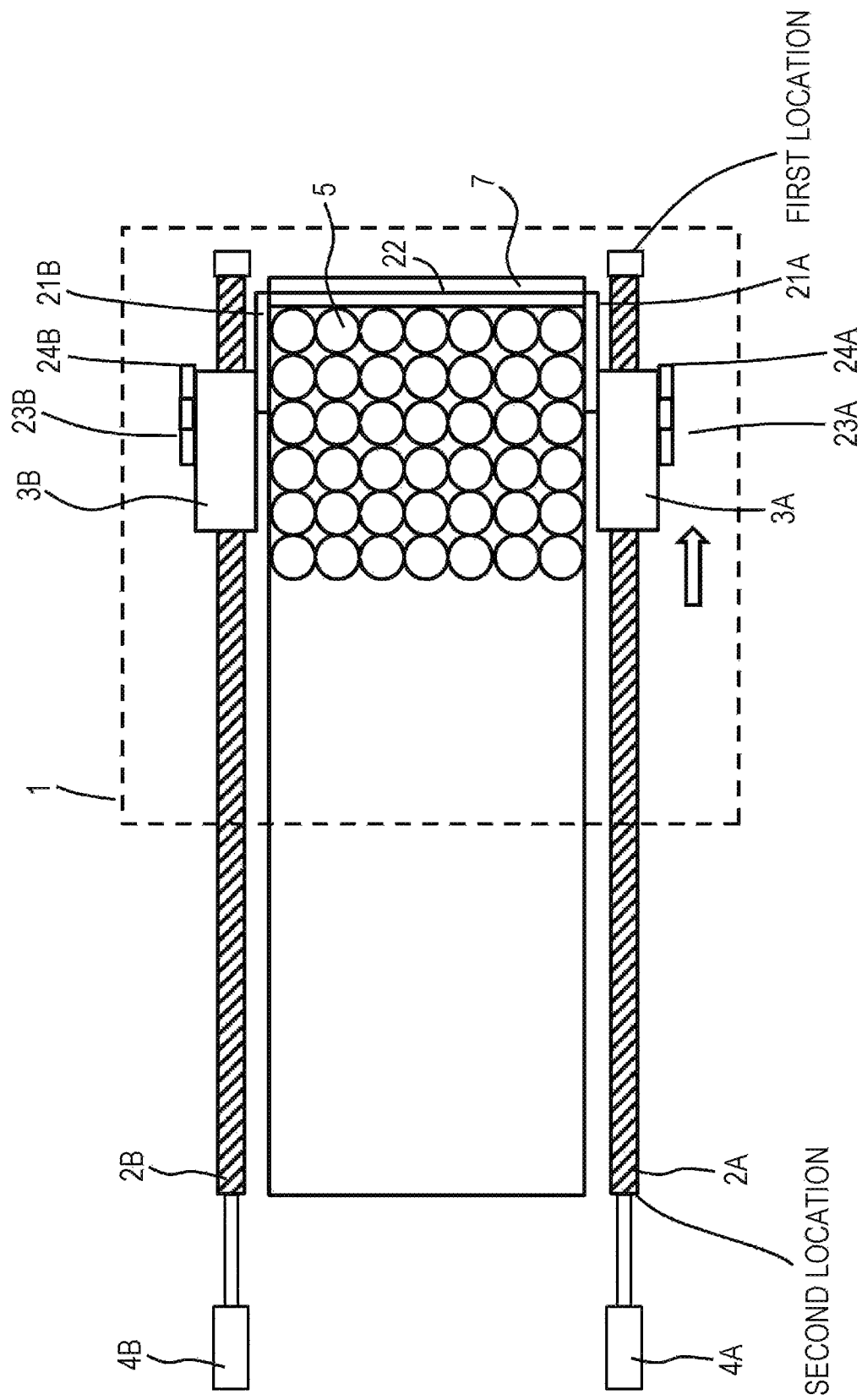
FIG. 3 is a schematic top view of the conveyance device according to the first embodiment.
Figure 4:
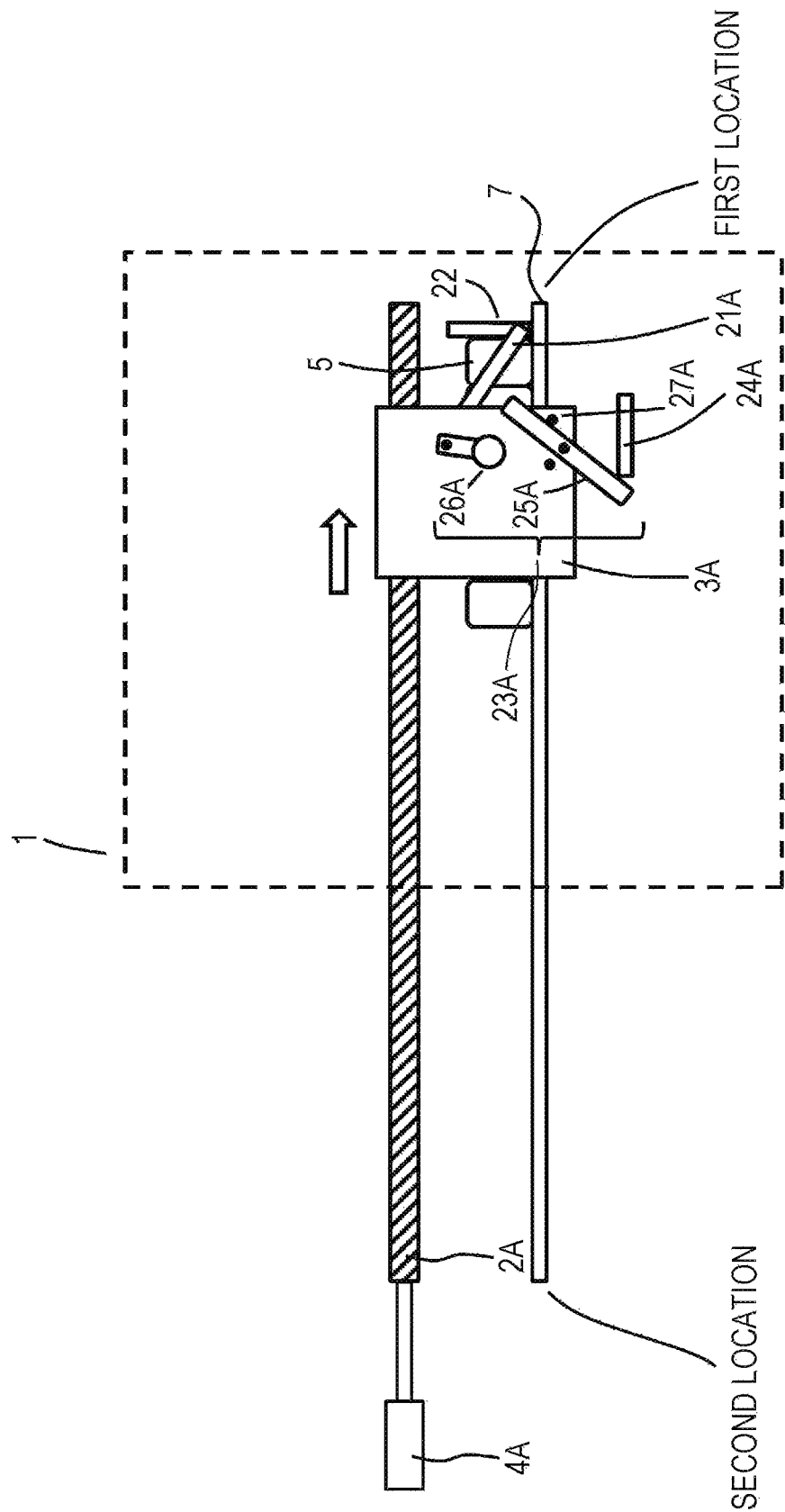
FIG. 4 is a schematic side view of the conveyance device according to the first embodiment.
Figure 5:
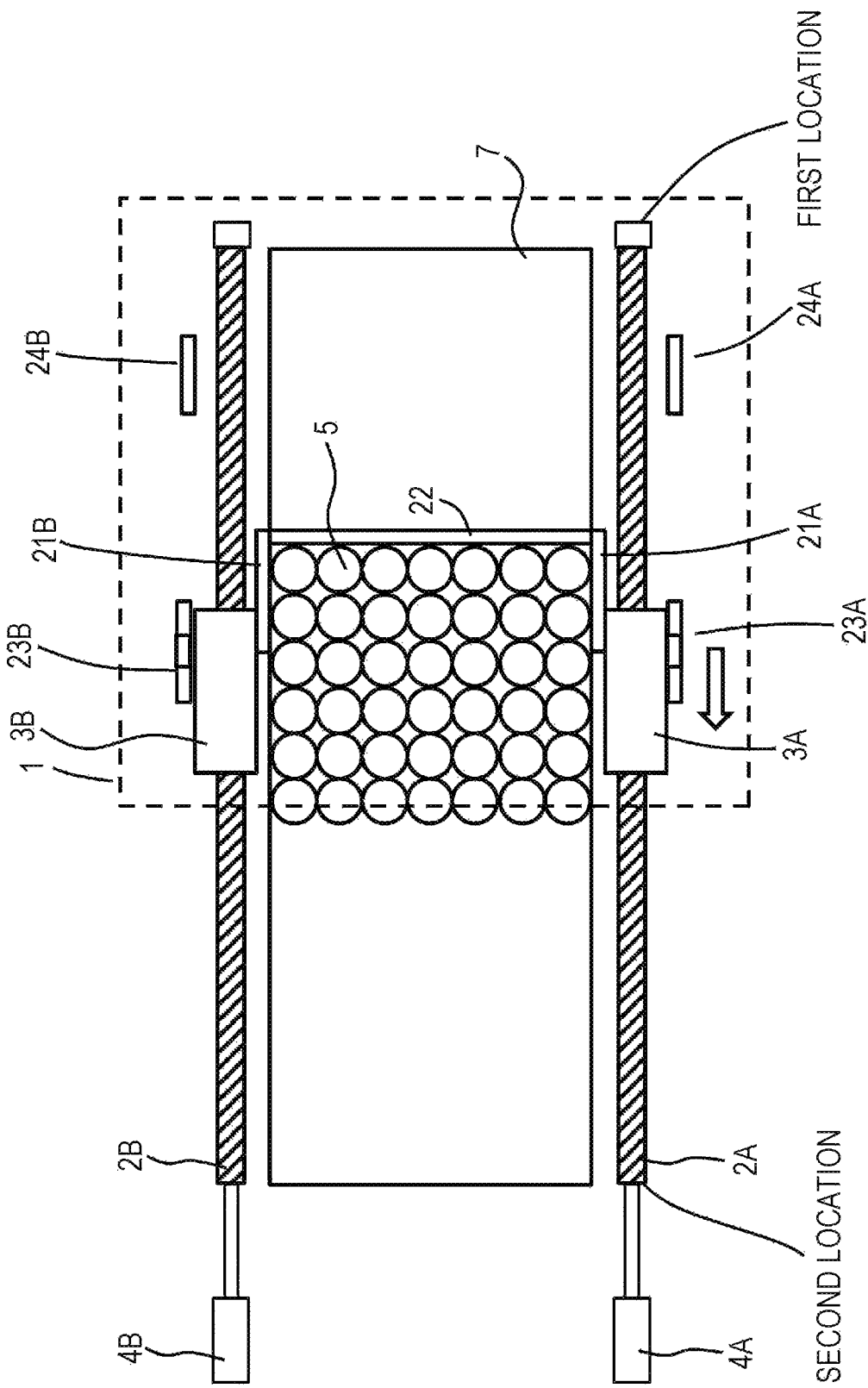
FIG. 5 is a schematic top view of the conveyance device according to the first embodiment.
Figure 6:
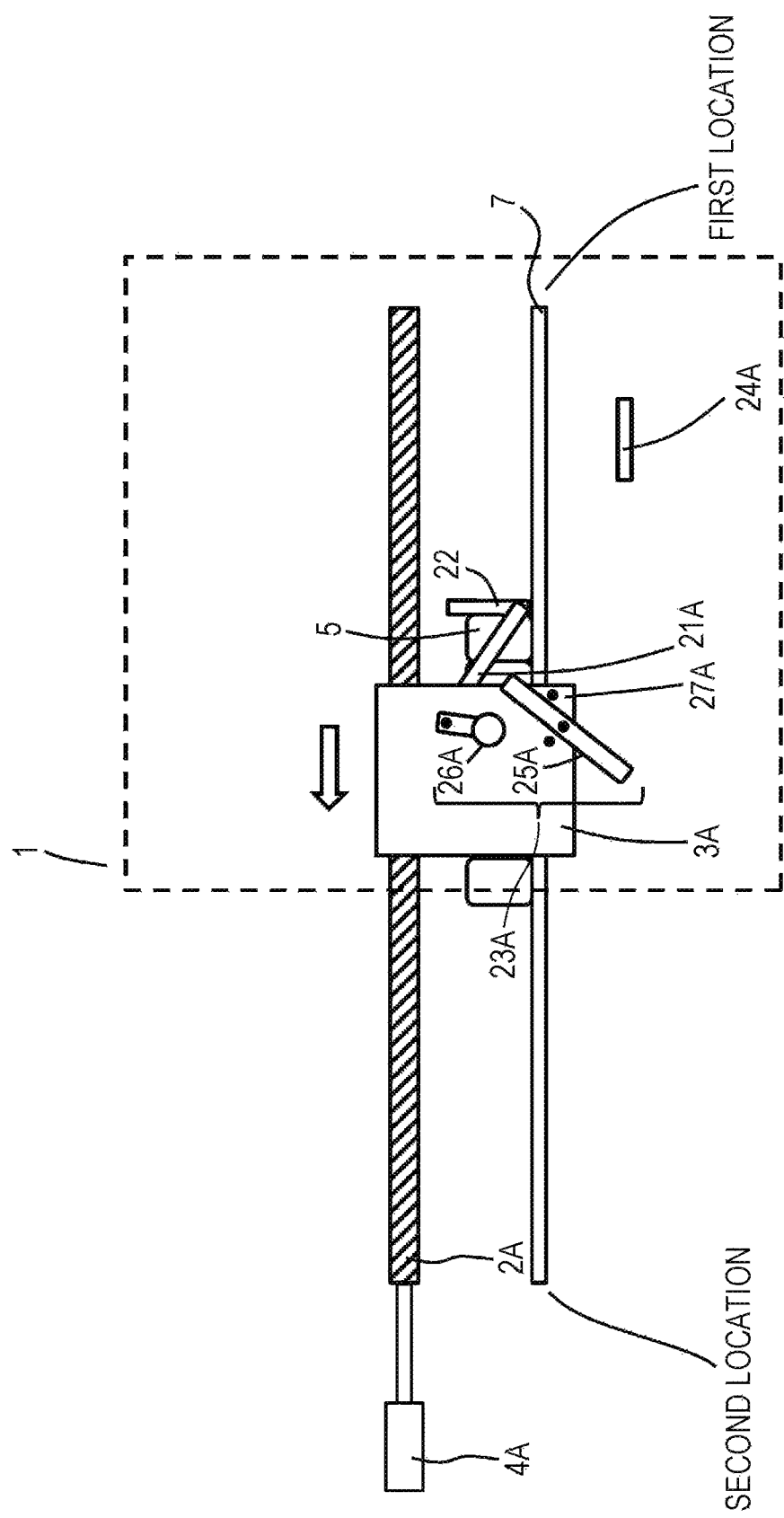
FIG. 6 is a schematic side view of the conveyance device according to the first embodiment.
Figure 7:
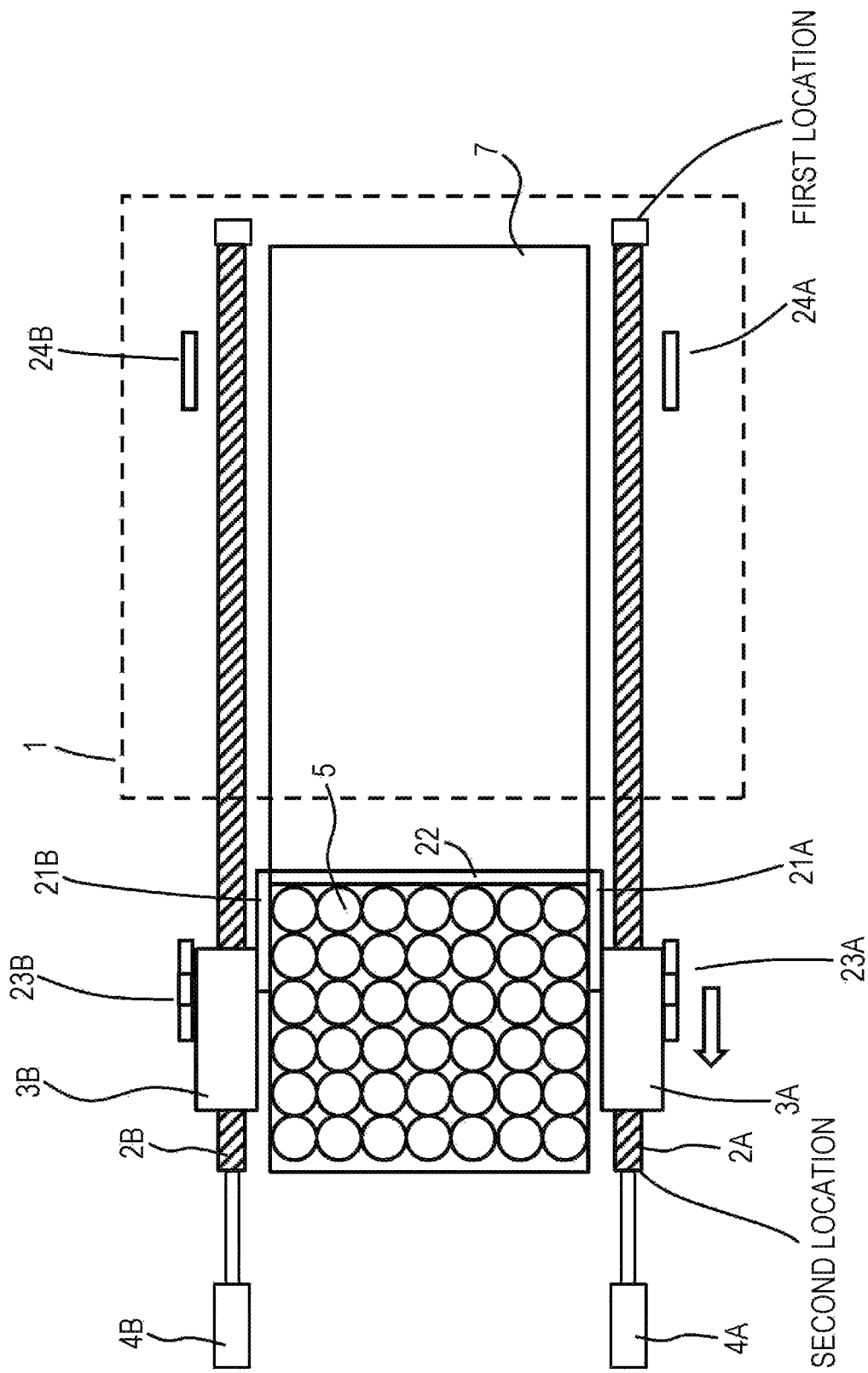
FIG. 7 is a schematic top view of the conveyance device according to the first embodiment.
Figure 8:
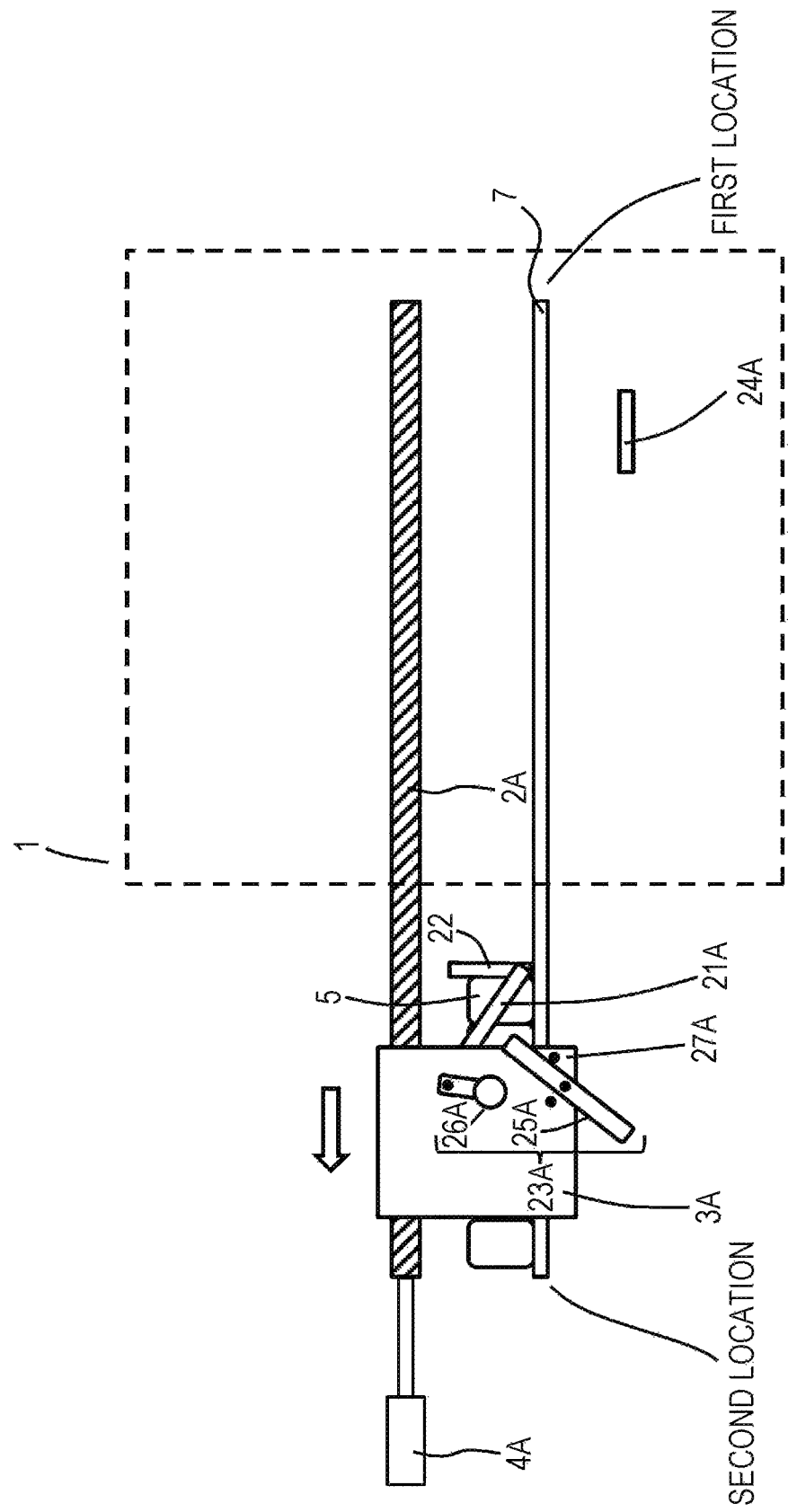
FIG. 8 is a schematic side view of the conveyance device according to the first embodiment.

The contact member 22 is, for example, a plate-shaped or bar-shaped member. As illustrated in FIG. 1 and FIG. 2, when conveying the article 5 that is inside the chamber 1 to outside the chamber 1, the contact member 22 connected to the moving members 3A and 3B passes above the article 5 and moves in a direction toward the first location to the back of the chamber 1. As illustrated in FIG. 3 and FIG. 4, the contact member 22 descends at the back of the chamber 1 toward the table 7. Next, as illustrated in FIG. 5 to FIG. 8, the contact member 22 comes into contact with the article 5 and pushes the article 5 in a direction toward the second location, thereby conveying the article 5 to outside the chamber 1.

The shaft 21A holding the contact member 22 at one end portion is, for example, connected to the moving member 3A so as to be rotatable within a plane perpendicular to the table 7 and parallel to the bar-shaped member 2A. The shaft 21B holding the contact member 22 at the other end portion is, for example, connected to the moving member 3B so as to be rotatable within a plane perpendicular to the table 7 and parallel to the bar-shaped member 2B.

As illustrated in FIG. 1 and FIG. 2, the inhibiting mechanism 23A disposed at the moving member 3A inhibits the rotation of the shaft 21A to hold the contact member 22 above the article 5 while the moving member 3A advances in the direction toward the first location at a back portion of the chamber 1. As illustrated in FIG. 2, the inhibiting mechanism 23A includes, for example, a first rotary member 25A that is pushed and rotated by the dog 24A disposed at a predetermined location and a second rotary member 26A that becomes rotatable when the first rotary member 25A rotates. The first and second rotary members 25A and 26A rotate within a plane perpendicular to the table 7 and parallel to the bar-shaped member 2A.

The shaft 21A is connected to the second rotary member 26A. For example, the shaft 21A and the second rotary member 26A share a rotating shaft. While the moving member 3A advances in the direction toward the first location at the back portion of the chamber 1, the second rotary member 26A is held by the first rotary member 25A and is non-rotatable. As illustrated in FIG. 3 and FIG. 4, for example, in response to the movement of the moving member 3A, the first rotary member 25A is pushed and rotated, at the back portion of the chamber 1, by the dog 24A fixed at the predetermined location and thereby becomes away from the second rotary member 26A with which the first rotary member 25A has been in contact. The second rotary member 26A for which inhibition of the rotation thereof by the first rotary member 25A is deactivated rotates due to gravity applied to the shaft 21A and the contact member 22. Consequently, the shaft 21A and the contact member 22 descend toward the table 7.

The shape of each of the first rotary member 25A and the second rotary member 26A may be a rocker-arm shape or a cam shape including at least a long portion but is not particularly limited. As illustrated, for example, in FIG. 4, the second rotary member 26A for which inhibition of the rotation thereof by the first rotary member 25A is deactivated passes a bottom dead center and rotates. The shape of the dog 24A is freely selectable provided that the dog 24A is enabled to rotate the first rotary member 25A at a predetermined location.

A rotating shaft of the first rotary member 25A may have a rotational resistance that enables rotation when pushed by the dog 24A. The first rotary member 25A may have a weight that enables rotation when pushed by the dog 24A. The rotational resistance of a rotating shaft of the second rotary member 26A may be lower than the rotational resistance of the rotating shaft of the first rotary member 25A. The amount of rotation of the second rotary member 26A that has become rotatable may be greater than the amount of rotation of the first rotary member 25A that has been pushed by the dog 24A. As illustrated in FIG. 4, the moving member 3A may include a rotation-angle regulating member 27A that regulates the angle of rotation of the first rotary member 25A.

The inhibiting mechanism 23B disposed at the moving member 3B has a configuration identical to that of the inhibiting mechanism 23A disposed at the moving member 3A. The inhibiting mechanism 23B comes into contact, at a predetermined location, with the dog 24B to cause the shaft 21B to be rotatable. The dog 24A and the dog 24B are disposed at an identical location in a direction of the center axis of each of the bar-shaped members 2A and 2B.

After the shafts 21A and 21B and the contact member 22 descend toward the table 7, as illustrated in FIG. 5 to FIG. 8, the moving members 3A and 3B move toward the second location outside the chamber 1 and become away from the dogs 24A and 24B. At this time, the article 5 on the table 7 is pushed by the contact member 22 and conveyed to outside the chamber 1. After conveying-out is completed, the shafts 21A and 21B and the contact member 22 may be lifted to a predetermined height by a robotic arm or by a hand of an operator, and rotation of the shafts 21A and 21B may be inhibited by the inhibiting mechanisms 23A and 23B.

In the conveyance device according to the above-described first embodiment, because of its simple structure, less dust is generated when the contact member 22 descends. Thus, it is possible to keep the inside of the chamber 1 clean, and maintenance of the chamber 1 and the conveyance device is easy. In addition, because of its simple structure, it is possible to suppress residual cleaning liquid after cleaning. Moreover, in the conveyance device according to the first embodiment, the use of gravity to lower the contact member 22 eliminates the need to cause a motor for lowering the contact member 22 inside the chamber 1 to enter the chamber 1. Thus, temperature inside the chamber 1 is not increased due to heat generated by the motor.

Moreover, in the conveyance device according to the first embodiment, drive transmission between the bar-shaped members 2A and 2B and the moving members 3A and 3B is performed in a non-contact manner using the magnetic force. Therefore, heat or dust is not easily generated during drive transmission between the bar-shaped members 2A and 2B and the moving members 3A and 3B. Thus, even when the bar-shaped members 2A and 2B and the moving members 3A and 3B are disposed inside the temperature-controlled space of the chamber 1, the temperature-controlled space is not easily subjected to an effect of heat generation and dust generation.

Furthermore, due to the driving units 4A and 4B being disposed outside the temperature-controlled space of the chamber 1, even if dust is generated at the driving units 4A and 4B, the dust does not easily enter the temperature-controlled space of the chamber 1. In addition, if a driving unit is disposed inside a temperature-controlled chamber, the driving unit that has generated heat may cause unevenness in temperature distribution inside the temperature-controlled chamber, such as a freeze-drying chamber. In this case, inconsistent quality of a plurality of articles disposed inside the temperature-controlled chamber may be generated. In contrast, in the conveyance device according to the first embodiment, due to the driving units 4A and 4B being disposed outside the temperature-controlled space of the chamber 1, temperature unevenness is not easily generated inside the chamber 1.

Second Embodiment

Figure 10:
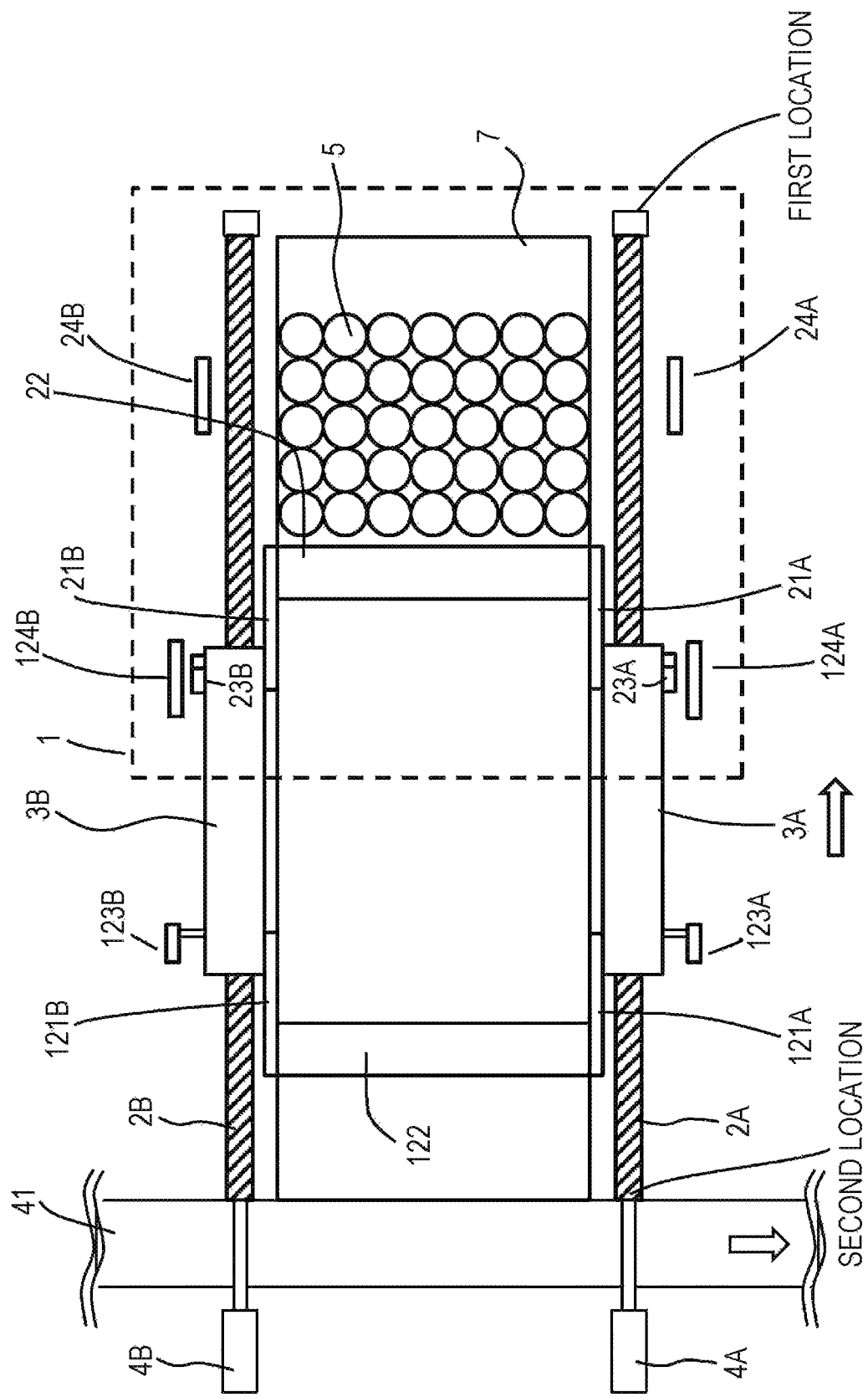
FIG. 10 is a schematic top view of a conveyance device according a second embodiment.
Figure 11:
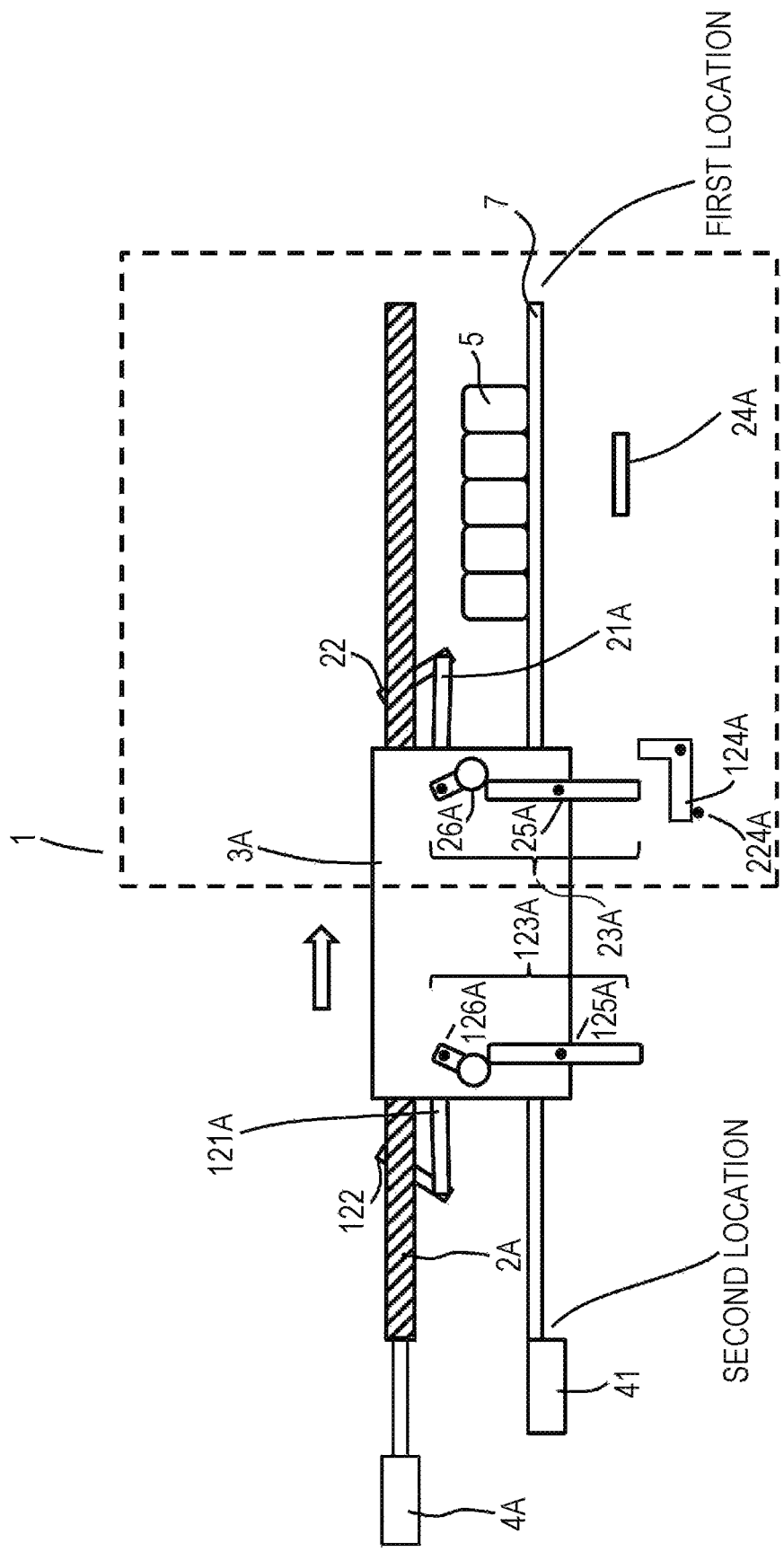
FIG. 11 is a schematic side view of the conveyance device according to the second embodiment.

As illustrated in FIG. 10 and FIG. 11, the conveyance device according to a second embodiment includes first shafts 21A and 21B that are rotatably connected to the moving members 3A and 3B, respectively, on the side of the first location, a first contact member 22 that is configured to come into contact with the article 5 and that is connected to the first shafts 21A and 21B, first inhibiting mechanisms 23A and 23B that inhibit rotation of the first shafts 21A and 21B so that the first contact member 22 is held above the article 5 and that are disposed at the moving members 3A and 3B, respectively, on the side of the first location, and first dogs 24A and 24B that each come into contact, at a predetermined location, with the first inhibiting mechanism 23A or 23B corresponding thereto to deactivate inhibition of the rotation of the first shafts 21A and 21B by the first inhibiting mechanisms 23A and 23B, thereby lowering the first contact member 22.

The conveyance device according to the second embodiment also includes second shafts 121A and 121B that are rotatably connected to the moving members 3A and 3B, respectively, on the side of the second location, a second contact member 122 that is configured to come into contact with the article 5 and that is connected to the second shafts 121A and 121B, second inhibiting mechanisms 123A and 123B that inhibit rotation of the second shafts 121A and 121B so that the second contact member 122 is held above the article 5 and that are disposed at the moving members 3A and 3B, respectively, on the side of the second location, and second dogs 124A and 124B that each come into contact, at a predetermined location, with the second inhibiting mechanism 123A or 123B corresponding thereto to deactivate inhibition of the rotation of the second shafts 121A and 121B by the second inhibiting mechanisms 123A and 123B, thereby lowering the second contact member 122.

The first dogs 24A and 24B are disposed in a fixed manner and deactivate the first inhibiting mechanisms 23A and 23B when the moving members 3A and 3B move toward the first location. The first dogs 24A and 24B do not come into contact with the second inhibiting mechanisms 123A and 123B and do not deactivate the second inhibiting mechanisms 123A and 123B. For example, the first dog 24A and the second inhibiting mechanism 123A are displaced from each other in a direction perpendicular to the bar-shaped member 2A and parallel to the table 7. The first dog 24B and the second inhibiting mechanisms 123B are displaced from each other in a direction perpendicular to the bar-shaped member 2B and parallel to the table 7. Consequently, even when the moving members 3A and 3B pass by the first dogs 24A and 24B, the second inhibiting mechanisms 123A and 123B do not come into contact with the first dogs 24A and 24B.

The second dogs 124A and 124B do not deactivate the second inhibiting mechanisms 123A and 123B when the moving members 3A and 3B move toward the first location. The second dogs 124A and 124B deactivate the second inhibiting mechanisms 123A and 123B when the moving members 3A and 3B move toward the second location.

The second dog 124A has, for example, an L-shape and has a rotating shaft at a point at which two lengths intersect each other. The shape of the second dog 124A is, however, not particularly limited. The second dog 124A is rotatable within a plane perpendicular to the table 7 and parallel to the bar-shaped member 2A. The conveyance device according to the second embodiment further includes a rotation constraining member 224A that constrains the rotation of the second dog 124A. The rotation constraining member 224A allows the second dog 124A to be pushed and rotated by the second inhibiting mechanisms 123A when the moving member 3A moves toward the first location. The rotation constraining member 224A, however, does not allow the second dog 124A to be pushed by the second inhibiting mechanism 123A and rotated by a certain degree or more when the moving member 3A moves toward the second location. As the rotation constraining member 224A, a fixing pin or the like that comes into contact with the rotated second dog 124A is usable. The rotational resistance of the second dog 124A is smaller than the rotational resistance of a first rotary member 125A included in the second inhibiting mechanisms 123A. The same is true of the second dog 124B and the second inhibiting mechanism 123B.

The second dogs 124A and 124B do not come into contact with the first inhibiting mechanisms 23A and 23B and do not deactivate the first inhibiting mechanisms 23A and 23B. For example, the second dog 124A and the first inhibiting mechanism 23A are displaced from each other in a direction perpendicular to the bar-shaped member 2A and parallel to the table 7. The second dog 124B and the first inhibiting mechanism 23B are displaced from each other in a direction perpendicular to the bar-shaped member 2B and parallel to the table 7. Consequently, even when the moving members 3A and 3B pass by the second dogs 124A and 124B, the first inhibiting mechanisms 23A and 23B do not come into contact with the second dogs 124A and 124B.

The other components of the conveyance device according to the second embodiment are identical to those of the conveyance device according to the first embodiment.

Figure 12:
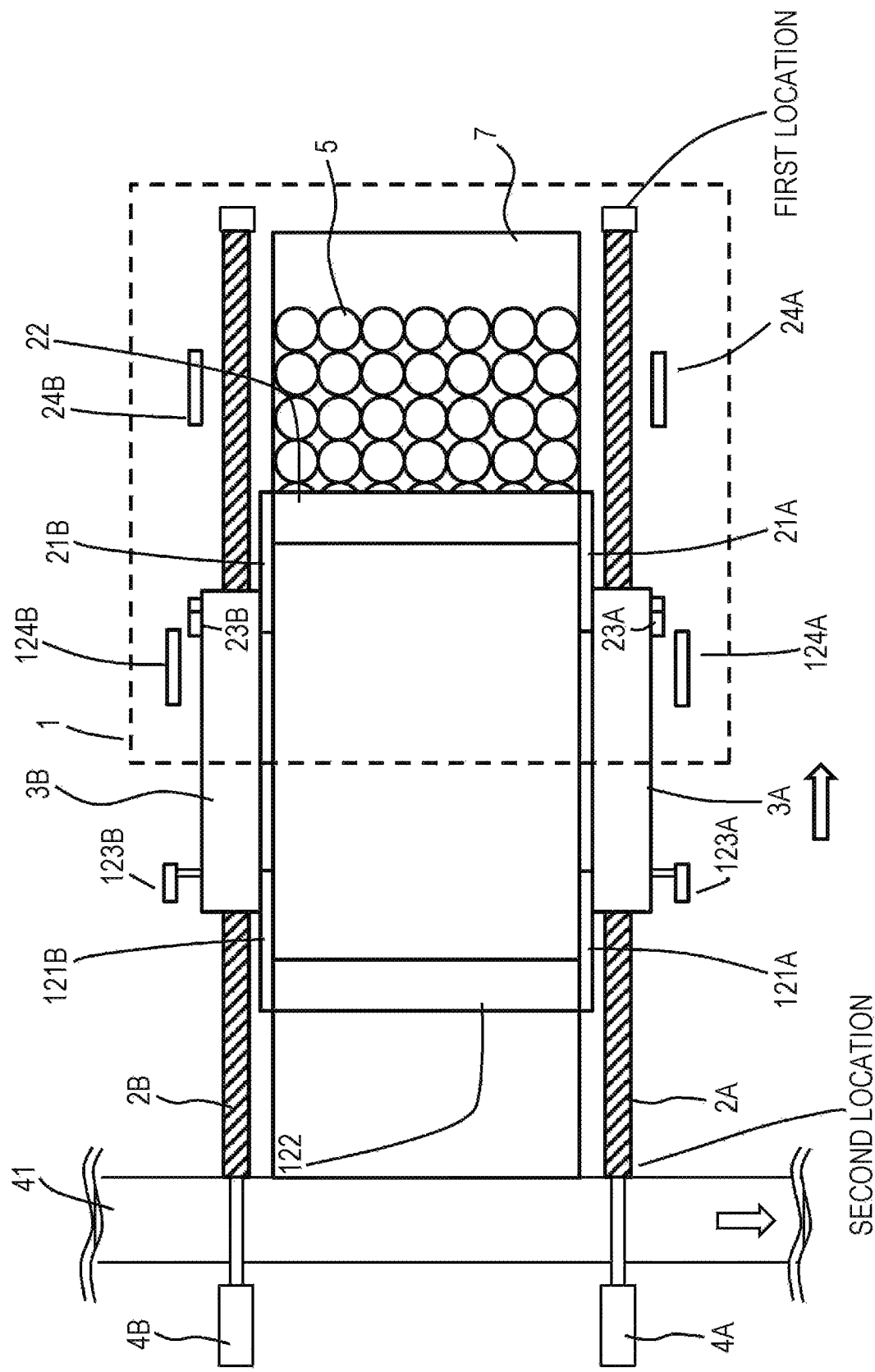
FIG. 12 is a schematic top view of the conveyance device according to the second embodiment.
Figure 13:
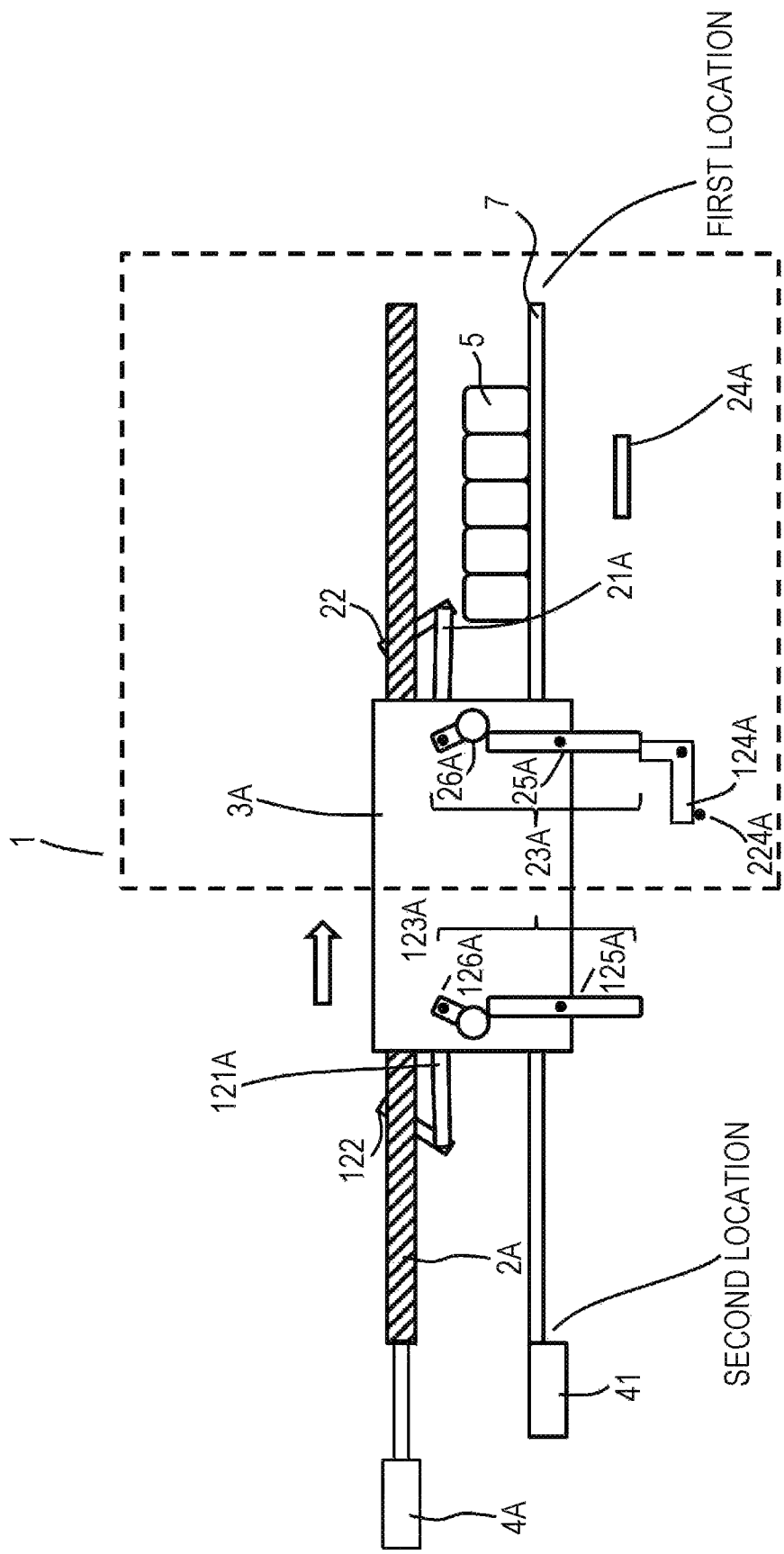
FIG. 13 is a schematic side view of the conveyance device according to the second embodiment.
Figure 14:
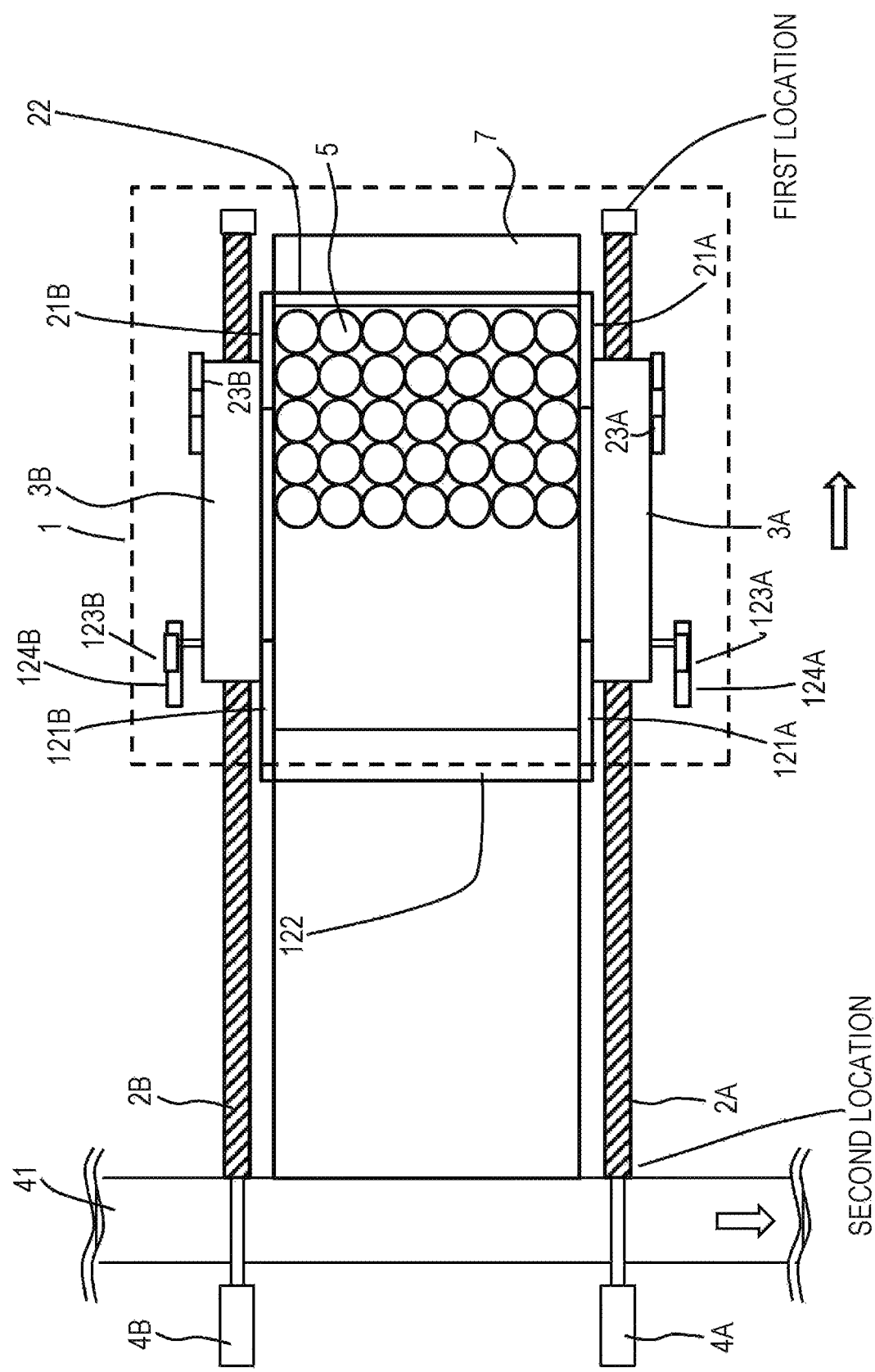
FIG. 14 is a schematic top view of the conveyance device according to the second embodiment.
Figure 15:
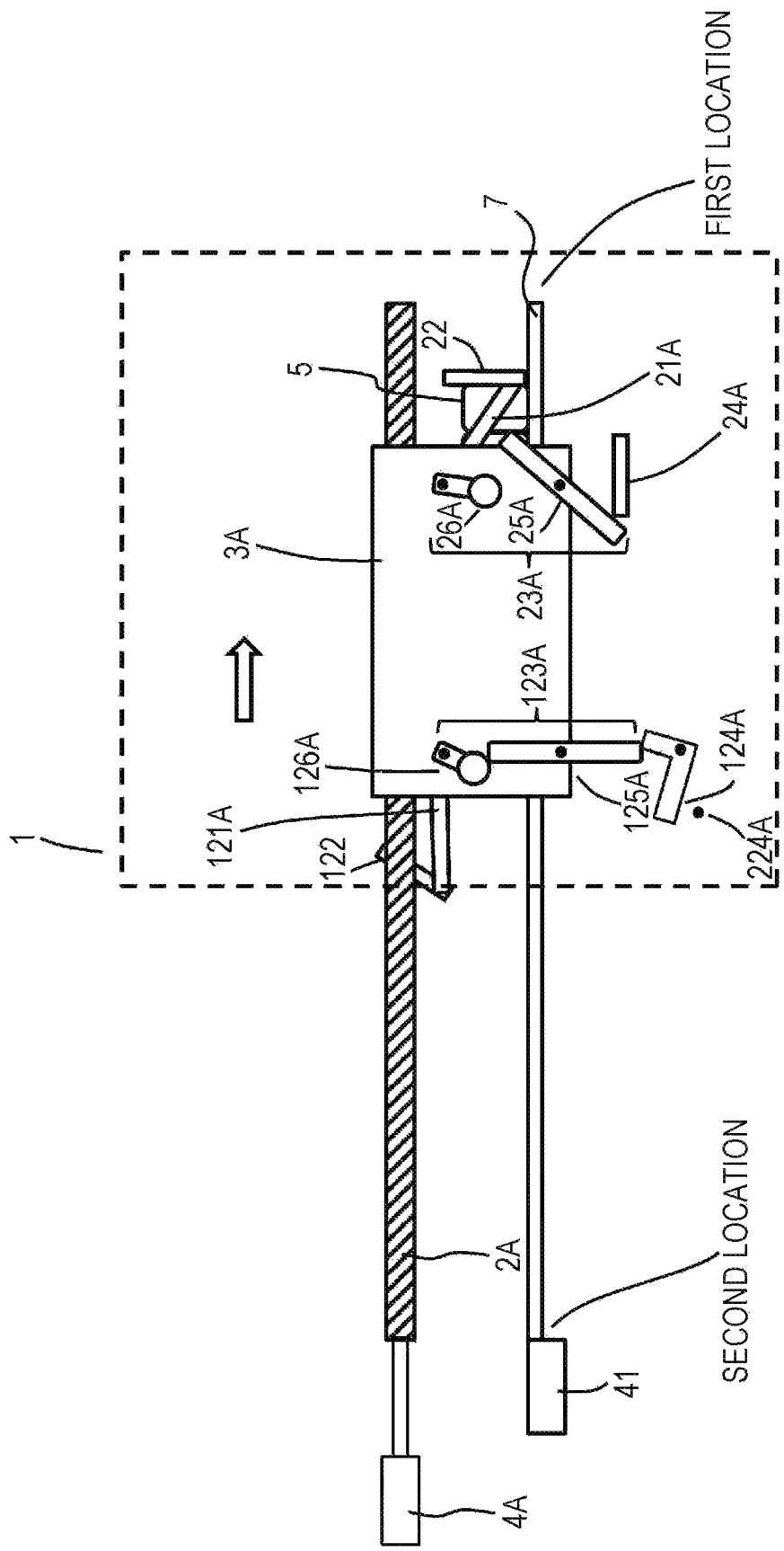
FIG. 15 is a schematic side view of the conveyance device according to the second embodiment.

Hereinafter, a method by which the conveyance device according to the second embodiment conveys out the article 5 that is inside the chamber 1 will be described. First, the moving members 3A and 3B move in the direction toward the first location at the back portion of the chamber 1. As illustrated in FIG. 12 and FIG. 13, the first inhibiting mechanisms 23A and 23B pass by the second dogs 124A and 124B without coming into contact with the second dogs 124A and 124B. As illustrated in FIG. 14 and FIG. 15, the first inhibiting mechanisms 23A and 23B come into contact with the first dogs 24A and 24B, respectively, at the back portion of the chamber 1 to deactivate inhibition of the rotation of the first shafts 21A and 21B. Consequently, the first contact member 22 descends together with the first shafts 21A and 21B toward the table 7.

Even when the second inhibiting mechanisms 123A comes into contact with the second dog 124A, the second dog 124A is pushed by the first rotary member 125A and rotated in the direction toward the first location, and the second inhibiting mechanism 123A is not deactivated, because the rotational resistance of the second dog 124A is smaller than the rotational resistance of the first rotary member 125A included in the second inhibiting mechanism 123A. The same is true of the second inhibiting mechanism 123B.

Figure 16:
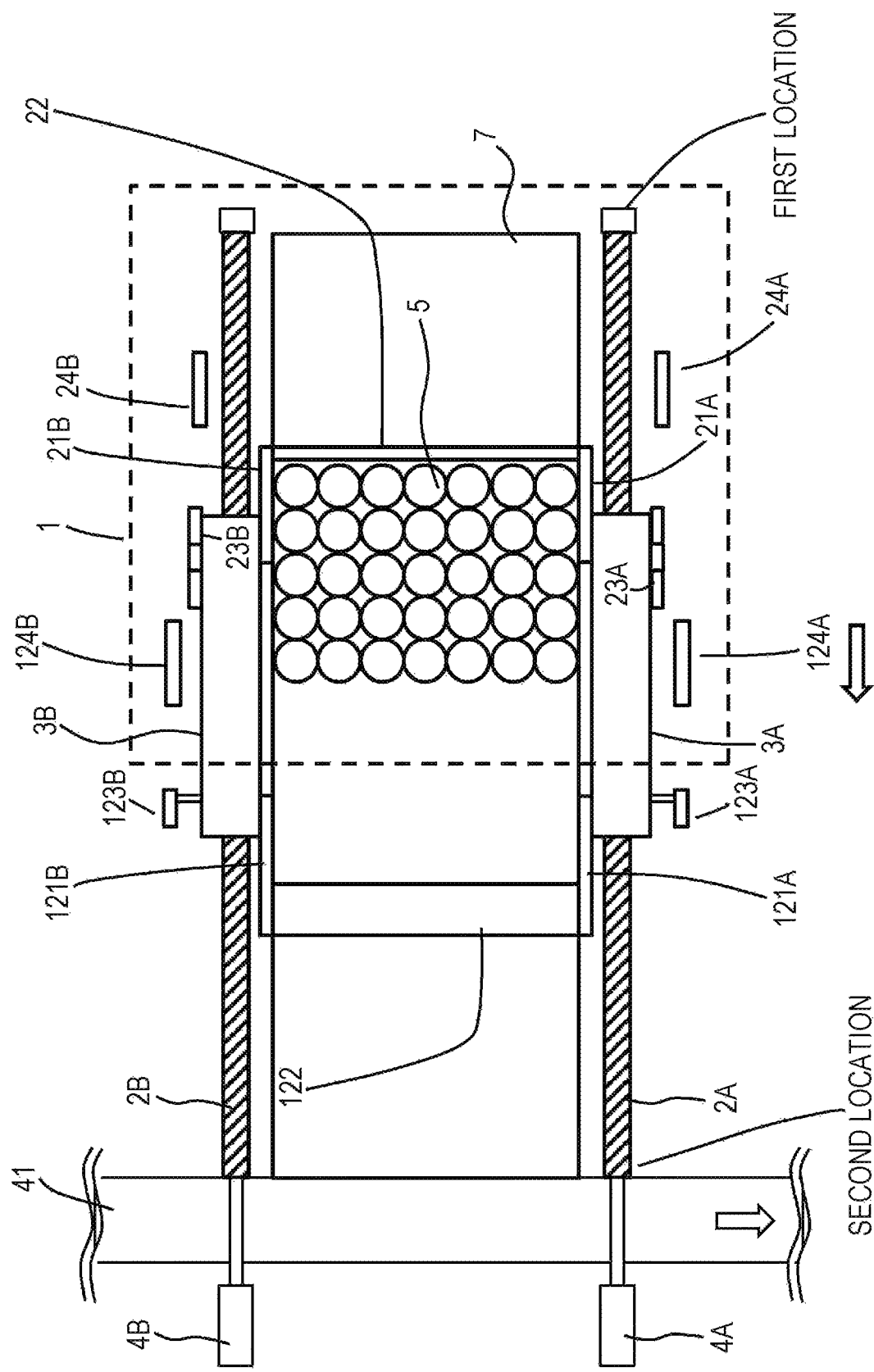
FIG. 16 is a schematic top view of the conveyance device according to the second embodiment.
Figure 17:
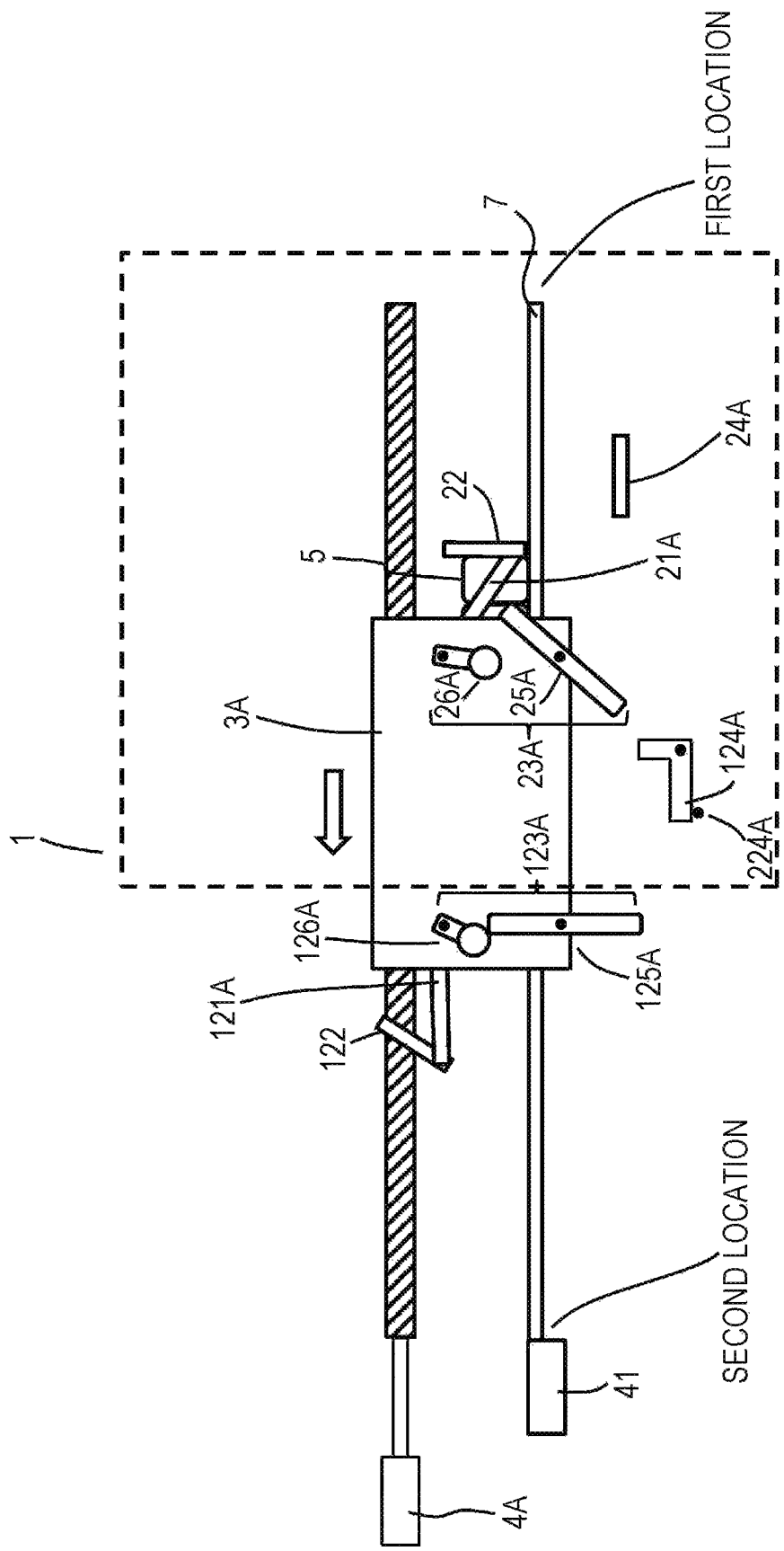
FIG. 17 is a schematic side view of the conveyance device according to the second embodiment.
Figure 18:
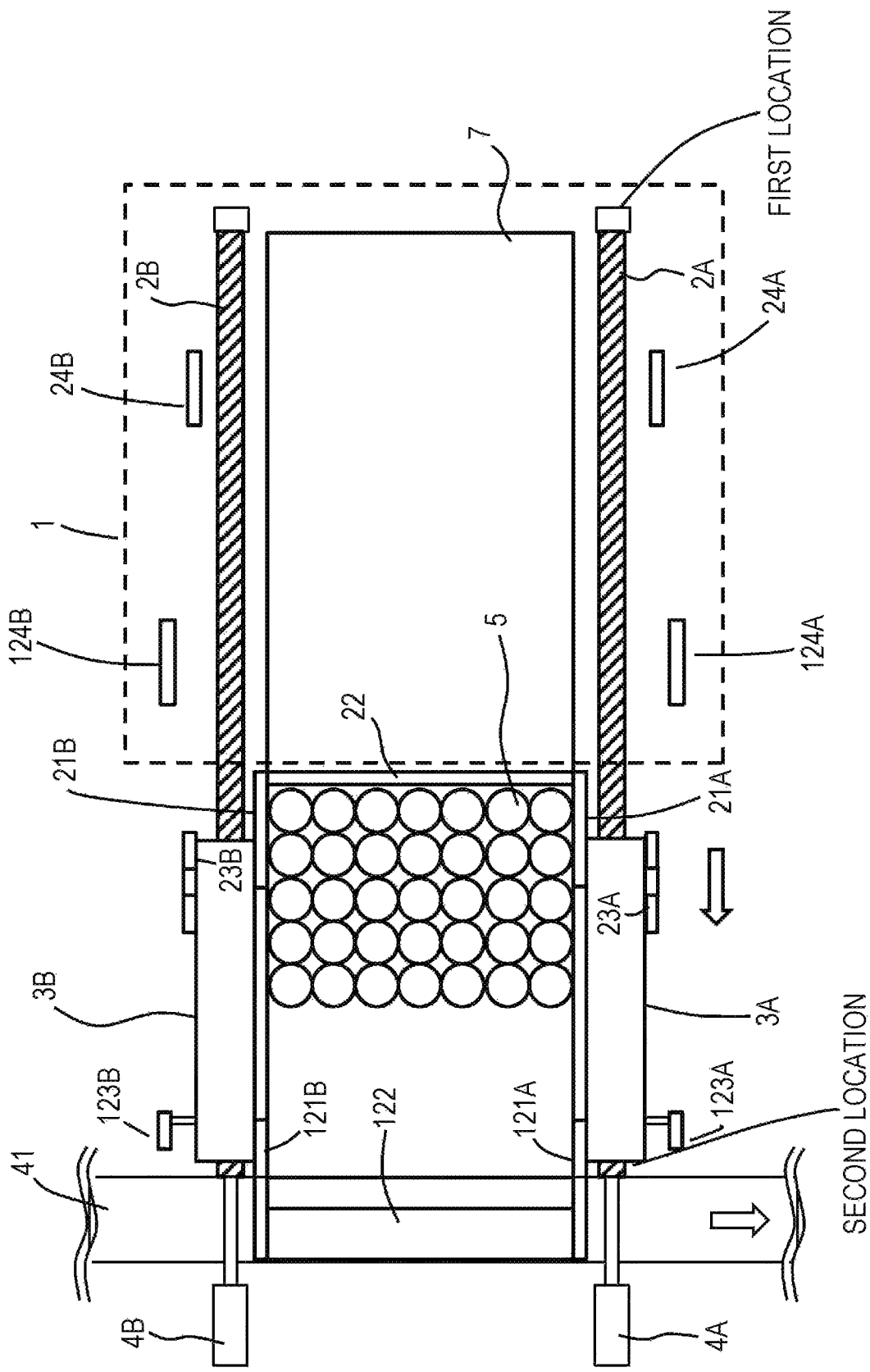
FIG. 18 is a schematic top view of the conveyance device according to the second embodiment.
Figure 19:
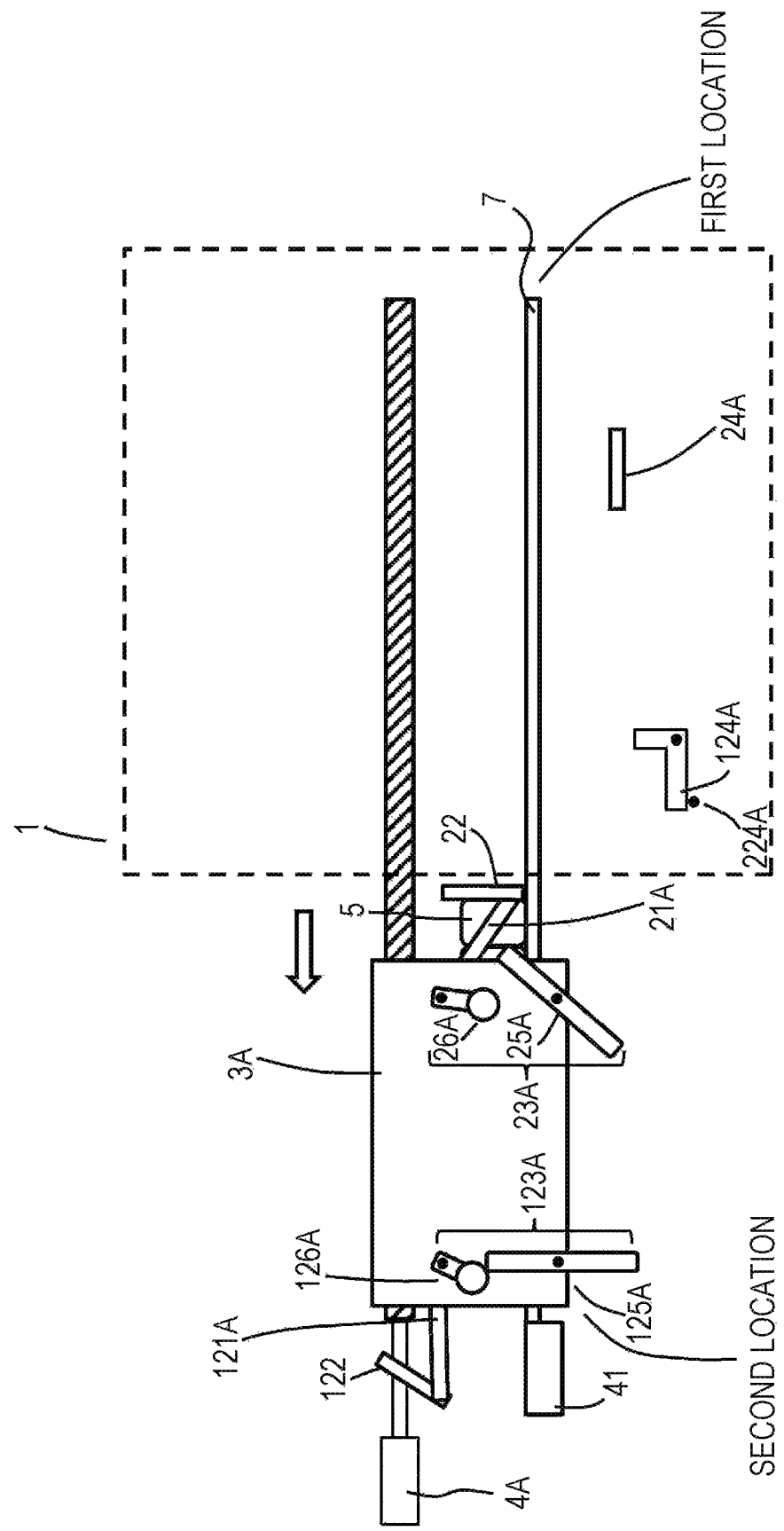
FIG. 19 is a schematic side view of the conveyance device according to the second embodiment.

As illustrated in FIG. 16 and FIG. 17, after the first contact member 22 descends, the moving members 3A and 3B move in the direction toward the second location outside the chamber 1 to push the article 5 by using the first contact member 22, thereby moving the article 5 in the direction toward the second location outside the chamber 1. Here, as illustrated in FIG. 18 and FIG. 19, there may be a circumstance in which it is not possible, even when the moving members 3A and 3B move to the second location, to move the article 5 that is on the table 7 onto a conveyor 41 disposed on the side of the second location so as to be adjacent to the table 7.

Figure 20:
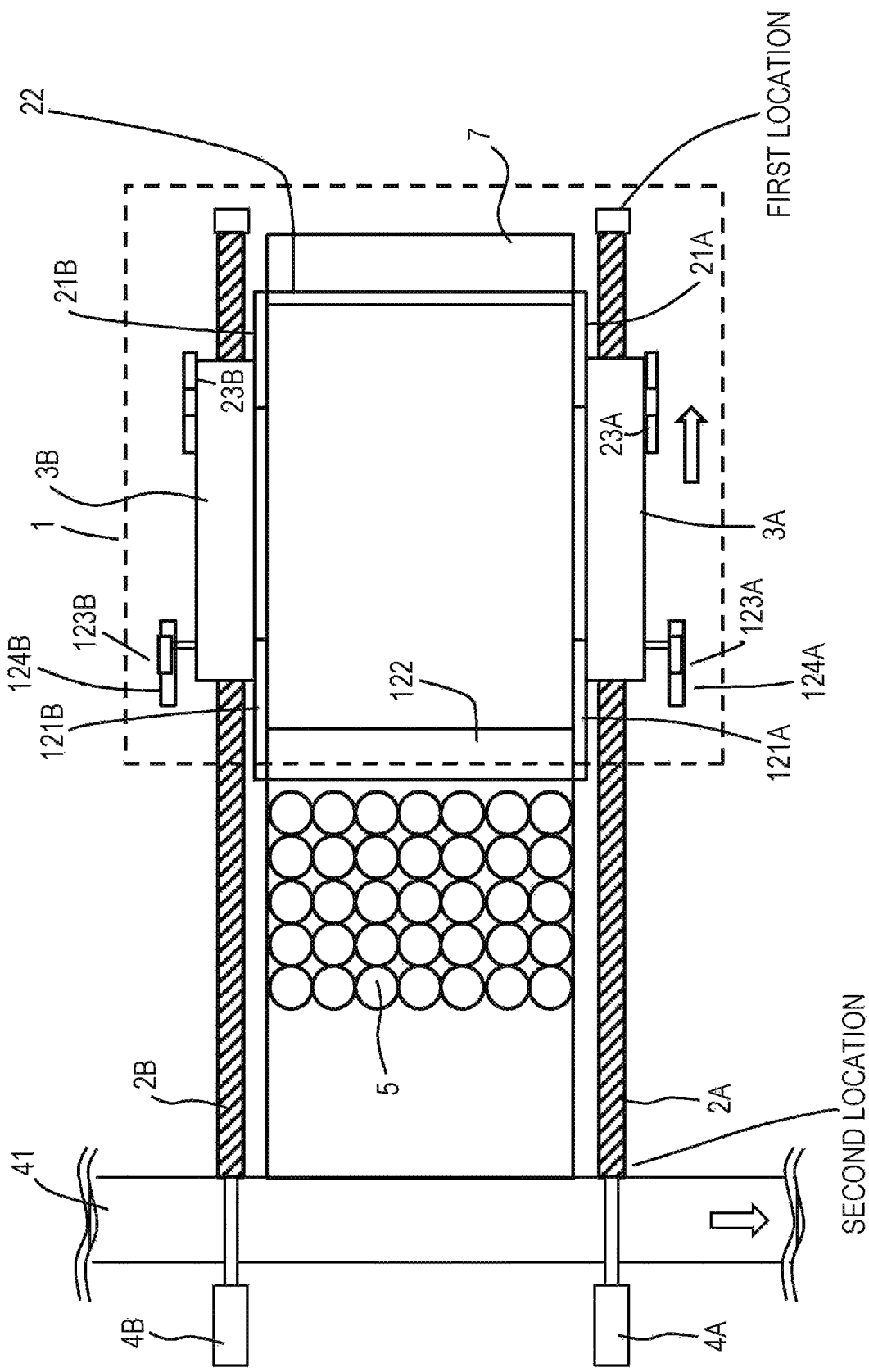
FIG. 20 is a schematic top view of the conveyance device according to the second embodiment.
Figure 21:
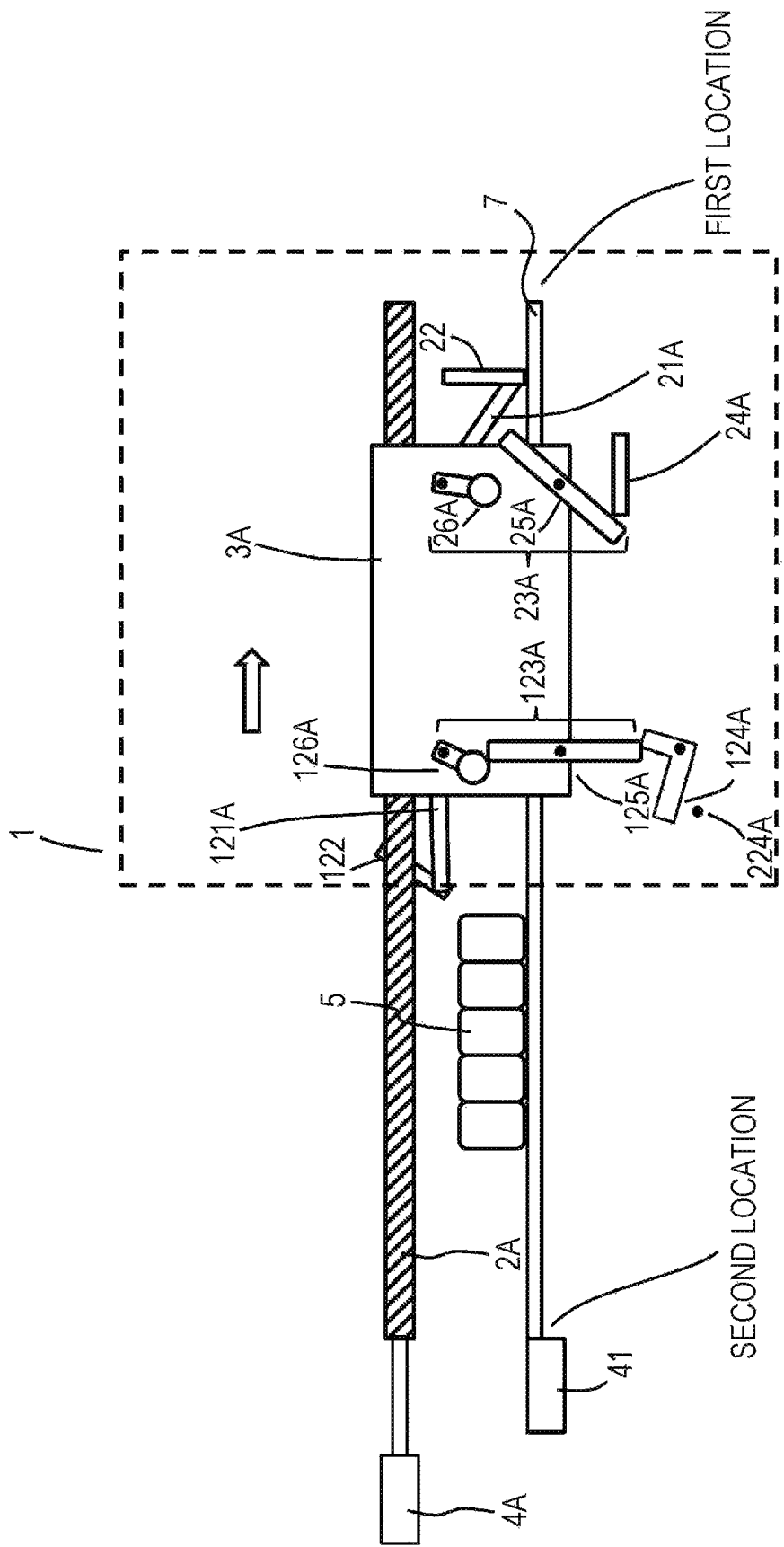
FIG. 21 is a schematic side view of the conveyance device according to the second embodiment.
Figure 22:
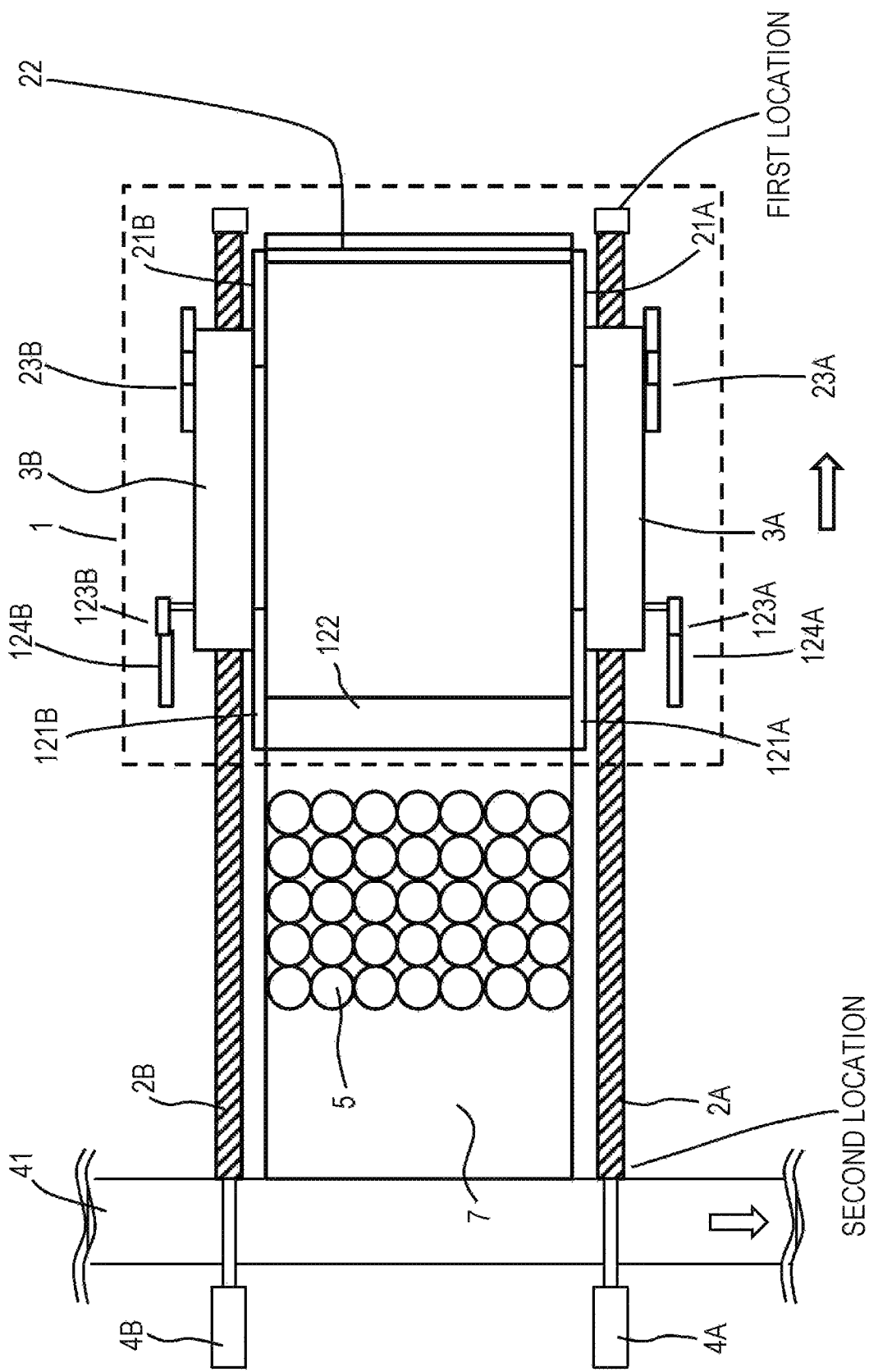
FIG. 22 is a schematic top view of the conveyance device according to the second embodiment.
Figure 23:
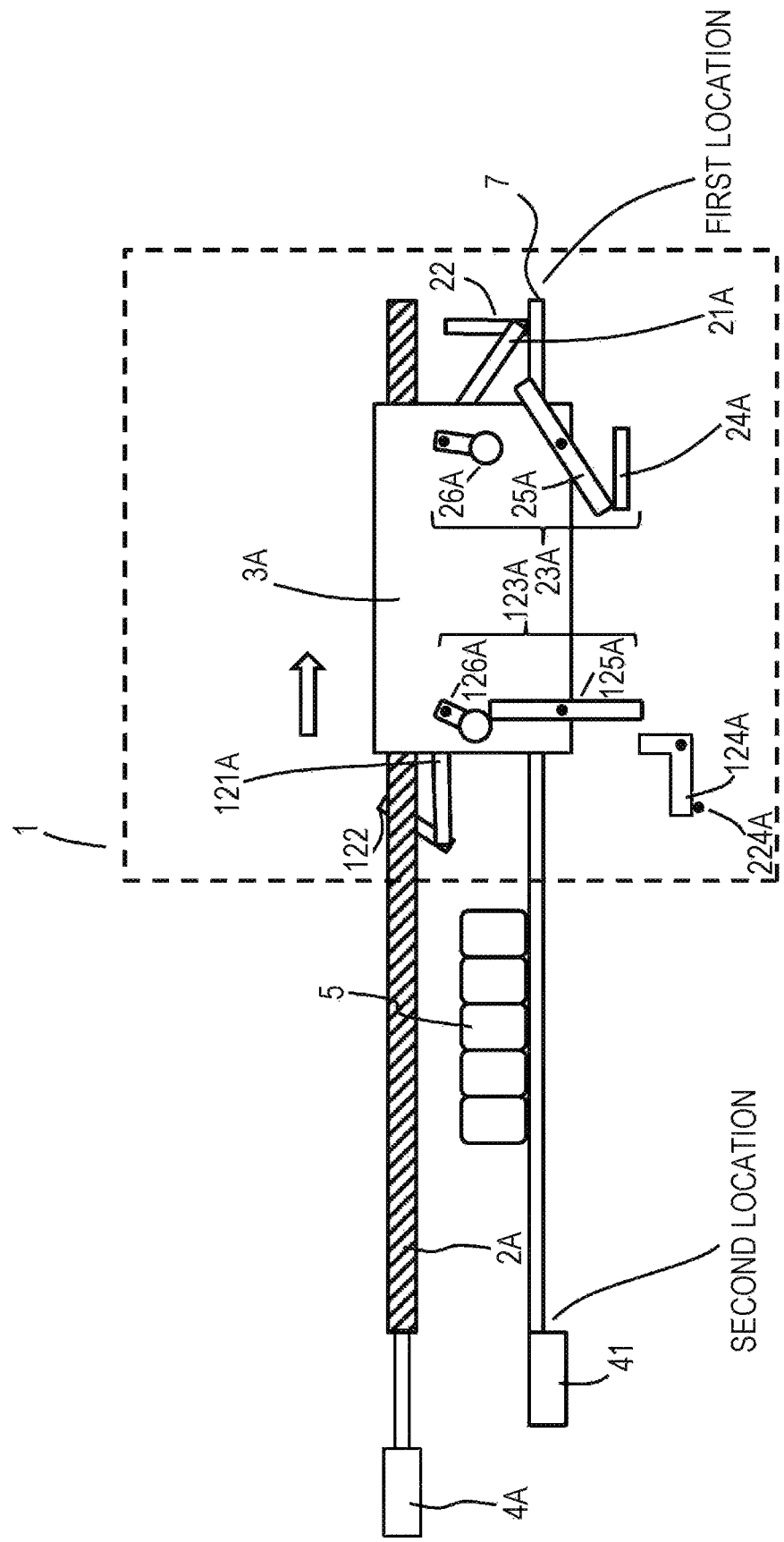
FIG. 23 is a schematic side view of the conveyance device according to the second embodiment.
Figure 24:
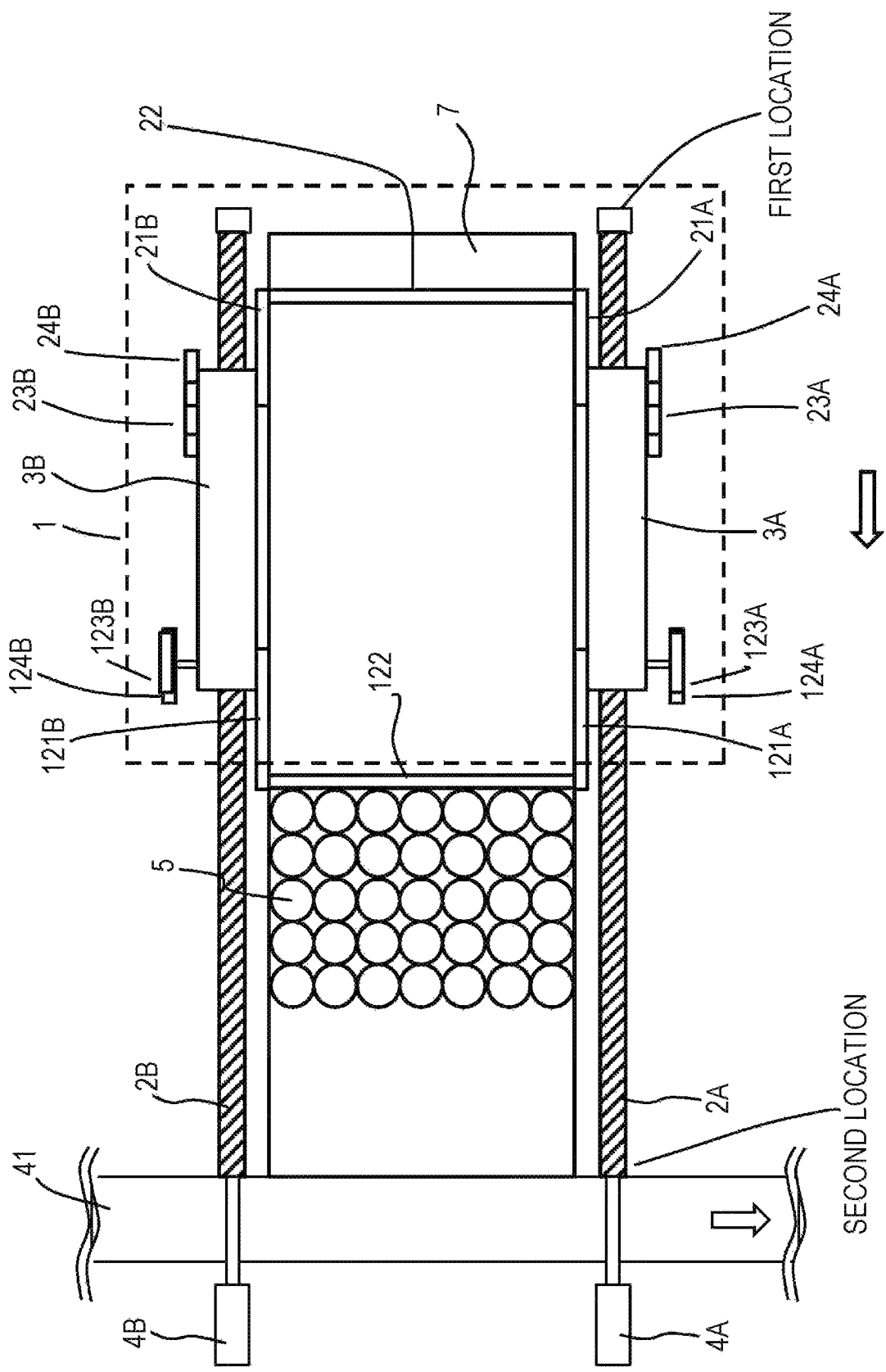
FIG. 24 is a schematic top view of the conveyance device according to the second embodiment.
Figure 25:
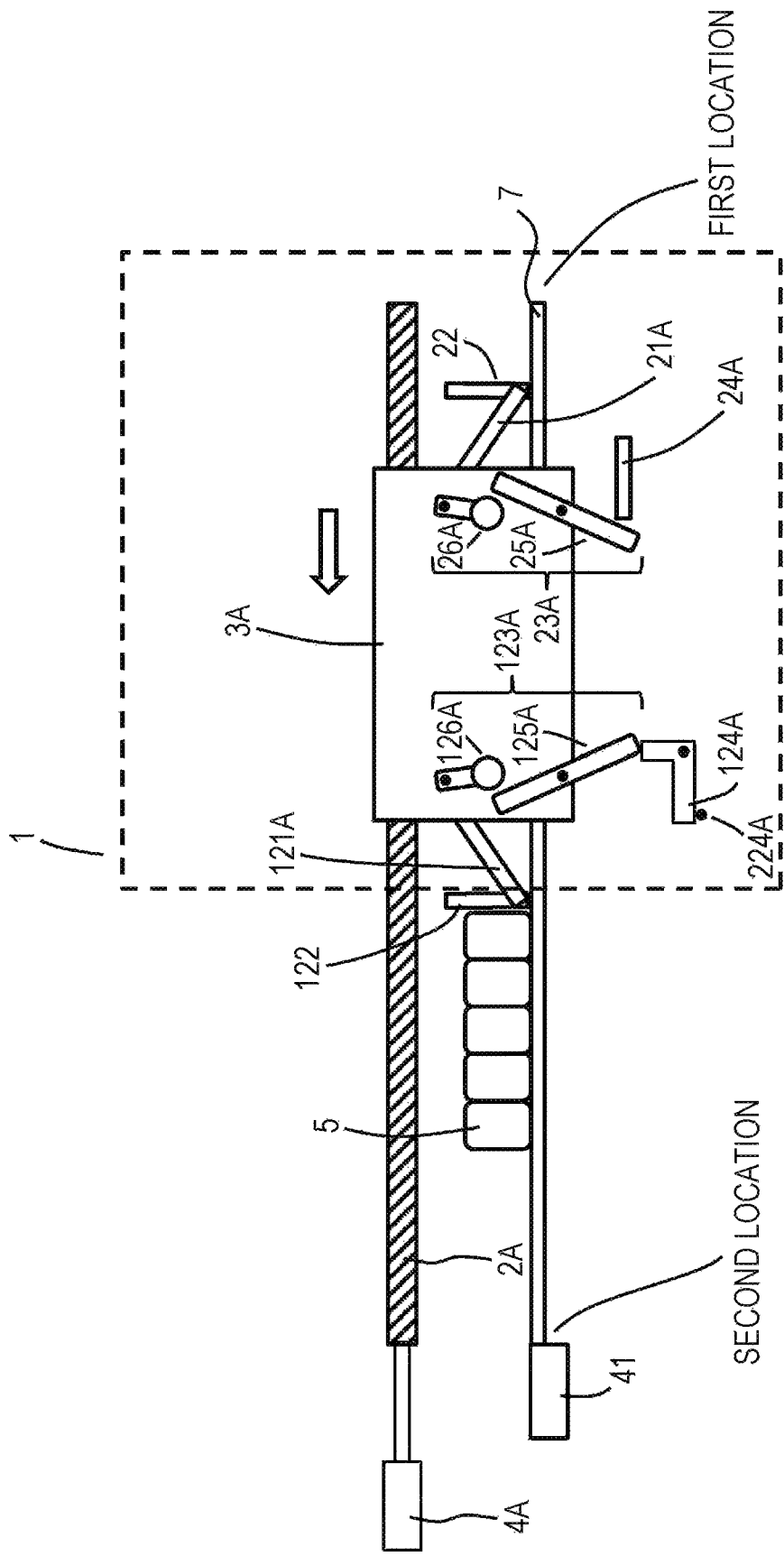
FIG. 25 is a schematic side view of the conveyance device according to the second embodiment.

In such a circumstance, as illustrated in FIG. 20 and FIG. 21, the moving members 3A and 3B move again in the direction toward the first location at the back portion of the chamber 1. As illustrated in FIG. 22 and FIG. 23, the moving members 3A and 3B move until the second inhibiting mechanisms 123A and 123B are positioned on the side of the first location with respect to the second dogs 124A and 124B. Next, as illustrated in FIG. 24 and FIG. 25, when the moving members 3A and 3B move in the direction toward the second location outside the chamber 1, the rotation of the second dog 124A pushed by the first rotary member 125A of the second inhibiting mechanism 123A is suppressed by the rotation constraining member 224A. Thus, the second dog 124A whose rotation is disabled pushes and rotates the first rotary member 125A of the second inhibiting mechanism 123A to deactivate the second inhibiting mechanism 123A. The second dog 124B also deactivates the second inhibiting mechanism 123B in the same manner. Consequently, inhibition of the rotation of the second shafts 121A and 121B is deactivated, and the second contact member 122 descends together with the second shafts 121A and 121B toward the table 7.

Figure 26:
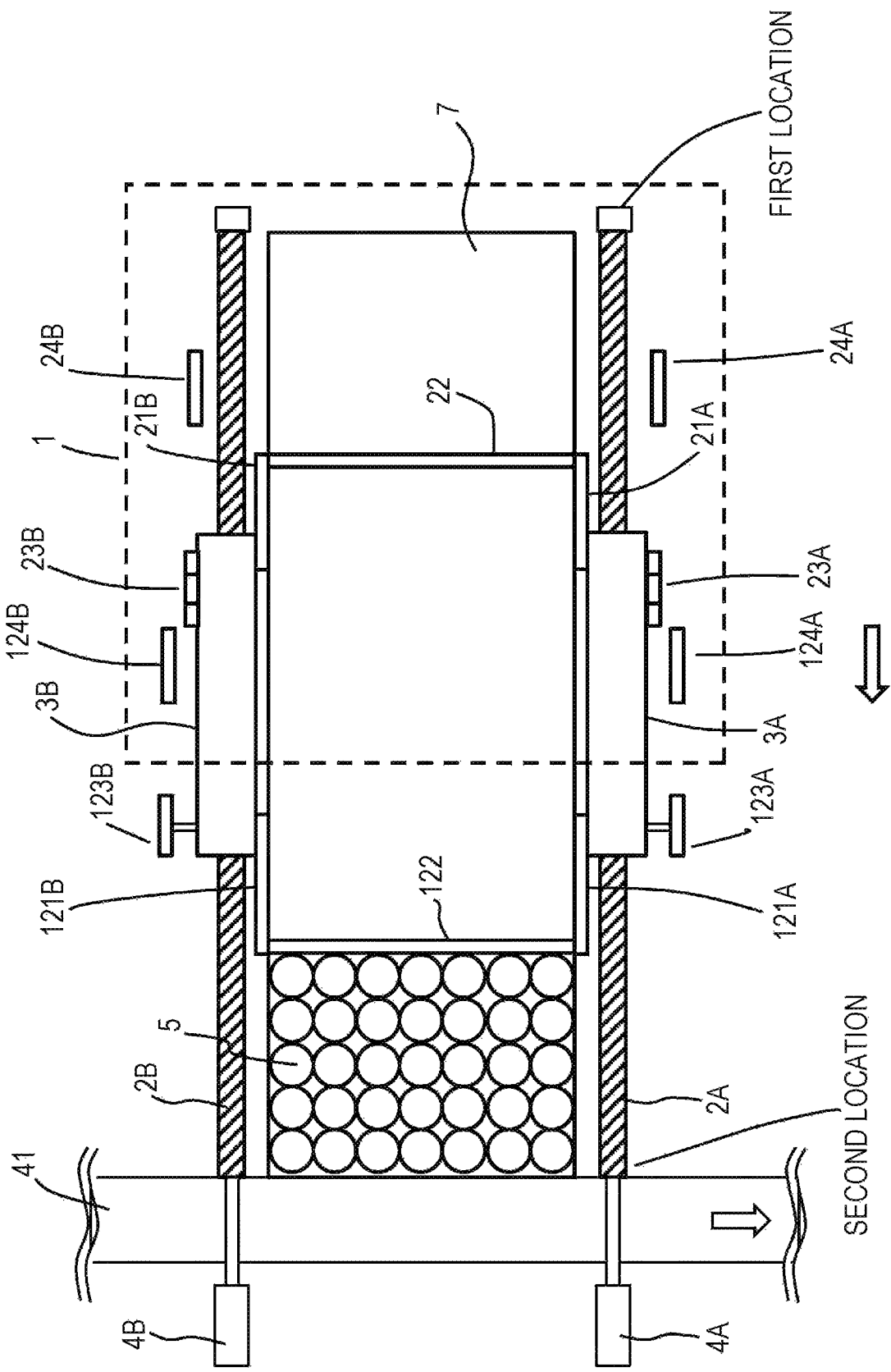
FIG. 26 is a schematic top view of the conveyance device according to the second embodiment.
Figure 27:
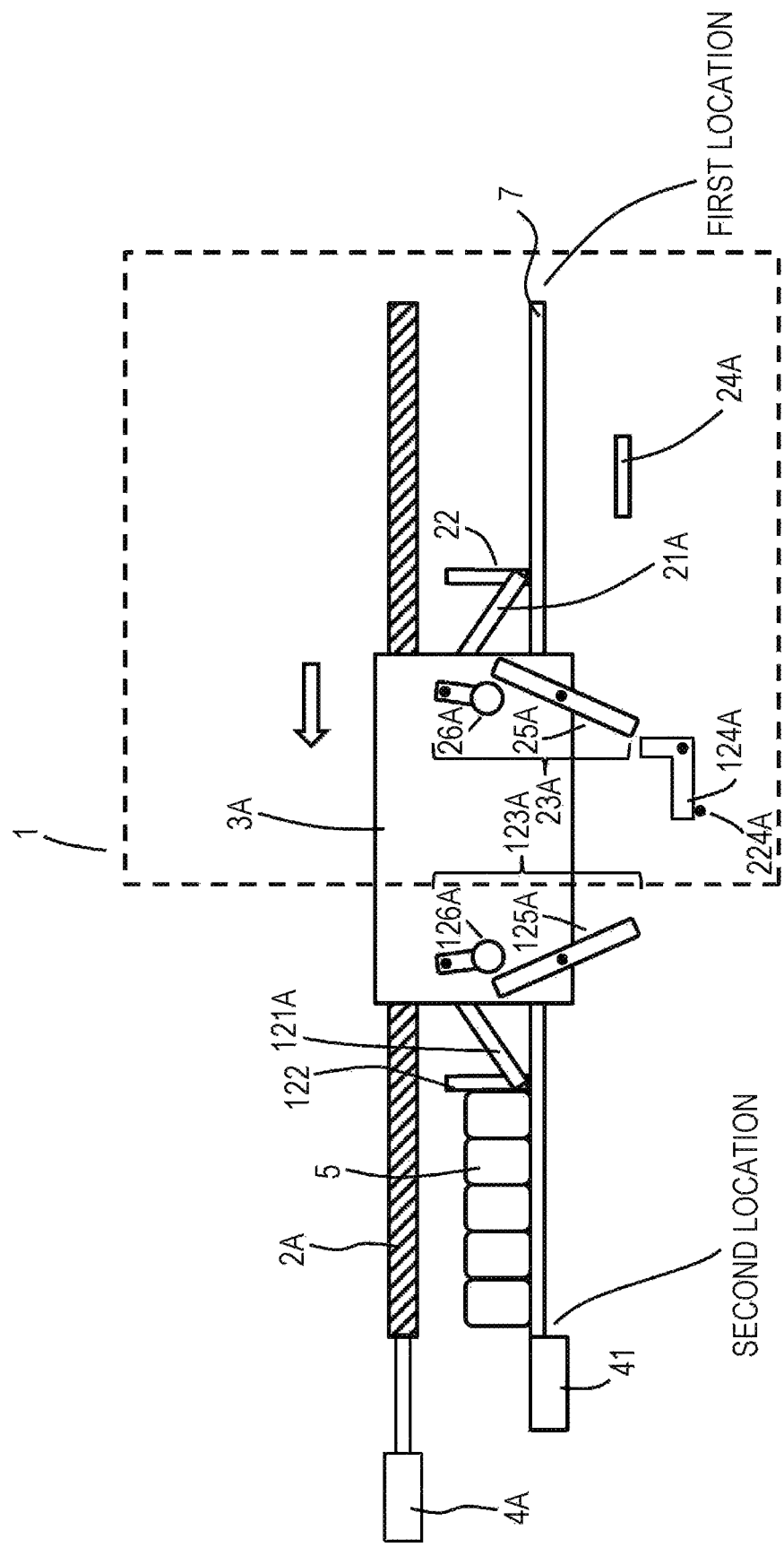
FIG. 27 is a schematic side view of the conveyance device according to the second embodiment.
Figure 28:
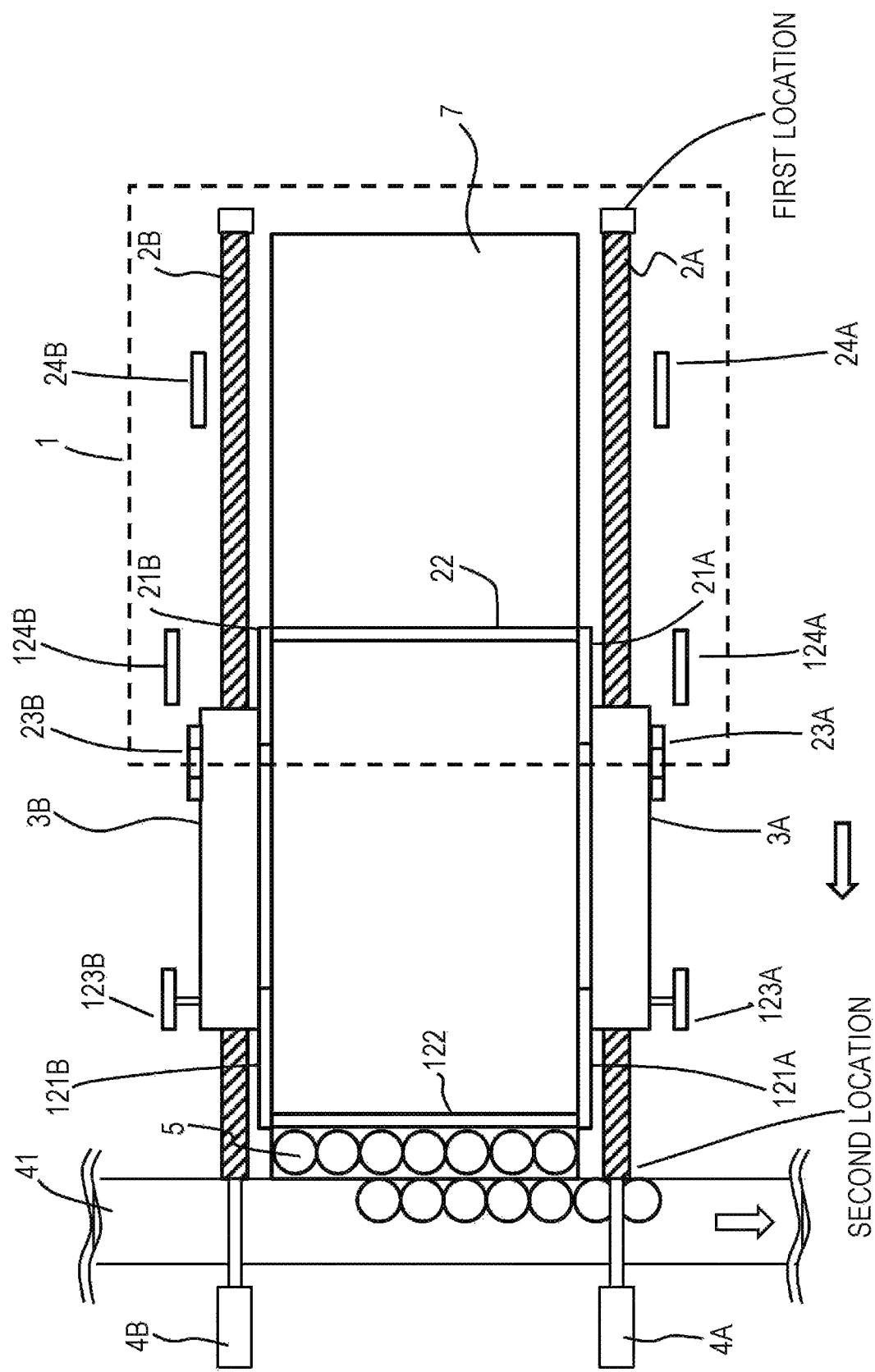
FIG. 28 is a schematic top view of the conveyance device according to the second embodiment.
Figure 29:
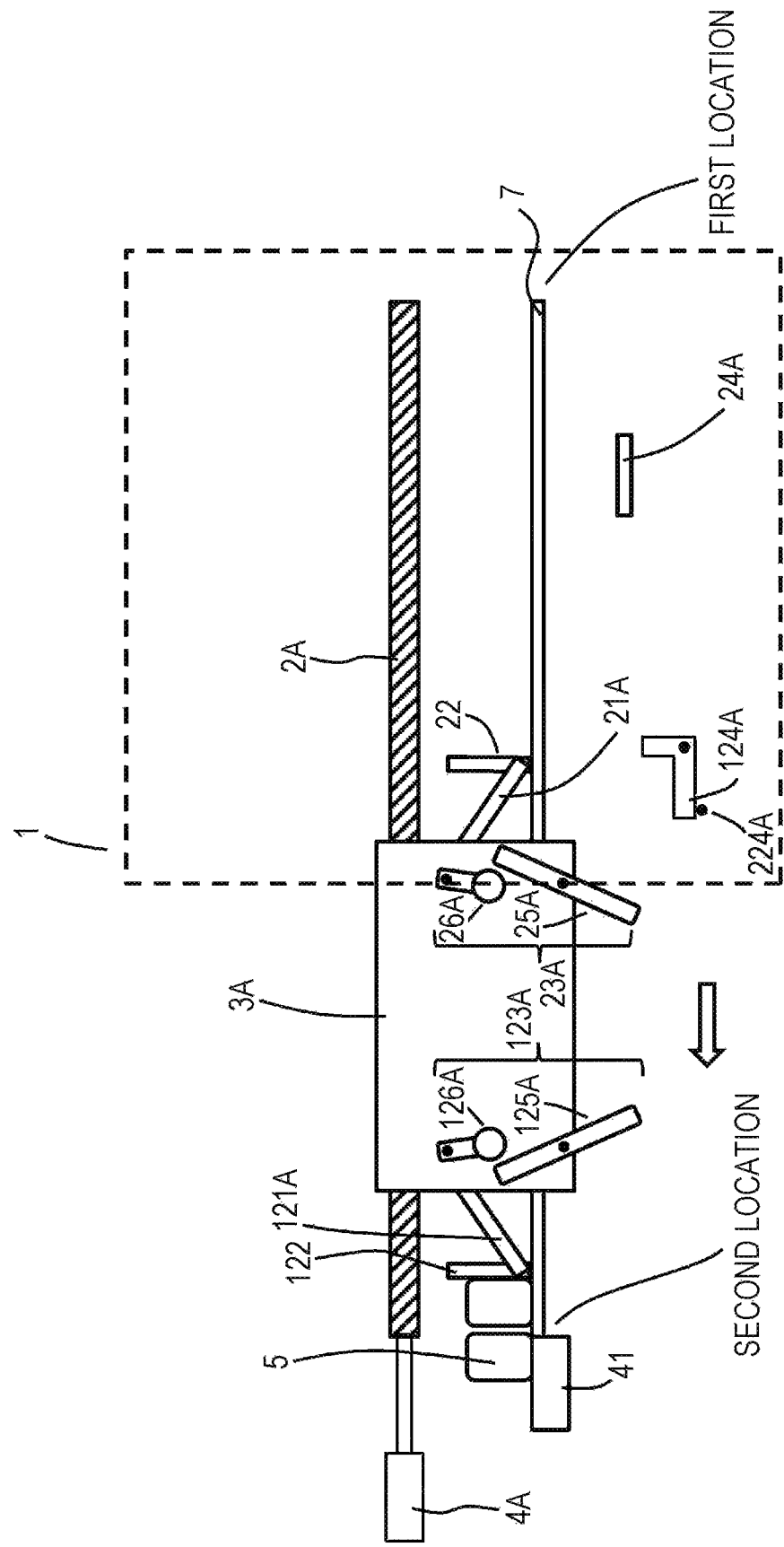
FIG. 29 is a schematic side view of the conveyance device according to the second embodiment.

As illustrated in FIG. 26 and FIG. 27, after the second contact member 122 descends, the moving members 3A and 3B move in the direction toward the second location outside the chamber 1 to push the article 5 by using the second contact member 122, thereby moving the article in the direction toward the second location. The second contact member 122 is connected to the moving members 3A and 3B on the side of the second location and is thus capable of moving the article 5 that is on the table 7 onto the conveyor 41 disposed on the side of the second location so as to be adjacent to the table 7, as illustrated in FIG. 28 and FIG. 29.

Third Embodiment

Figure 30:
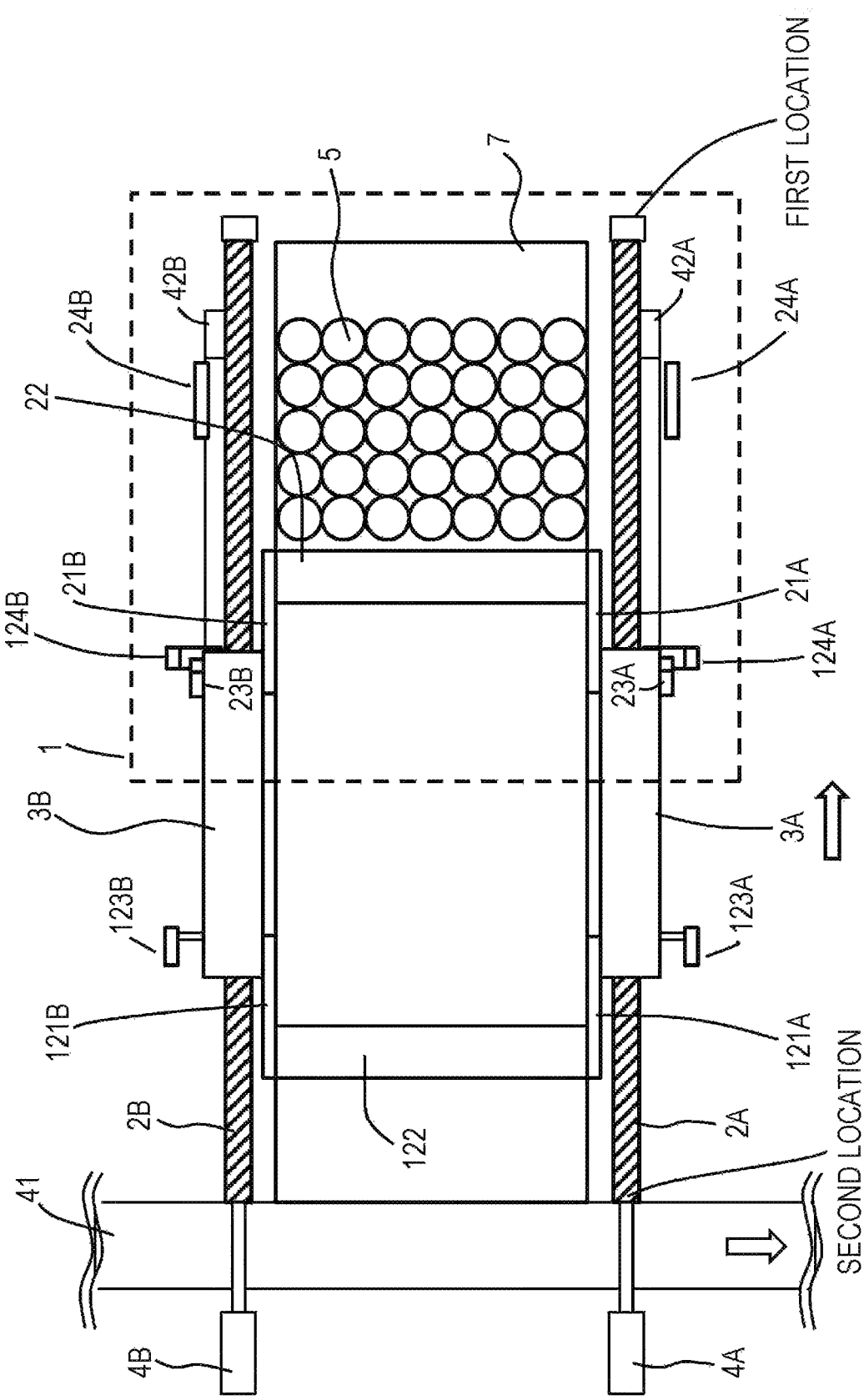
FIG. 30 is a schematic top view of a conveyance device according to a third embodiment.
Figure 31:
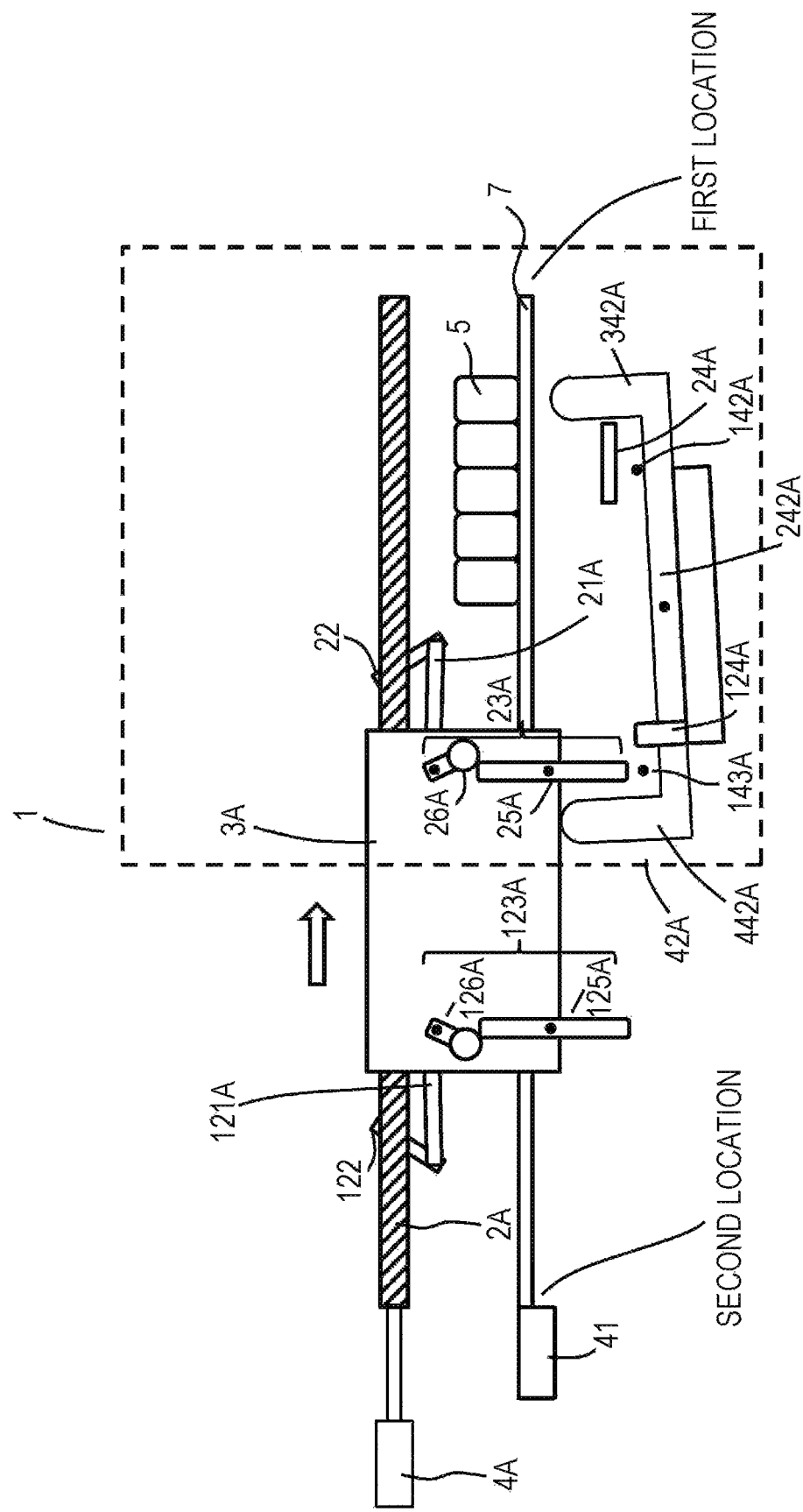
FIG. 31 is a schematic side view of the conveyance device according to the third embodiment.

In the conveyance device according to a third embodiment, as illustrated in FIG. 30 and FIG. 31, the second dog 124A is held by a dog holding member 42A. The dog holding member 42A includes, for example, a horizontal shaft portion 242A, a first contact portion 342A that vertically projects on the side of the first location with respect to the horizontal shaft portion 242A, the first contact portion 342A being capable of coming into contact with the moving member 3A, and a second contact portion 442A that vertically projects on the side of the second location with respect to the horizontal shaft portion 242A, the second contact portion 442A being capable of coming into contact with the moving member 3A. The first and second contact portions 342A and 442A project in an identical direction with respect to the horizontal shaft portion 242A.

The horizontal shaft portion 242A of the dog holding member 42A includes a rotating shaft, and the dog holding member 42A is rotatable. The second dog 124A is connected, at the horizontal shaft portion 242A of the dog holding member 42A, between the rotating shaft and the second contact portion 442A. The rotating shaft of the dog holding member 42A may be positioned at, for example, the centroid of the dog holding member 42A and the second dog 124A. In response to the rotation of the horizontal shaft portion 242A, one of the first and second contact portions 342A and 442A approaches the moving member 3A, and the other moves away from the moving member 3A.

When the moving member 3A comes into contact with the second contact portion 442A of the dog holding member 42A, the dog holding member 42A descends on the side of the second location, and the second dog 124A does not deactivate the second inhibiting mechanism 123A. In contrast, when the moving member 3A comes into contact with the first contact portion 342A of the dog holding member 42A, the dog holding member 42A ascends on the side of the second location, and the second dog 124A deactivates the second inhibiting mechanism 123A.

The first contact portion 342A has a size with which the first contact portion 342A comes into contact with the moving member 3A when positioned closest to the moving member 3A. The second contact portion 442A has a size with which the second contact portion 442A comes into contact with the moving member 3A when positioned closest to the moving member 3A. The second dog 124A has a size with which, when the first contact portion 342A of the dog holding member 42A is pushed by the moving member 3A and rotated such that the dog holding member 42A ascends on the side of the second location, the second dog 124A comes into contact with the second inhibiting mechanism 123A to deactivate the second inhibiting mechanism 123A.

The conveyance device according to the third embodiment may further include rotation constraining members 142A and 143A that constrain the rotation of the dog holding member 42A. The rotation constraining member 142A constrains the amount of ascending of the first contact portion 342A of the dog holding member 42A. The rotation constraining member 143A constrains the amount of ascending of the second contact portion 442A of the dog holding member 42A. As the rotation constraining members 142A and 143A, fixing pins or the like that come into contact with the horizontal shaft portion 242A of the rotated dog holding member 42A are usable. The rotational resistance of the dog holding member 42A is greater than the rotational resistance of the first rotary member 125A included in the second inhibiting mechanism 123A. In addition, for example, the total weight of the dog holding member 42A and the second dog 124A is greater than the weight of the first rotary member 125A. The same is true of the second dog 124B and the dog holding member 42B holding the second dog 124B.

The other components of the conveyance device according to the third embodiment are identical to those of the conveyance device according to the second embodiment.

Figure 32:
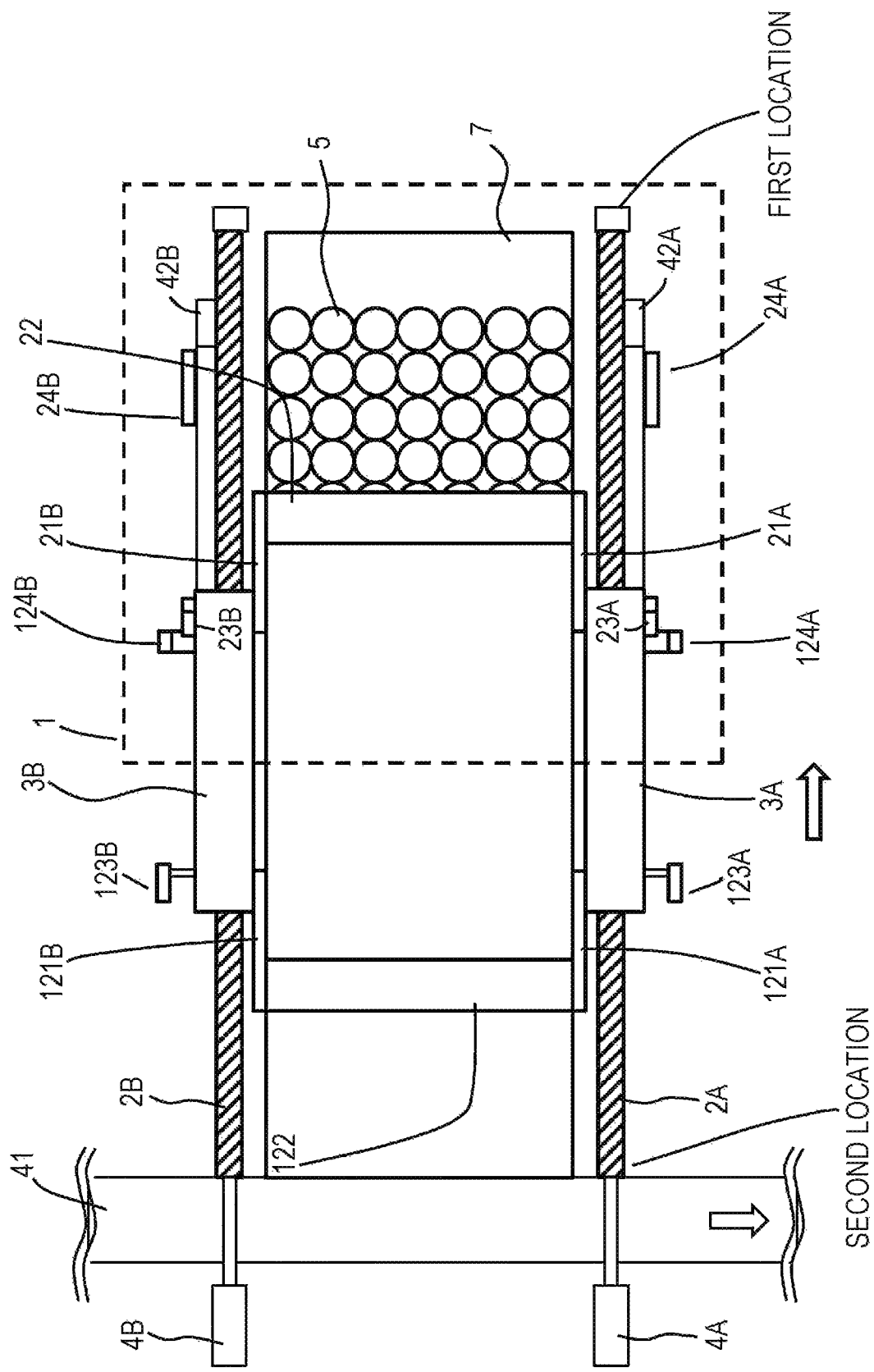
FIG. 32 is a schematic top view of the conveyance device according to the third embodiment.
Figure 33:
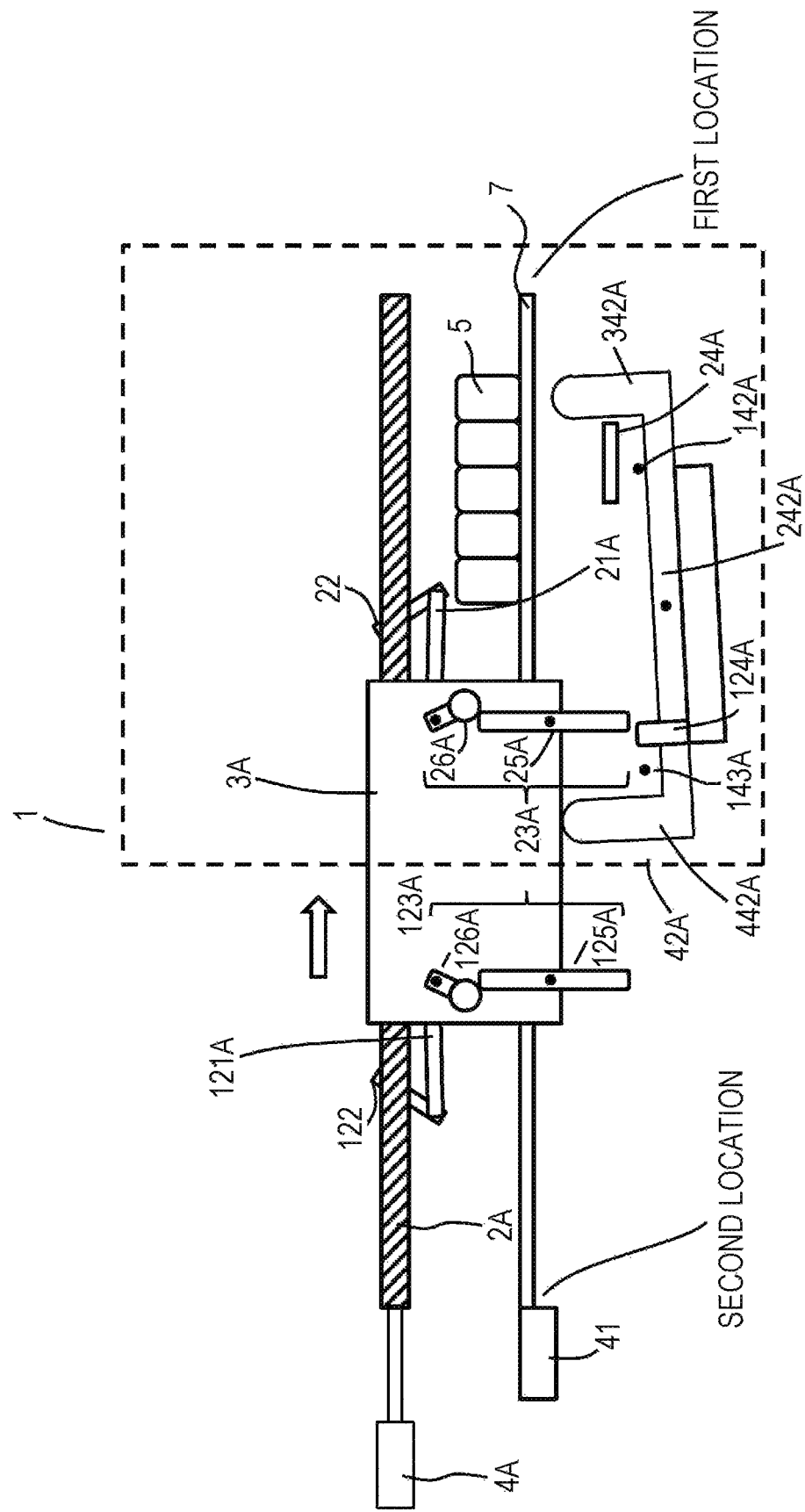
FIG. 33 is a schematic side view of the conveyance device according to the third embodiment.

Hereinafter, a method by which the conveyance device according to the third embodiment conveys out the article 5 that is inside the chamber 1 will be described. First, the moving members 3A and 3B move in the direction toward the first location at the back portion of the chamber 1. At this time, the second contact portion 442A of the dog holding member 42A is pushed by the moving member 3A and descends. The same is true of the dog holding member 42B. As illustrated in FIG. 32, and FIG. 33, the first inhibiting mechanisms 23A and 23B respectively pass by the second dogs 124A and 124B without coming into contact with the second dogs 124A and 124B.

Figure 34:
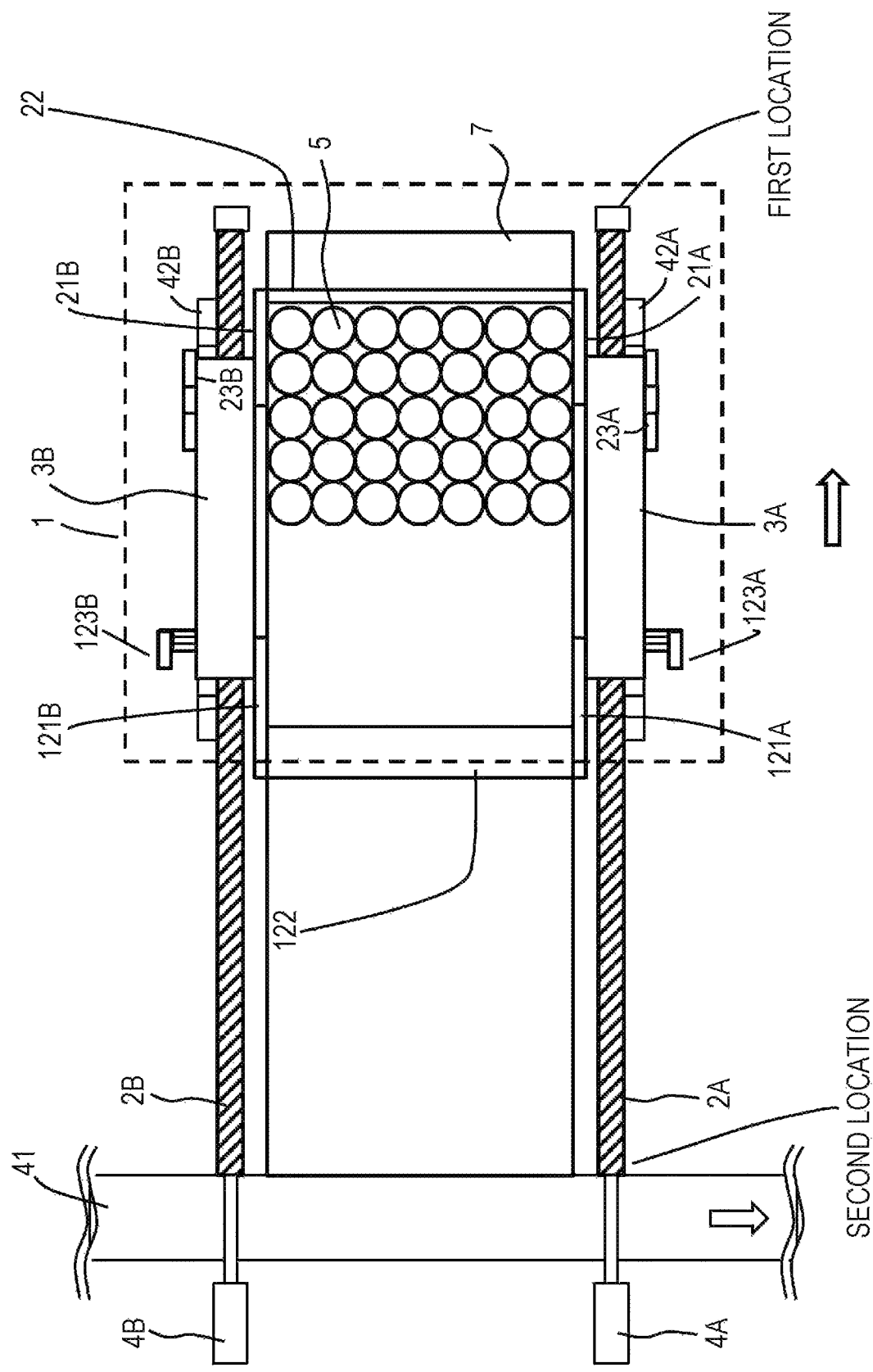
FIG. 34 is a schematic top view of the conveyance device according to the third embodiment.
Figure 35:
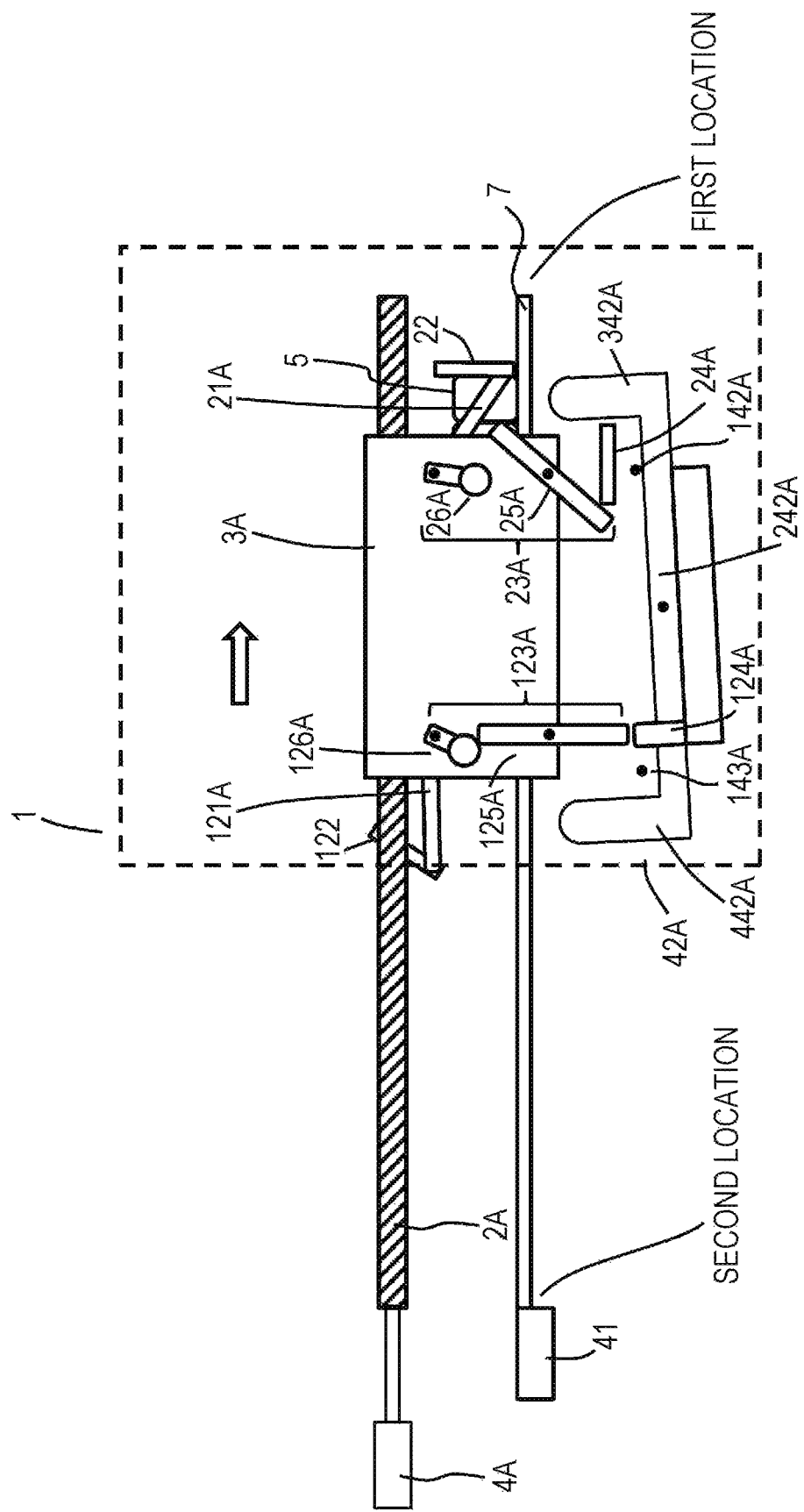
FIG. 35 is a schematic side view of the conveyance device according to the third embodiment.

As illustrated in FIG. 34 and FIG. 35, the first inhibiting mechanisms 23A and 23B respectively come into contact, at the back portion of the chamber 1 and on the side of the second location with respect to a location where the moving member 3A comes into contact with the first contact portion 342A, with the first dogs 24A and 24B, and inhibition of the rotation of the first shafts 21A and 21B is deactivated. Thus, the first contact member 22 descends together with the first shafts 21A and 21B toward the table 7. The second inhibiting mechanism 123A passes above the second dog 124A; however, the second inhibiting mechanism 123A is not deactivated because the second dog 124A is held by the dog holding member 42A so as not to reach the first rotary member 125A included in the second inhibiting mechanism 123A. The same is true of the second inhibiting mechanism 123B.

Figure 36:
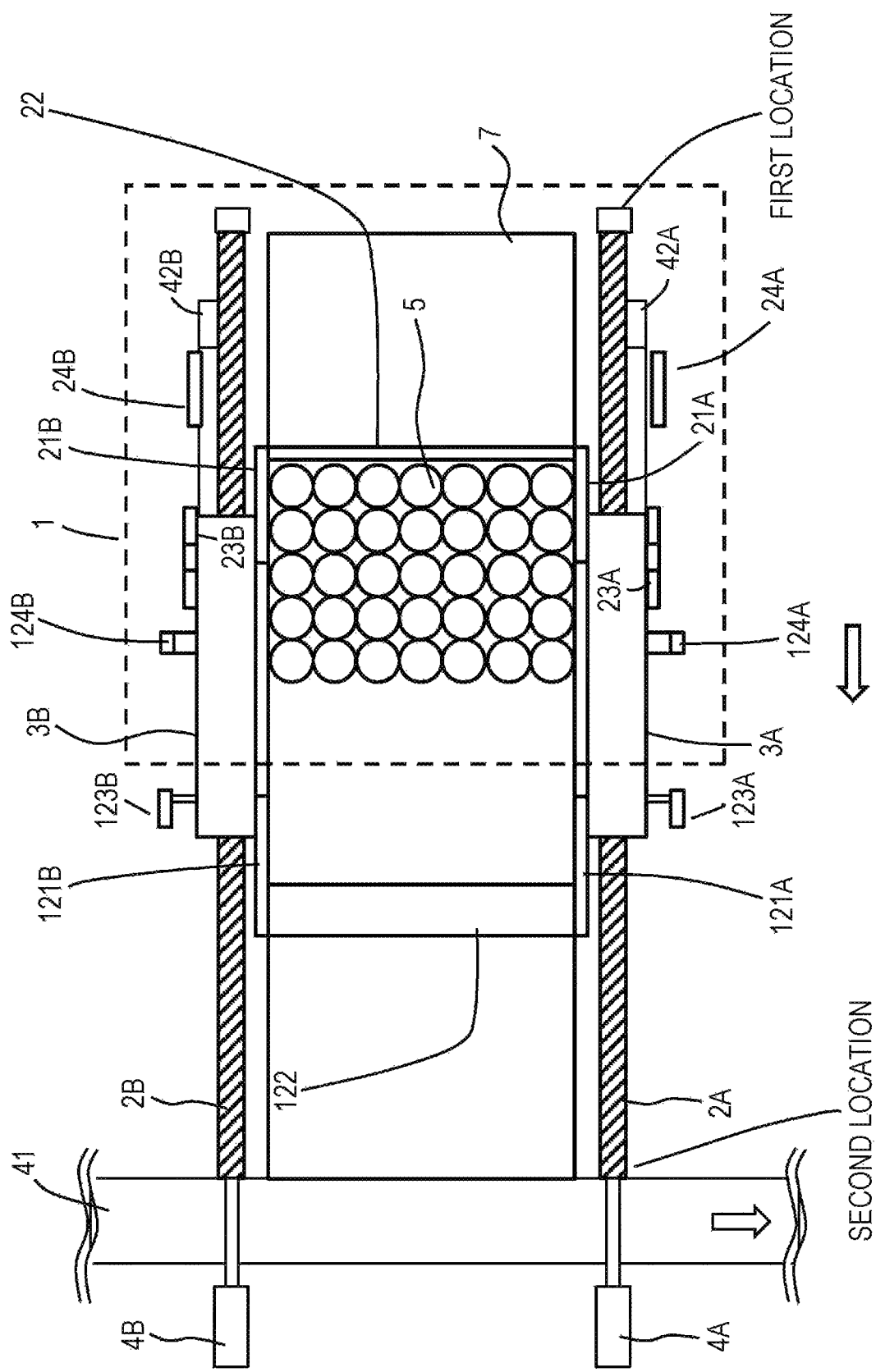
FIG. 36 is a schematic top view of the conveyance device according to the third embodiment.
Figure 37:
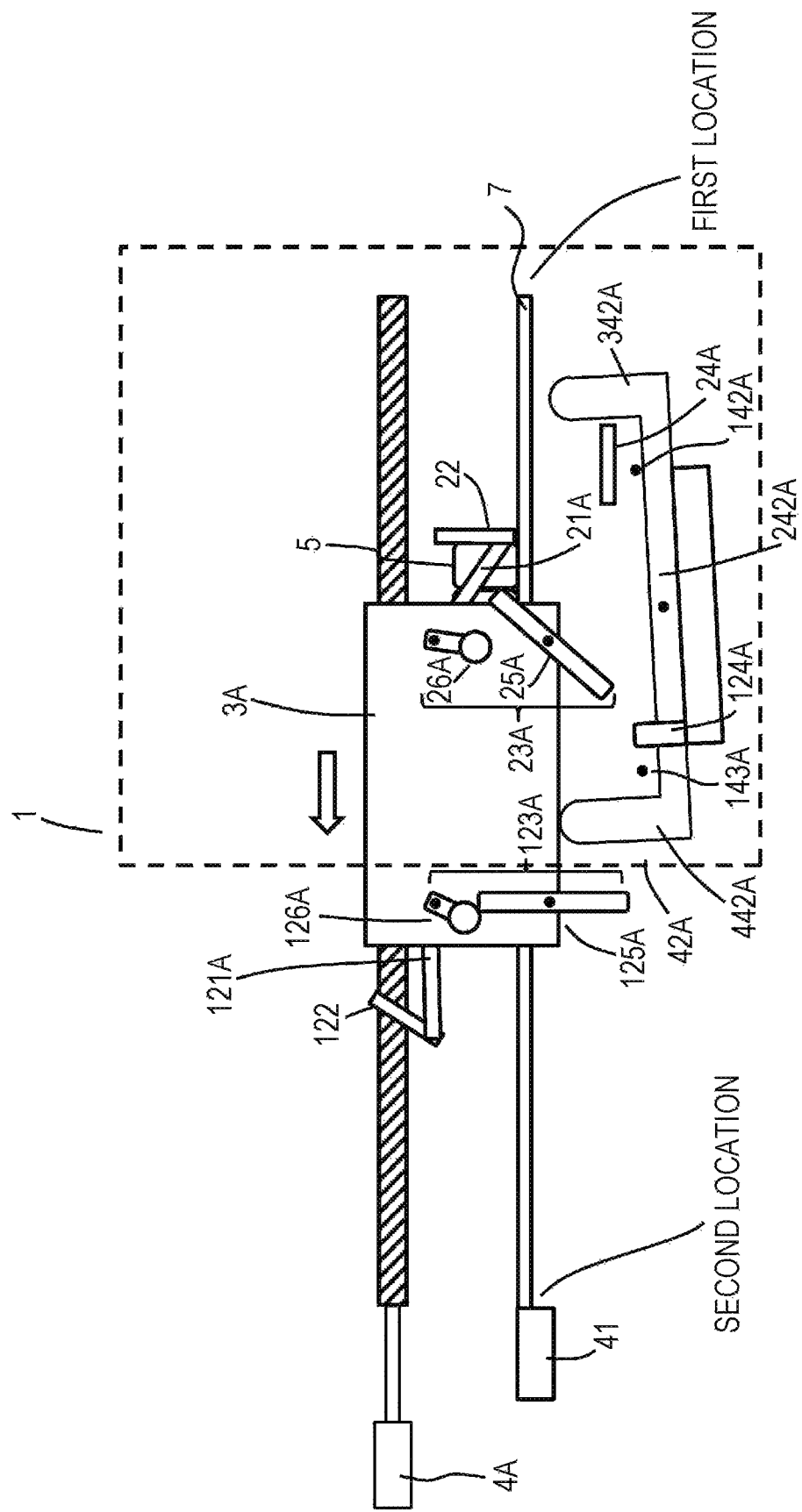
FIG. 37 is a schematic side view of the conveyance device according to the third embodiment.
Figure 38:
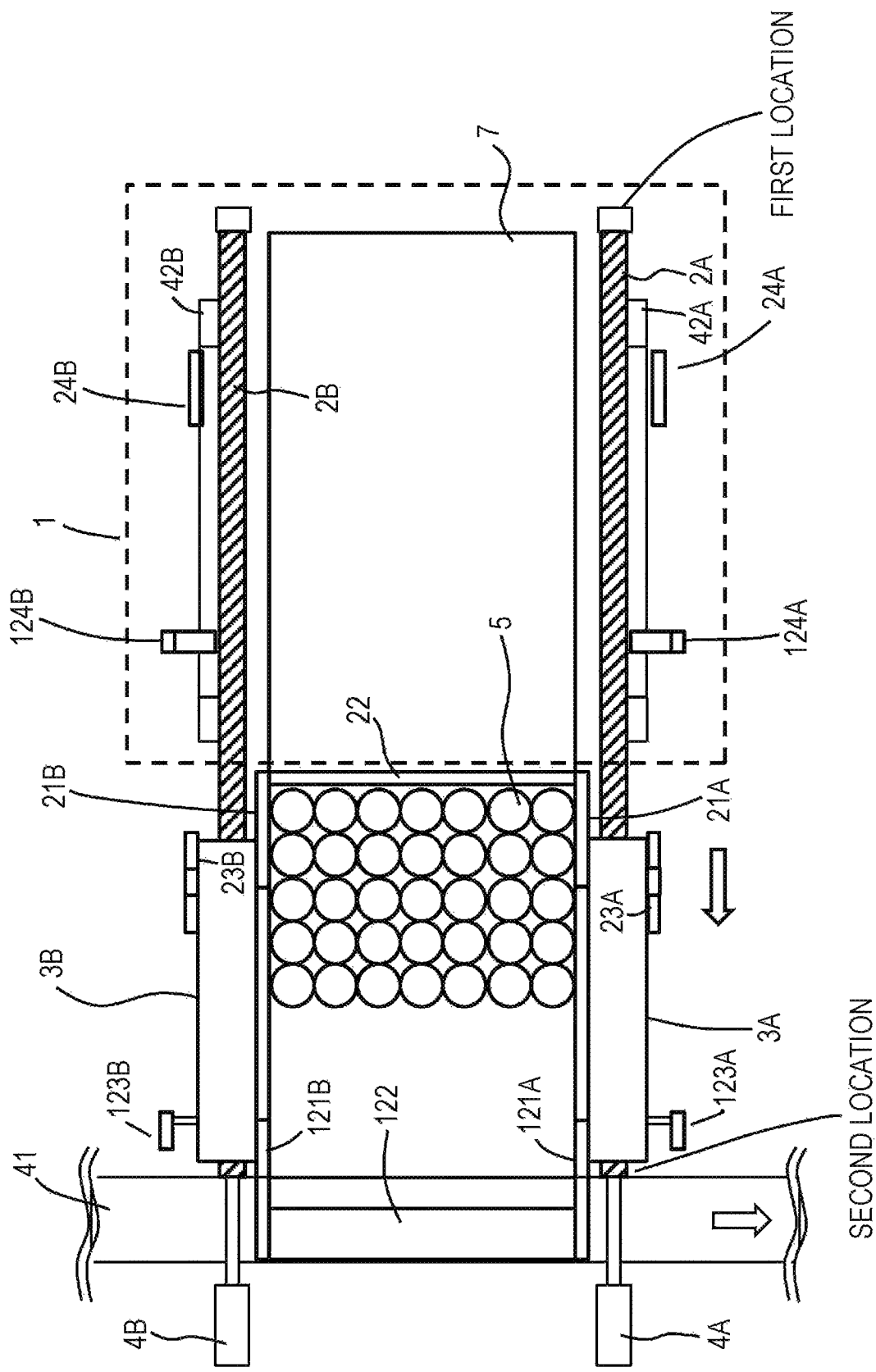
FIG. 38 is a schematic top view of the conveyance device according to the third embodiment.
Figure 39:
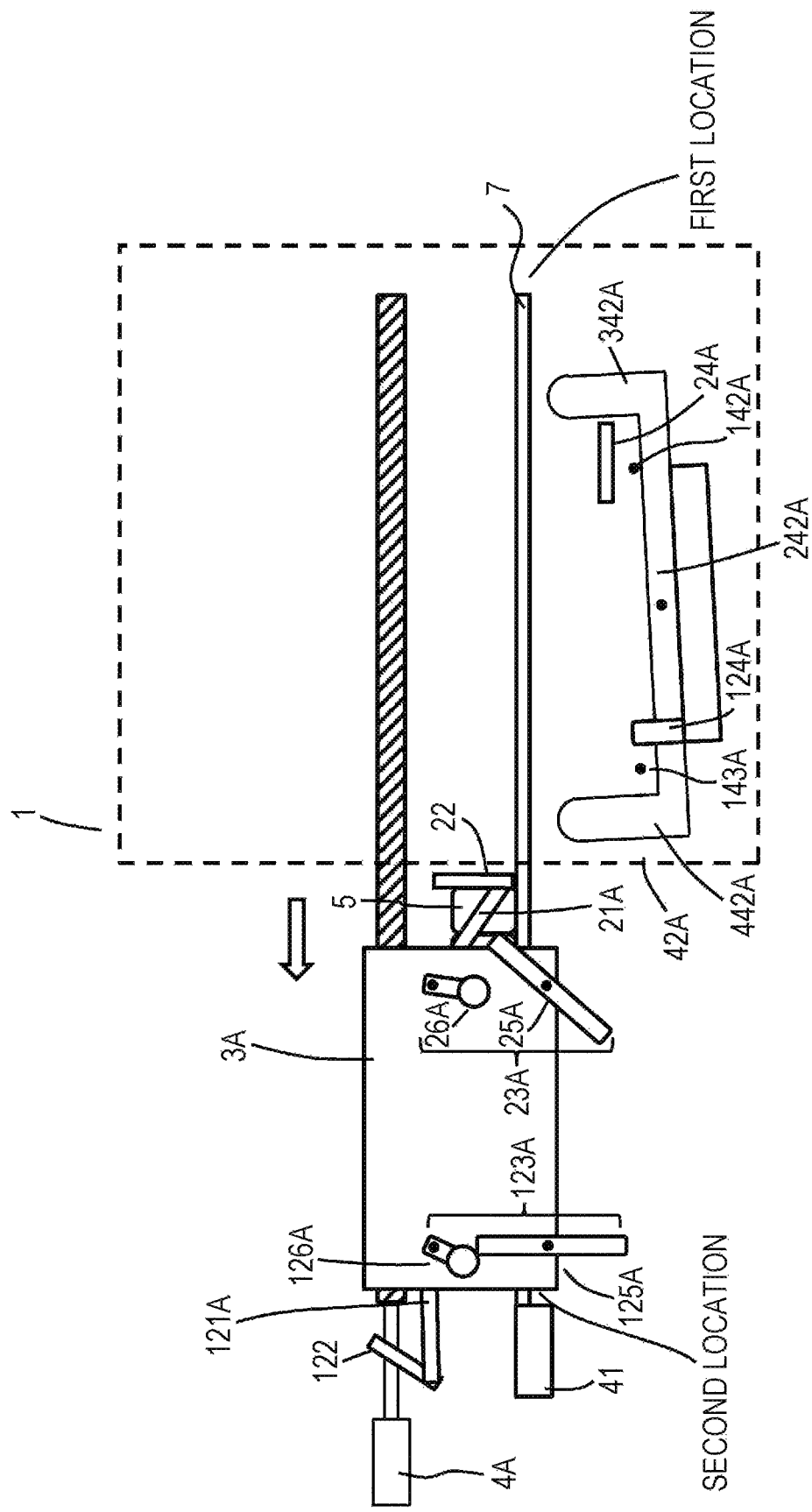
FIG. 39 is a schematic side view of the conveyance device according to the third embodiment.

As illustrated in FIG. 36 and FIG. 37, after the first contact member 22 descends, the moving members 3A and 3B move in the direction toward the second location outside the chamber 1 to push the article 5 by using the first contact member 22, thereby moving the article 5 in the direction toward the second location outside the chamber 1. Here, as illustrated in FIG. 38 and FIG. 39, there may be a circumstance in which it is not possible, even when the moving members 3A and 3B move to the second location, to move the article 5 that is on the table 7 onto the conveyor 41 disposed on the side of the second location so as to be adjacent to the table 7.

Figure 40:
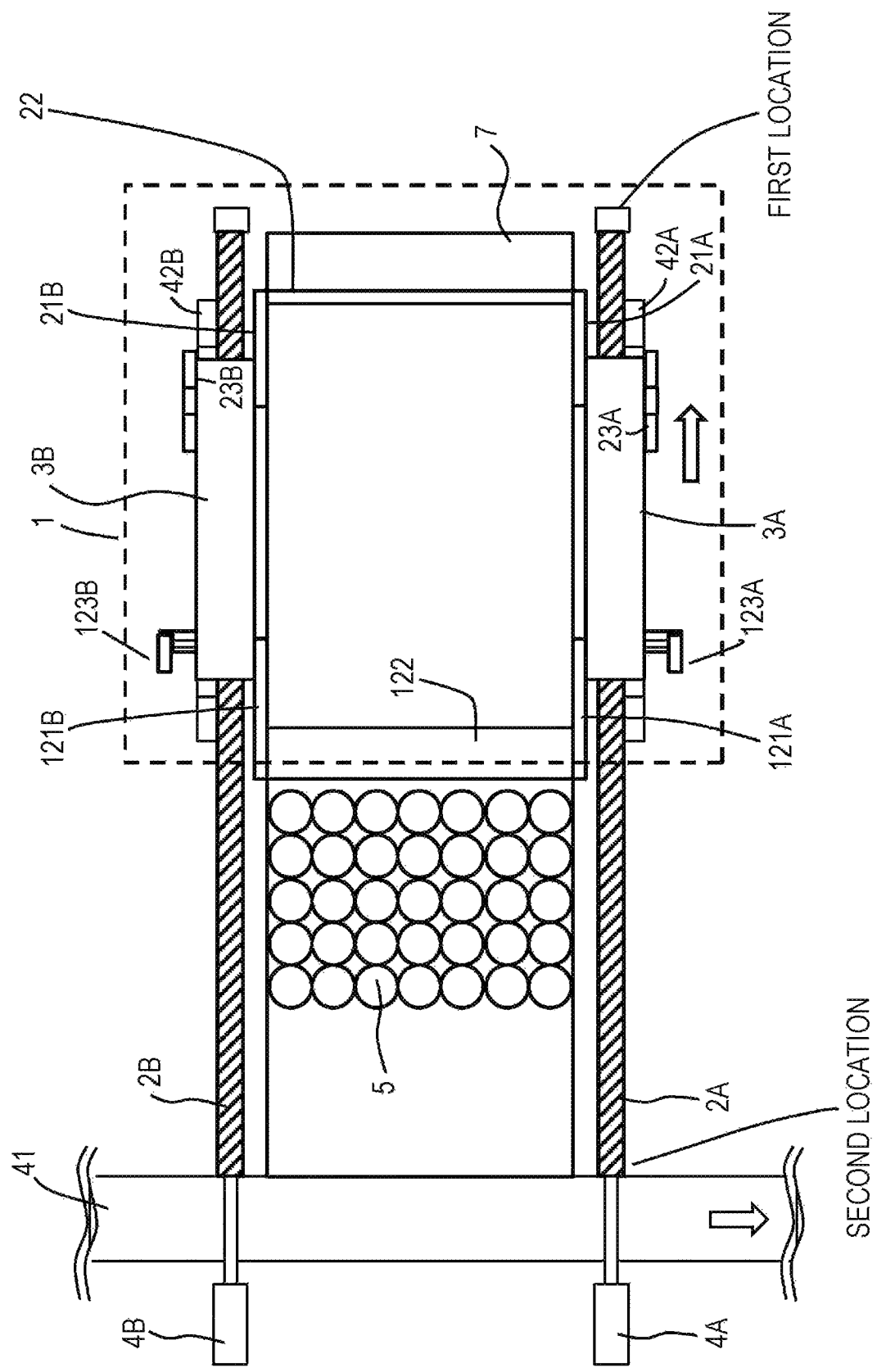
FIG. 40 is a schematic top view of the conveyance device according to the third embodiment.
Figure 41:
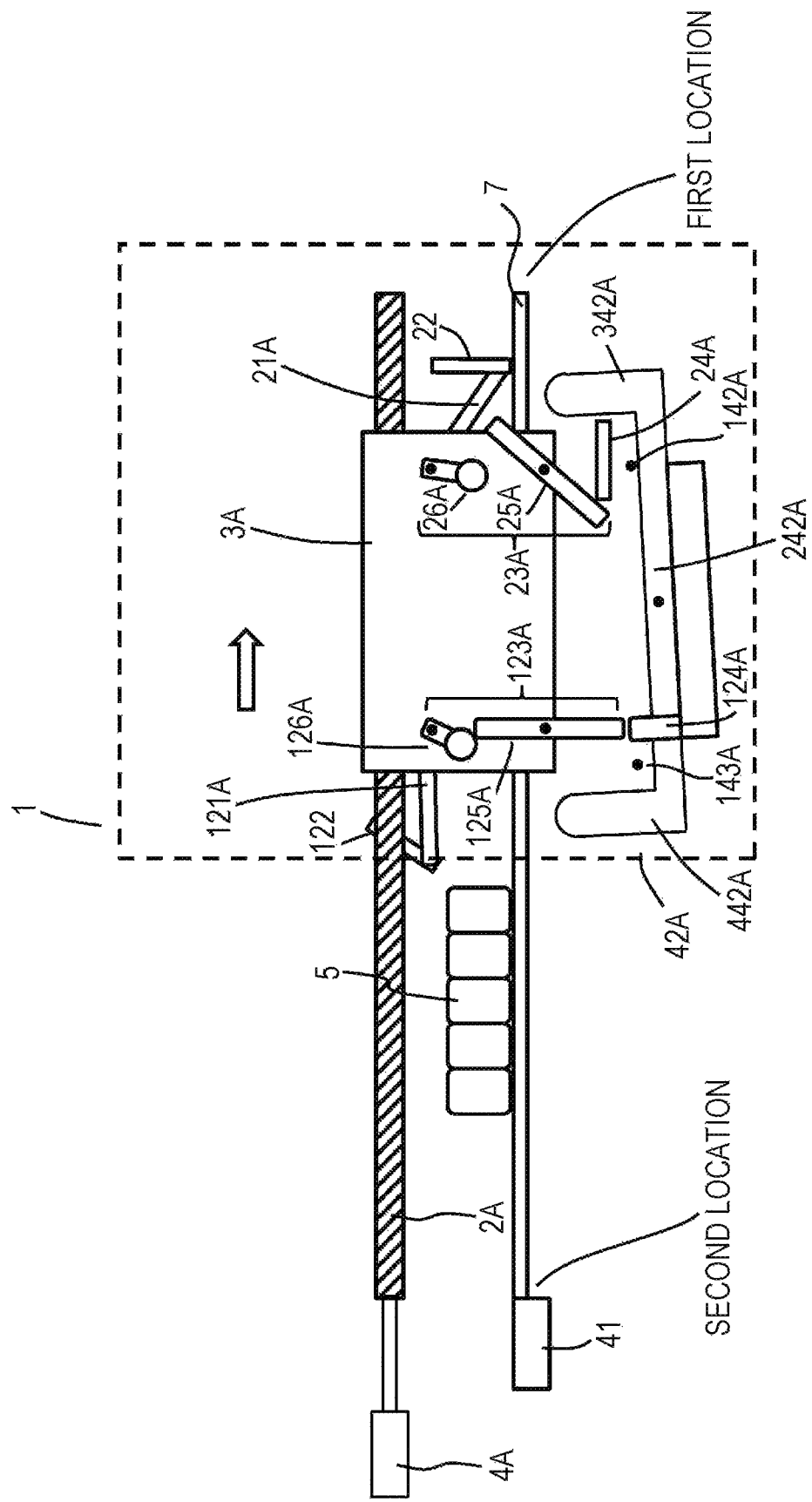
FIG. 41 is a schematic side view of the conveyance device according to the third embodiment.
Figure 42:
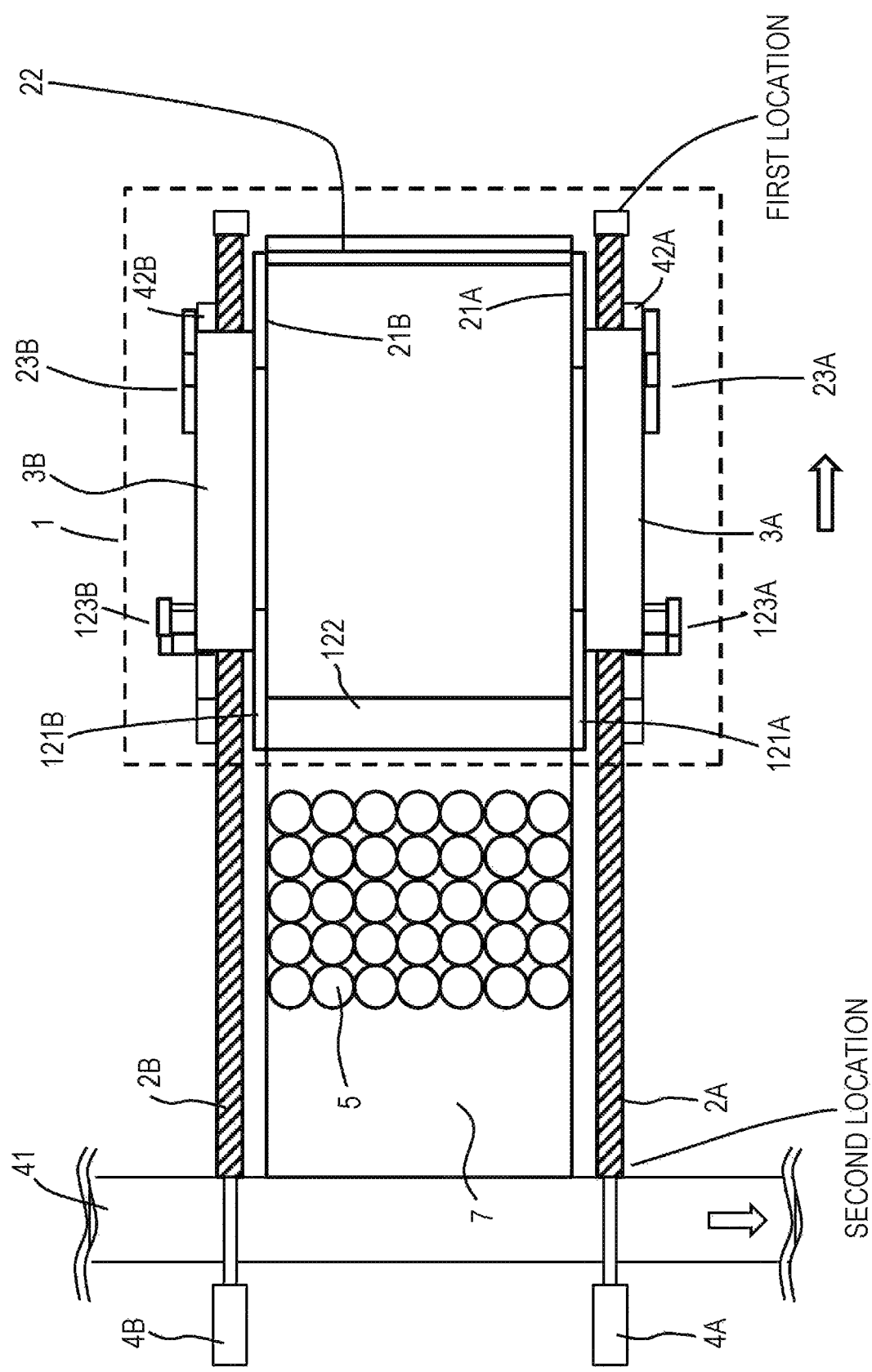
FIG. 42 is a schematic top view of the conveyance device according to the third embodiment.
Figure 43:
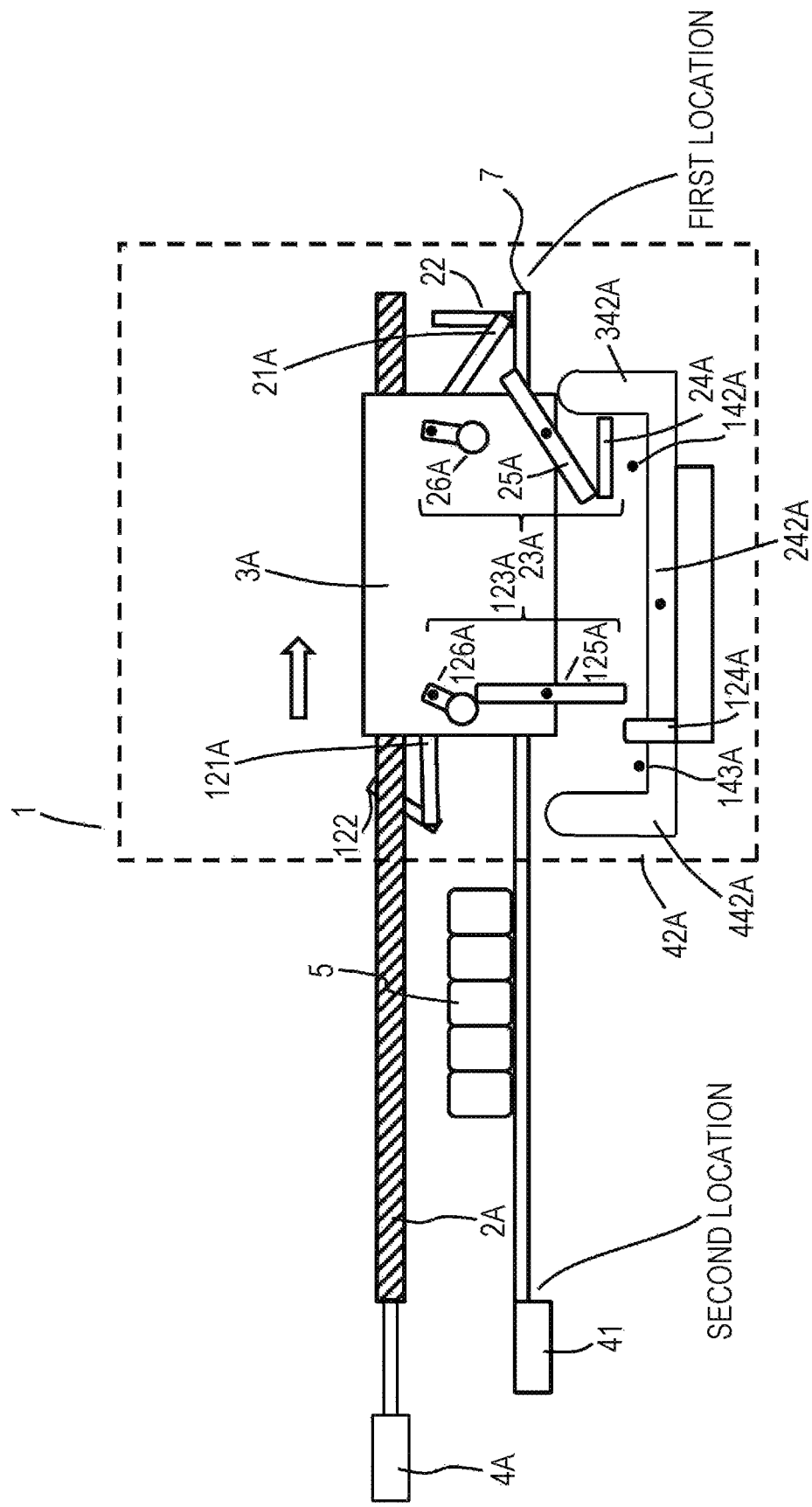
FIG. 43 is a schematic side view of the conveyance device according to the third embodiment.

In such a circumstance, as illustrated in FIG. 40 and FIG. 41, the moving members 3A and 3B move again in the direction toward the first location at the back portion of the chamber 1. As illustrated in FIG. 42 and FIG. 43, the moving members 3A and 3B move until the second inhibiting mechanisms 123A and 123B are positioned on the side of the first location with respect to the second dogs 124A and 124B. Here, the moving member 3A comes into contact with the first contact portion 342A of the dog holding member 42A. The dog holding member 42A whose the first contact portion 342A is pushed by the moving member 3A rotates such that the second dog 124A ascends. The same is true of the moving member 3B, the dog holding member 42B, and the second dog 124B.

Figure 44:
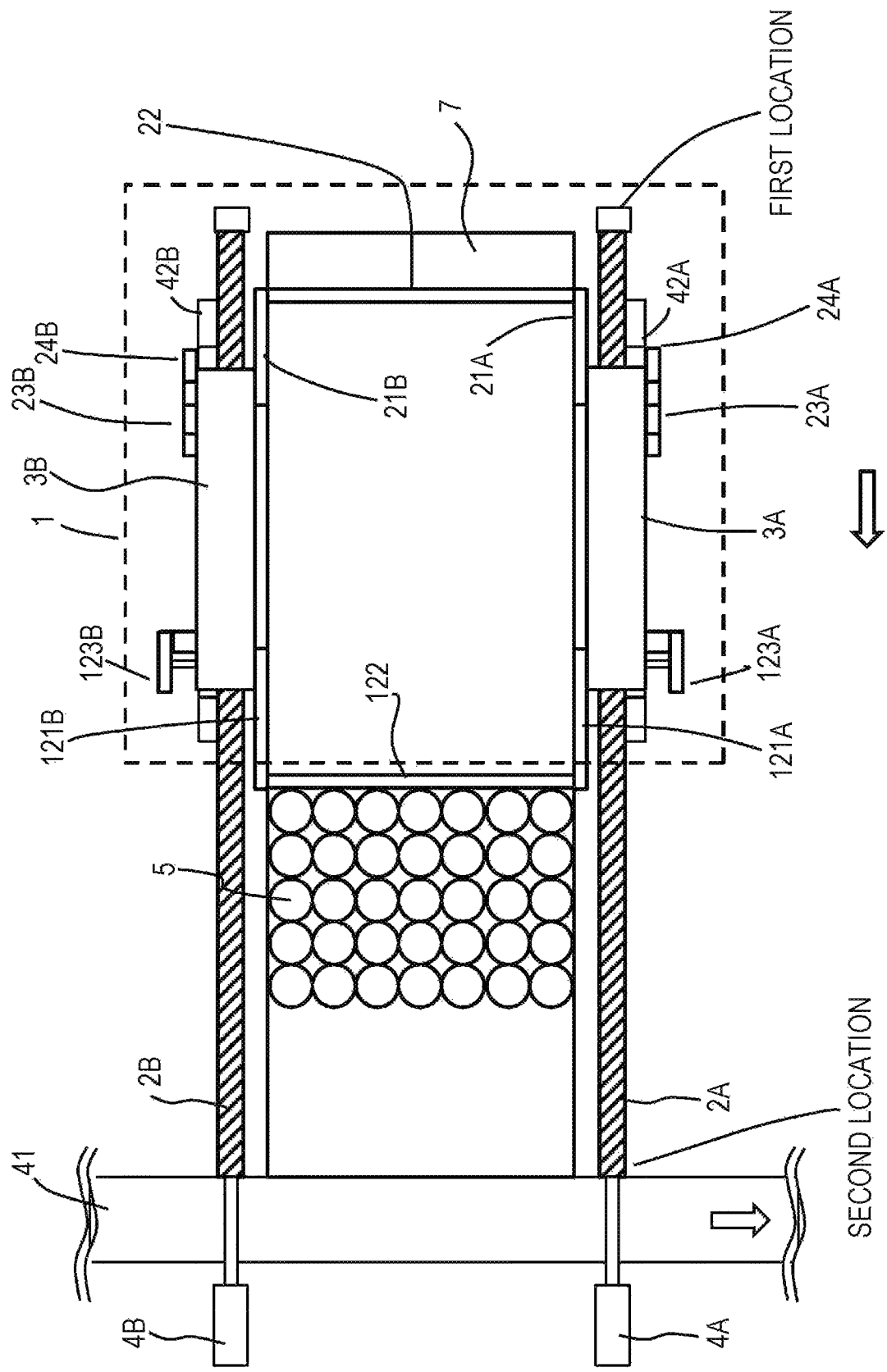
FIG. 44 is a schematic top view of the conveyance device according to the third embodiment.
Figure 45:
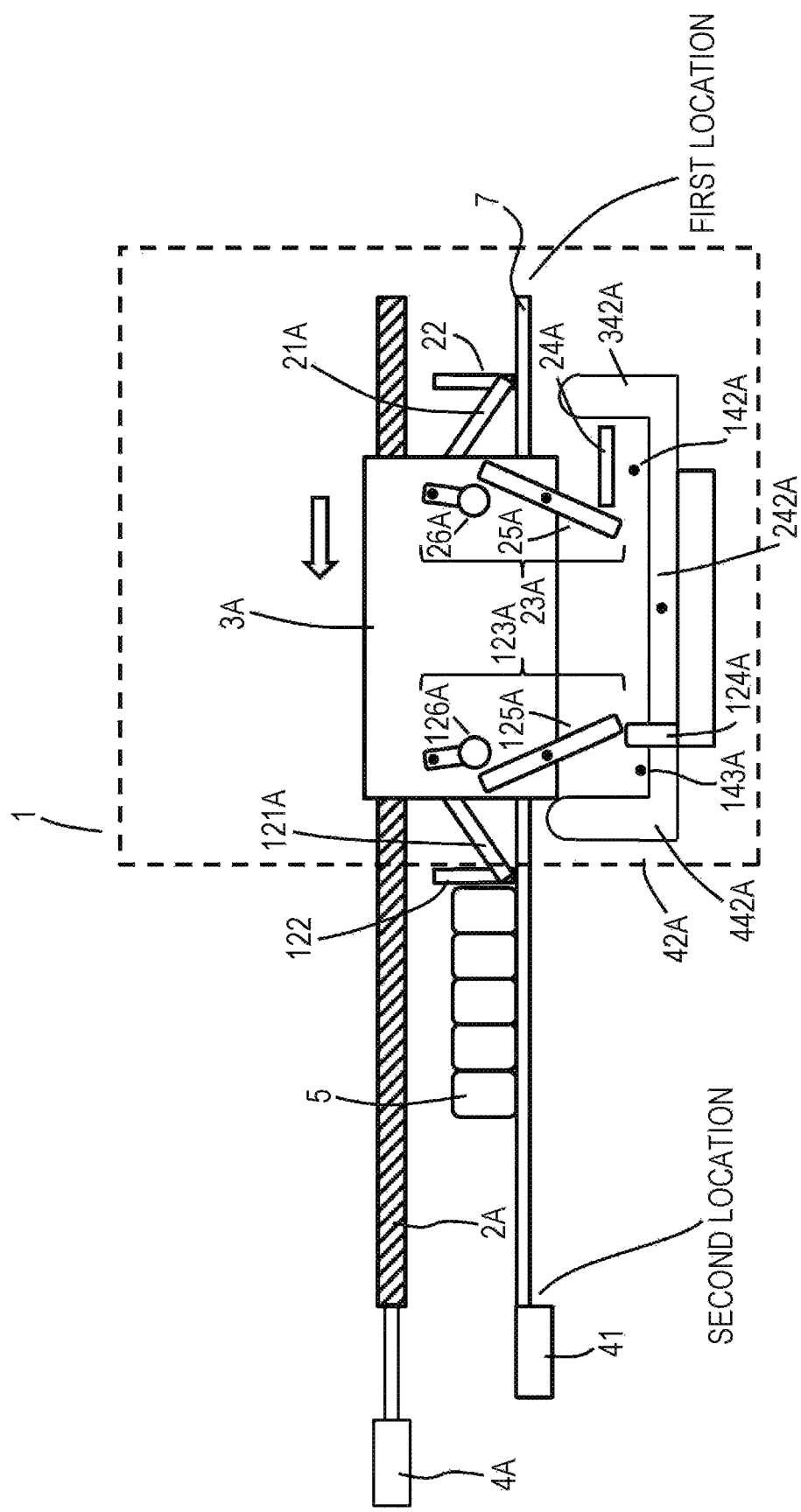
FIG. 45 is a schematic side view of the conveyance device according to the third embodiment.

Next, as illustrated in FIG. 44 and FIG. 45, when the moving members 3A and 3B move in the direction toward the second location outside the chamber 1, the second dog 124A pushes and rotates the first rotary member 125A of the second inhibiting mechanisms 123A to deactivate the second inhibiting mechanism 123A. The same is true of the second dog 124B and the second inhibiting mechanism 123B. Consequently, inhibition of the rotation of the second shafts 121A and 121B is deactivated, and the second contact member 122 descends together with the second shafts 121A and 121B toward the table 7.

Figure 46:
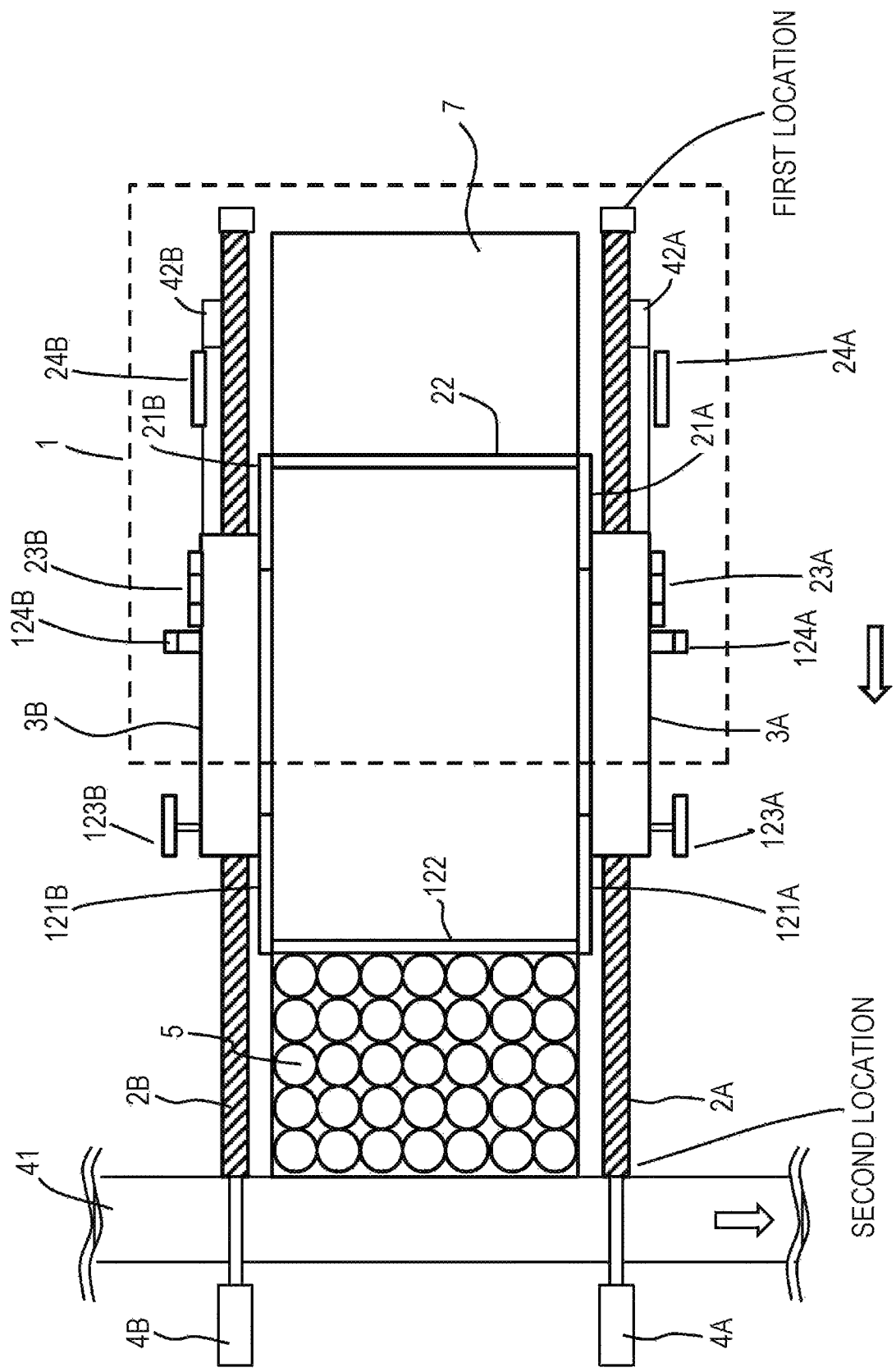
FIG. 46 is a schematic top view of the conveyance device according to the third embodiment.
Figure 47:
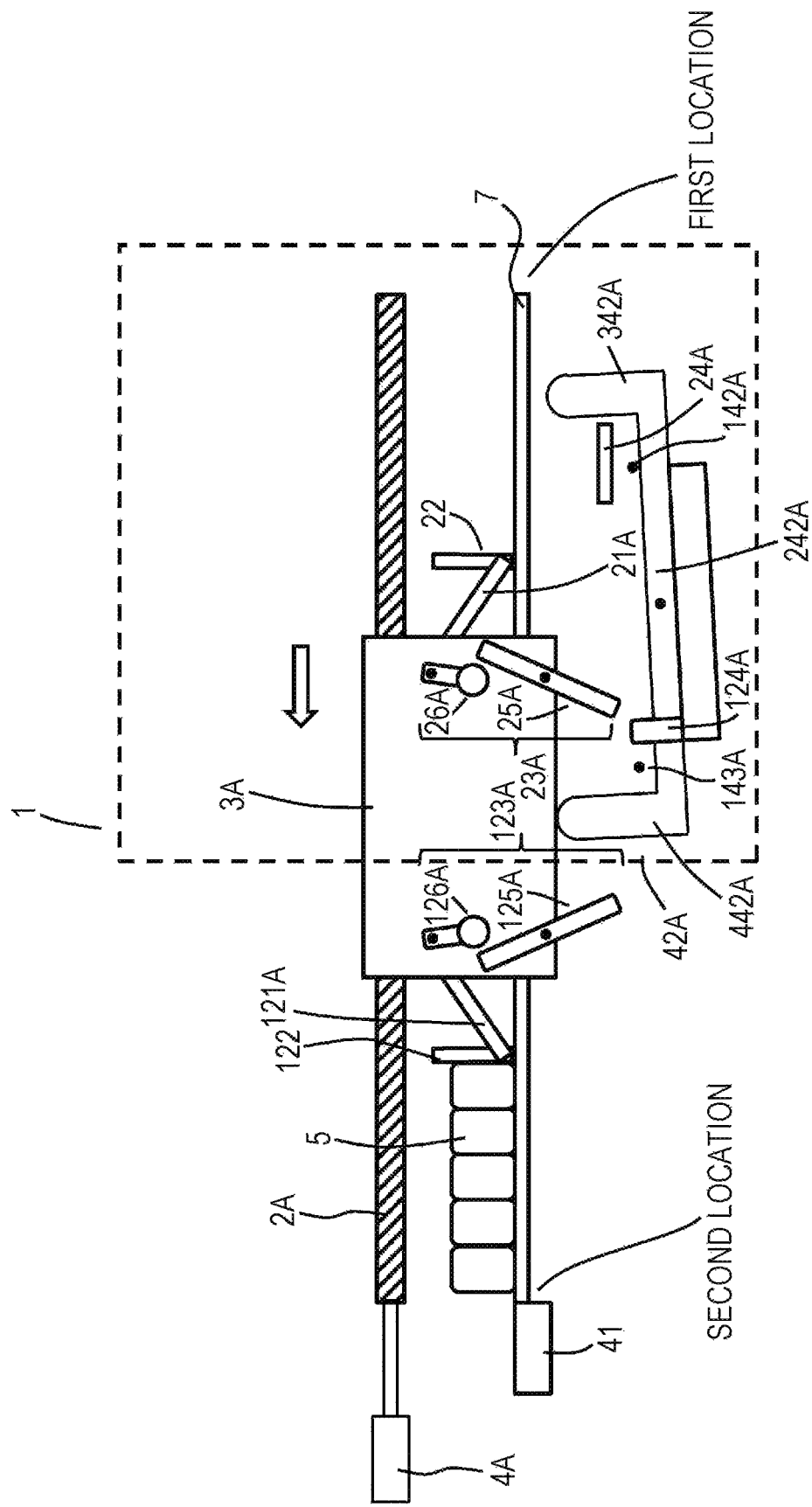
FIG. 47 is a schematic side view of the conveyance device according to the third embodiment.

As illustrated in FIG. 46 and FIG. 47, after the second contact member 122 descends, the moving members 3A and 3B move in the direction toward the second location outside the chamber 1 to push the article 5 by using the second contact member 122, thereby moving the article in the direction toward the second location. The moving member 3A comes into contact with the second contact portion 442A of the dog holding member 42A. The dog holding member 42A whose the second contact portion 442A is pushed by the moving member 3A rotates such that the second dog 124A descends. The same is true of the moving member 3B, the dog holding member 42B, and the second dog 124B.

Figure 48:
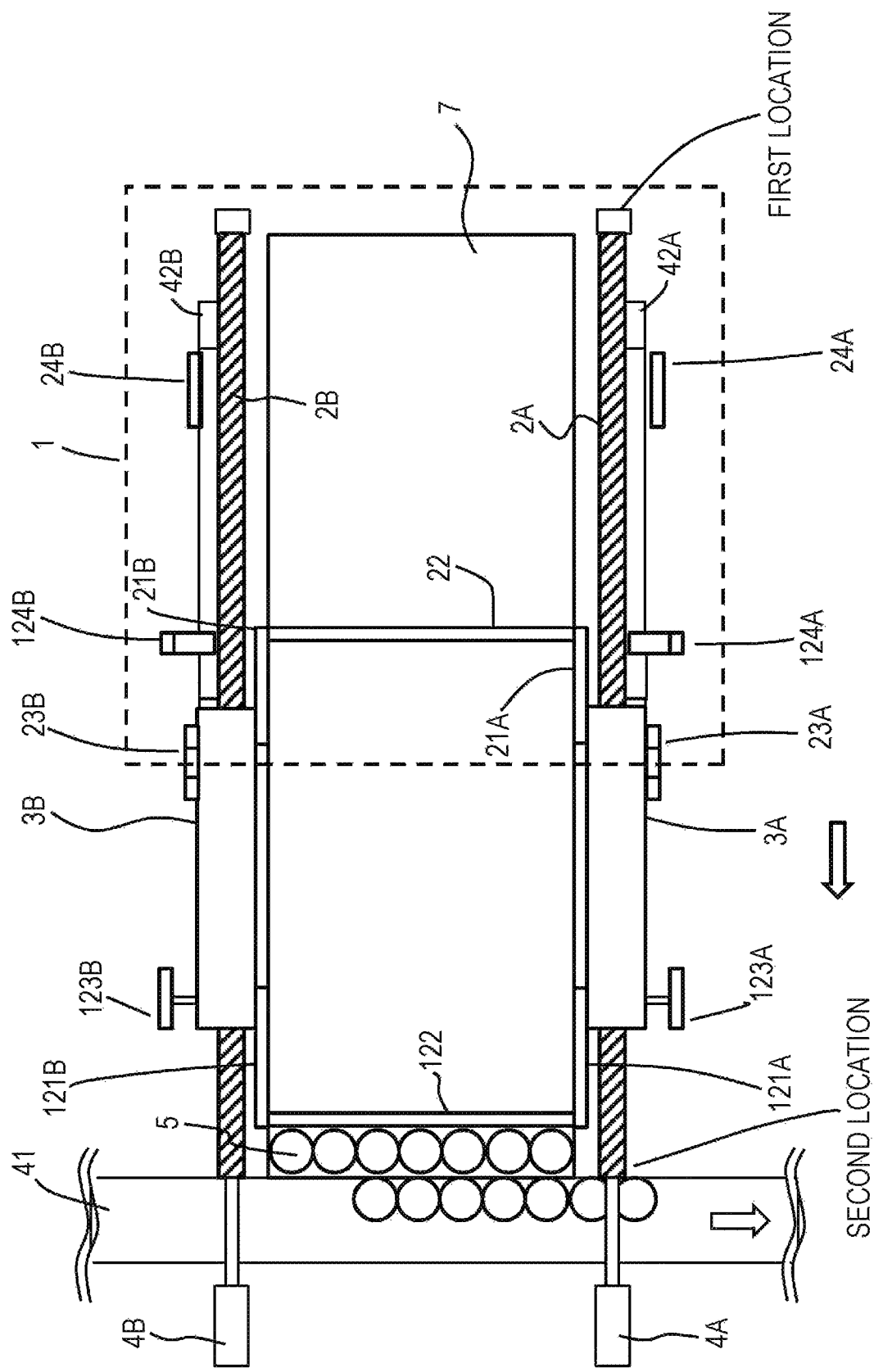
FIG. 48 is a schematic top view of the conveyance device according to the third embodiment.
Figure 49:
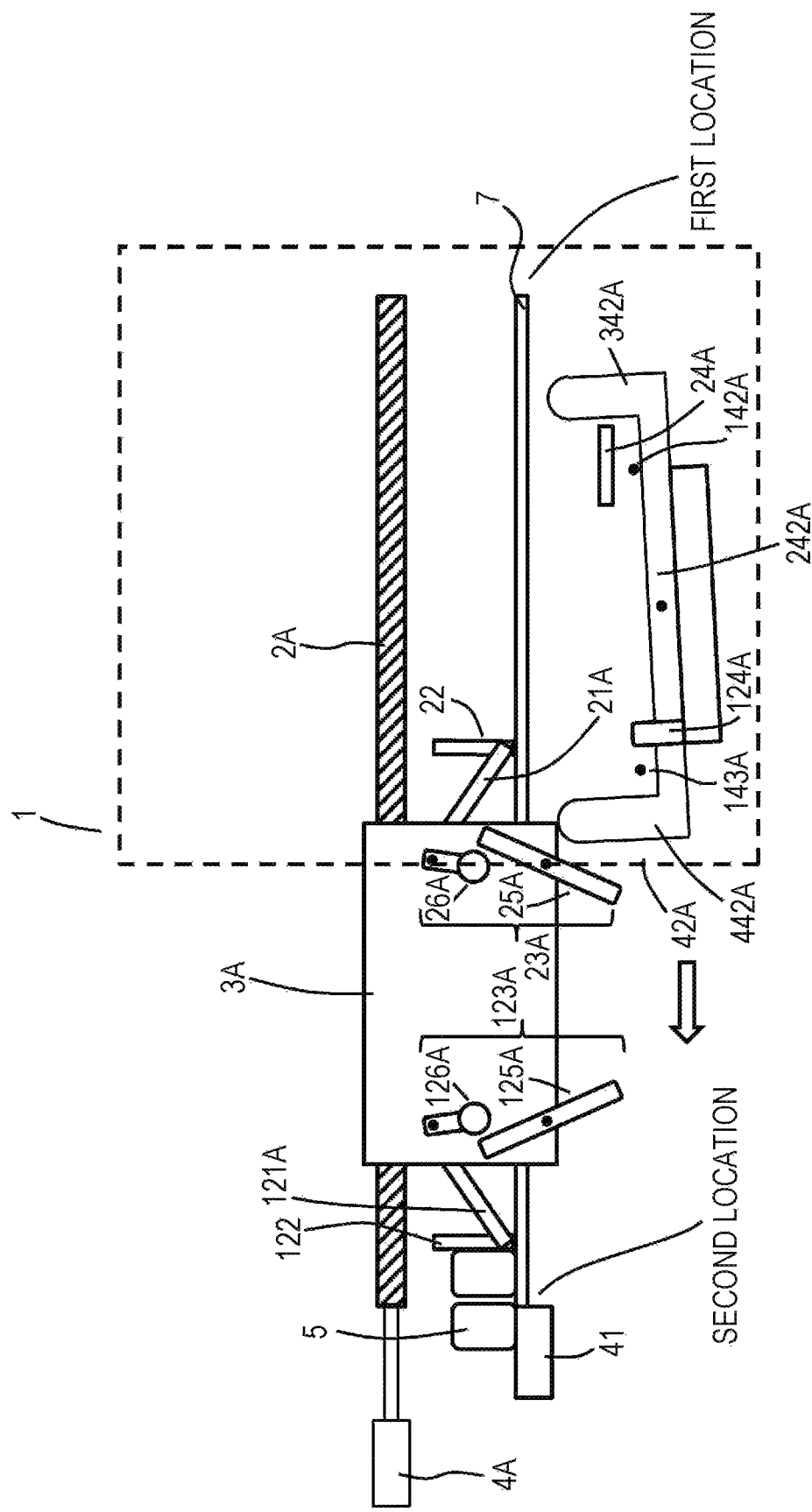
FIG. 49 is a schematic side view of the conveyance device according to the third embodiment.

As illustrated in FIG. 48 and FIG. 49, the second contact member 122 is connected the moving members 3A and 3B on the side of the second location and is thus capable of moving the article 5 that is on the table 7 onto the conveyor 41 disposed on the side of the second location so as to be adjacent to the table 7.

Fourth Embodiment

Figure 50:
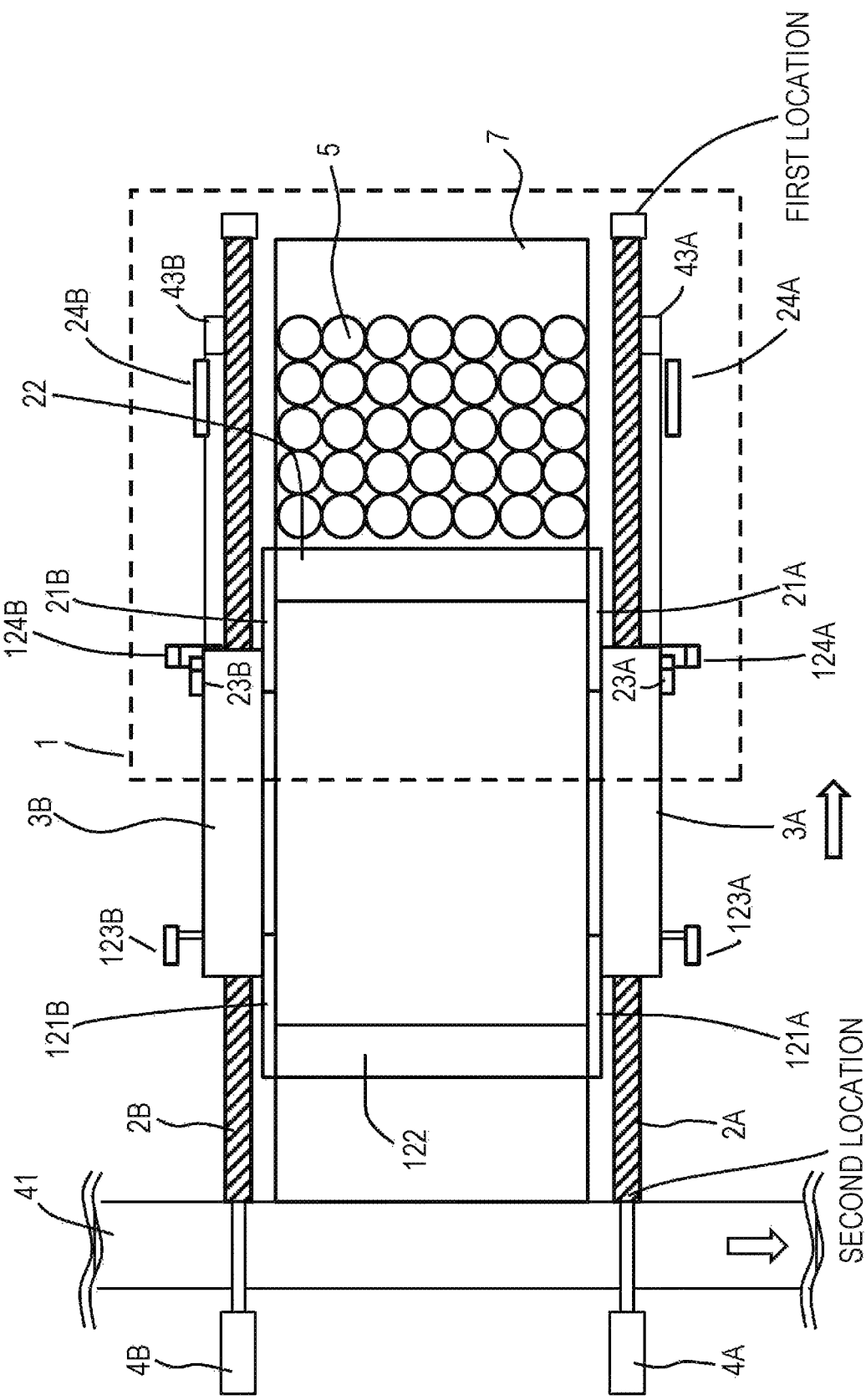
FIG. 50 is a schematic top view of a conveyance device according to a fourth embodiment.
Figure 51:
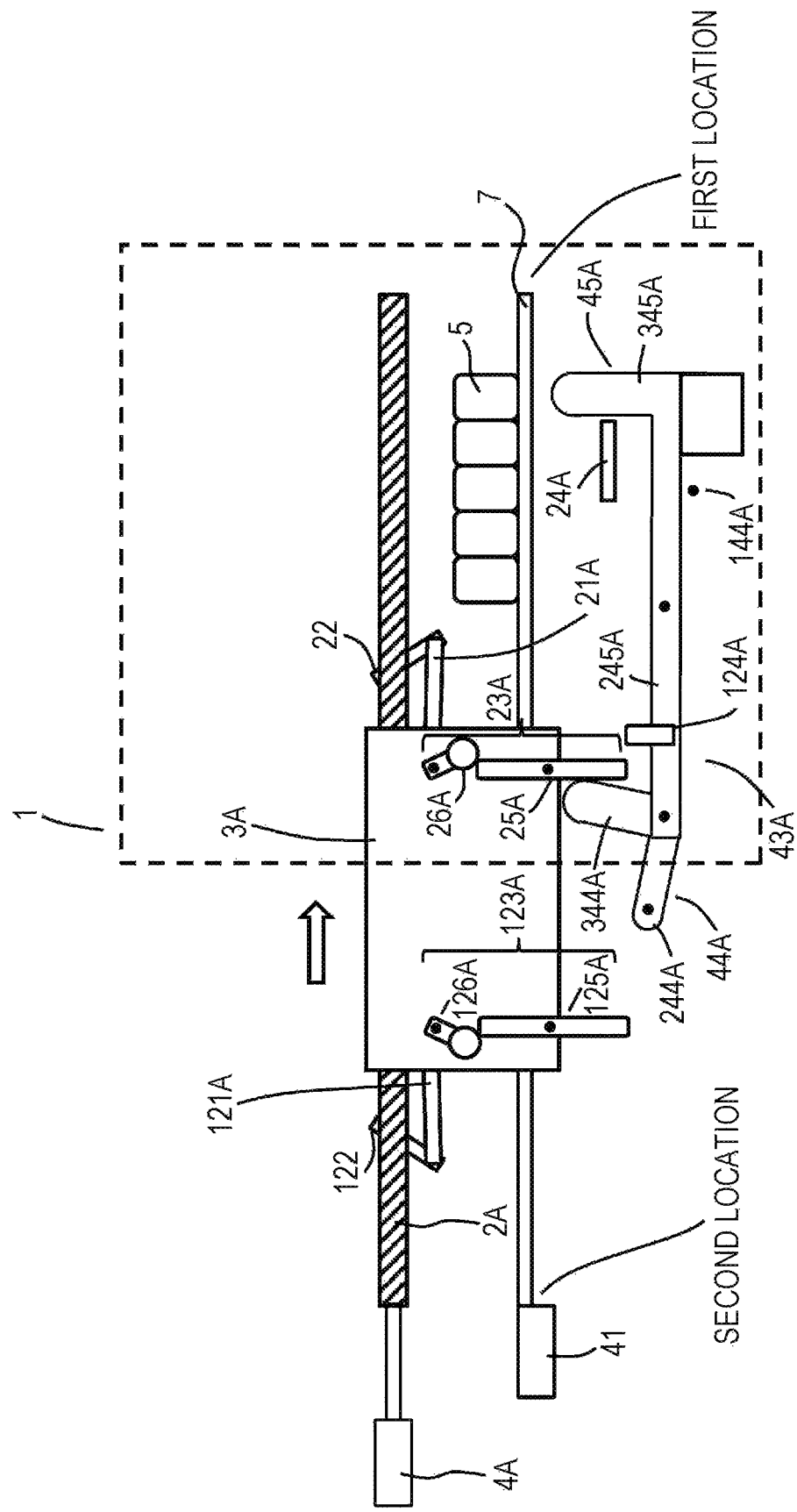
FIG. 51 is a schematic side view of the conveyance device according to the fourth embodiment.

In the conveyance device according to a fourth embodiment, as illustrated in FIG. 50 and FIG. 51, the second dog 124A is held by a dog holding member 43A. The dog holding member 43A includes a first link 45A that is disposed on the side of the first location and that is capable of coming into contact with the moving member 3A and a second link 44A that is disposed on the side of the second location and that is capable of coming into contact with the moving member 3A, the second link 44A being connected to the first link 45A with a movable pin.

The first link 45A includes a first horizontal shaft portion 245A and a first contact portion 345A that vertically projects on the side of the first location with respect to the first horizontal shaft portion 245A, the first contact portion 345A being capable of coming into contact with the moving member 3A. The first horizontal shaft portion 245A includes a rotating shaft. The first horizontal shaft portion 245A is rotatable within, for example, a plane perpendicular to the table 7 and parallel to the bar-shaped member 2A.

In response to the rotation of the first horizontal shaft portion 245A of the dog holding member 43A, the first contact portion 345A approaches the moving member 3A or moves away from the moving member 3A. The first contact portion 345A has a size with which the first contact portion 345A comes into contact with the moving member 3A when positioned closest to the moving member 3A.

The second dog 124A is connected between an end of the first horizontal shaft portion 245A on the side of the second location and the rotating shaft. The rotating shaft may be positioned on the side of the second location with respect to the centroid of the first link 45A and the second dog 124A. For example, the first horizontal shaft portion 245A may have a structure that is heavy on the side of the first location with respect to the rotating shaft.

The second link 44A includes a second horizontal shaft portion 244A and a second contact portion 344A that vertically projects on the side of the first location with respect to the second horizontal shaft portion 244A, the second contact portion 344A being capable of coming into contact with the moving member 3A. The second horizontal shaft portion 244A includes a rotating shaft on the side of the second location. The second horizontal shaft portion 244A is rotatable within, for example a plane perpendicular to the table 7 and parallel to the bar-shaped member 2A.

In response to the rotation of the second horizontal shaft portion 244A of the second link 44A, the second contact portion 344A approaches the moving member 3A or moves away from the moving member 3A. The second contact portion 344A of the second link 44A has a size with which the second contact portion 344A comes into contact with the moving member 3A when positioned closest to the moving member 3A.

A portion of the first horizontal shaft portion 245A of the first link 45A on the side of the second location and a portion of the second horizontal shaft portion 244A of the second link 44A on the side of the first location are connected to each other with a movable pin. Thus, when the second contact portion 344A of the second link 44A is pushed by the moving member 3A and descends, the first horizontal shaft portion 245A of the first link 45A also descends on the side of the second location, and the first contact portion 345A disposed on the side of the first location with respect to the first horizontal shaft portion 245A ascends.

When the first contact portion 345A of the first link 45A is pushed by the moving member 3A and descends, the first horizontal shaft portion 245A of the first link 45A ascends on the side of the second location, and the second contact portion 344A of the second link 44A also ascends.

The second dog 124A has a size with which, when the first contact portion 345A of the first link 45A is pushed by the moving member 3A and when the first horizontal shaft portion 245A rotates so as to ascend on the side of the second location, the second dog 124A comes into contact with the second inhibiting mechanism 123A to deactivate the second inhibiting mechanism 123A. The second dog 124A has a size with which, when the second contact portion 344A of the second link 44A is pushed by the moving member 3A and when the first horizontal shaft portion 245A rotates so as to descend on the side of the second location, the second dog 124A does not deactivate the second inhibiting mechanism 123A.

When the moving member 3A comes into contact with the second contact portion 344A of the second link 44A, the second contact portion 344A is pushed downward by the moving member 3A, and the second horizontal shaft portion 244A descends on the side of the first location. Consequently, the first horizontal shaft portion 245A connected, with the movable pin, to the portion of the second horizontal shaft portion 244A on the side of the first location also descends on the side of the second location. The second dog 124A is connected on the side of the second location with respect to the rotating shaft of the first horizontal shaft portion 245A, and thus, the second dog 124A also descends and does not deactivate the second inhibiting mechanism 123A.

When the moving member 3A comes into contact with the first contact portion 345A of the first link 45A, the first contact portion 345A is pushed downward by the moving member 3A, and the first horizontal shaft portion 245A rotates so as to descend on the side of the first location and to ascend on the side of the second location. The second dog 124A is connected on the side of the second location with respect to the rotating shaft of the first horizontal shaft portion 245A, and thus, the second dog 124A ascends and deactivates the second inhibiting mechanism 123A.

The conveyance device according to the fourth embodiment may further include a rotation constraining member 144A that constrains the rotation of the first link 45A. The rotation constraining member 144A constrains the amount of descending of the first contact portion 345A. As the rotation constraining member 144A, a fixing pin or the like that comes into contact with the rotated first horizontal shaft portion 245A is usable. The same is true of the second dog 124B and a dog holding member 43B that holds the second dog 124B.

The other components of the conveyance device according to the fourth embodiment are identical to those of the conveyance device according to the second embodiment.

Figure 52:
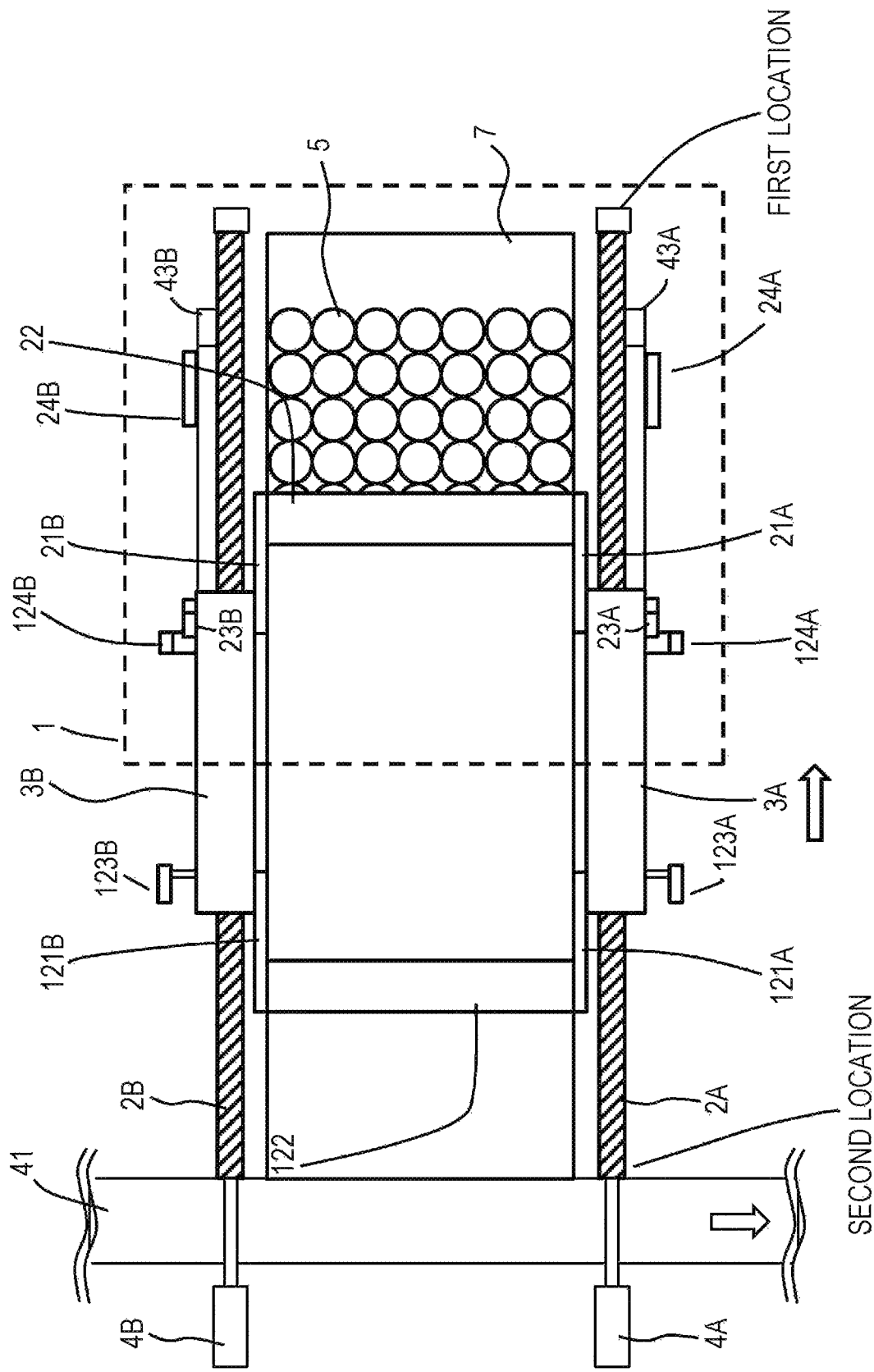
FIG. 52 is a schematic top view of the conveyance device according to the fourth embodiment.
Figure 53:
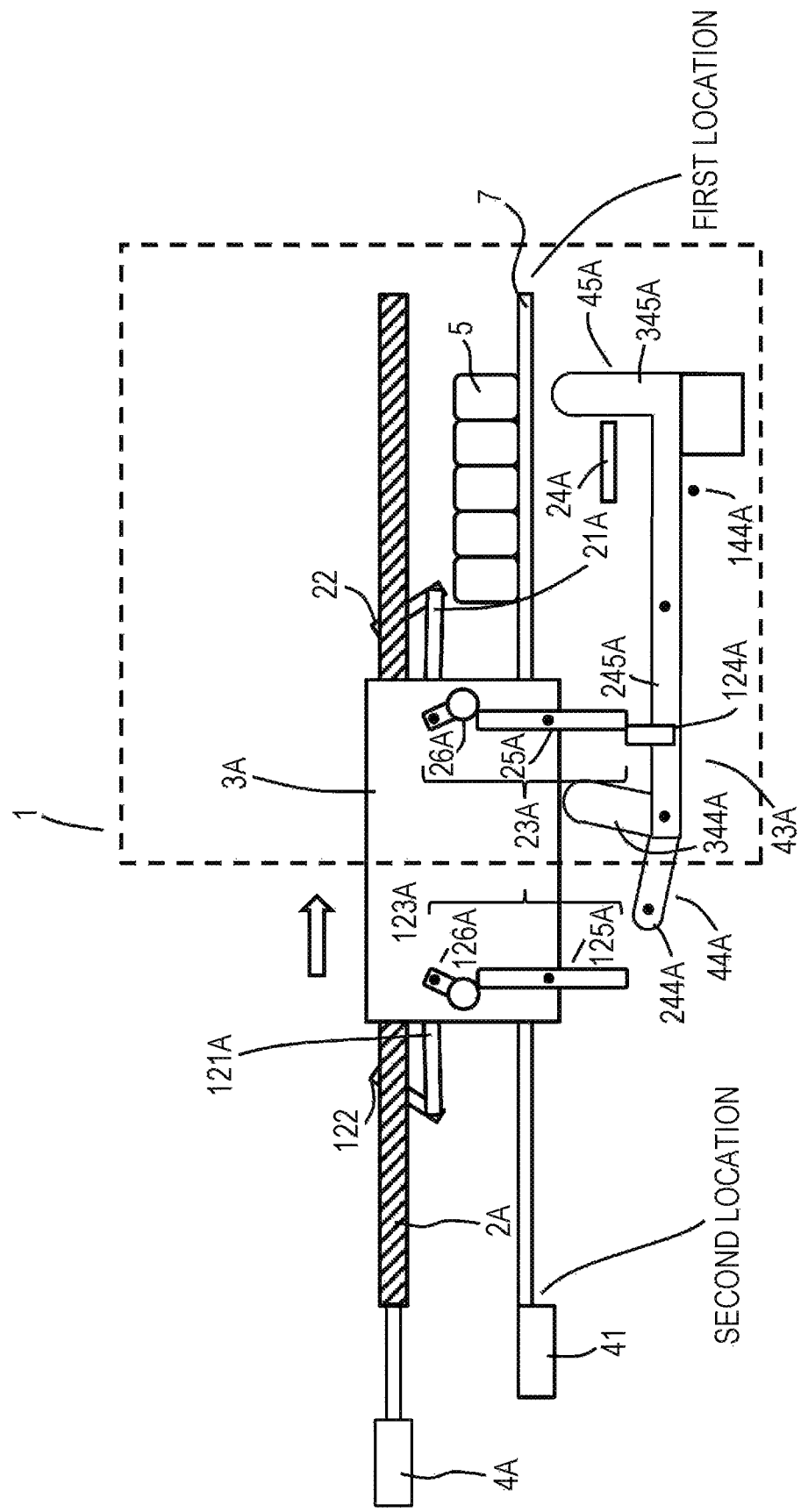
FIG. 53 is a schematic side view of the conveyance device according to the fourth embodiment.

Hereinafter, a method by which the conveyance device according to the fourth embodiment conveys out the article 5 that is inside the chamber 1. First, the moving members 3A and 3B move in the direction toward the first location at the back portion of the chamber 1. At this time, the second contact portion 344A of the second link 44A is pushed by the moving member 3A and descends. As illustrated in FIG. 52 and FIG. 53, the first inhibiting mechanisms 23A and 23B pass by the second dogs 124A and 124B without coming into contact with the second dogs 124A and 124B.

Figure 54:
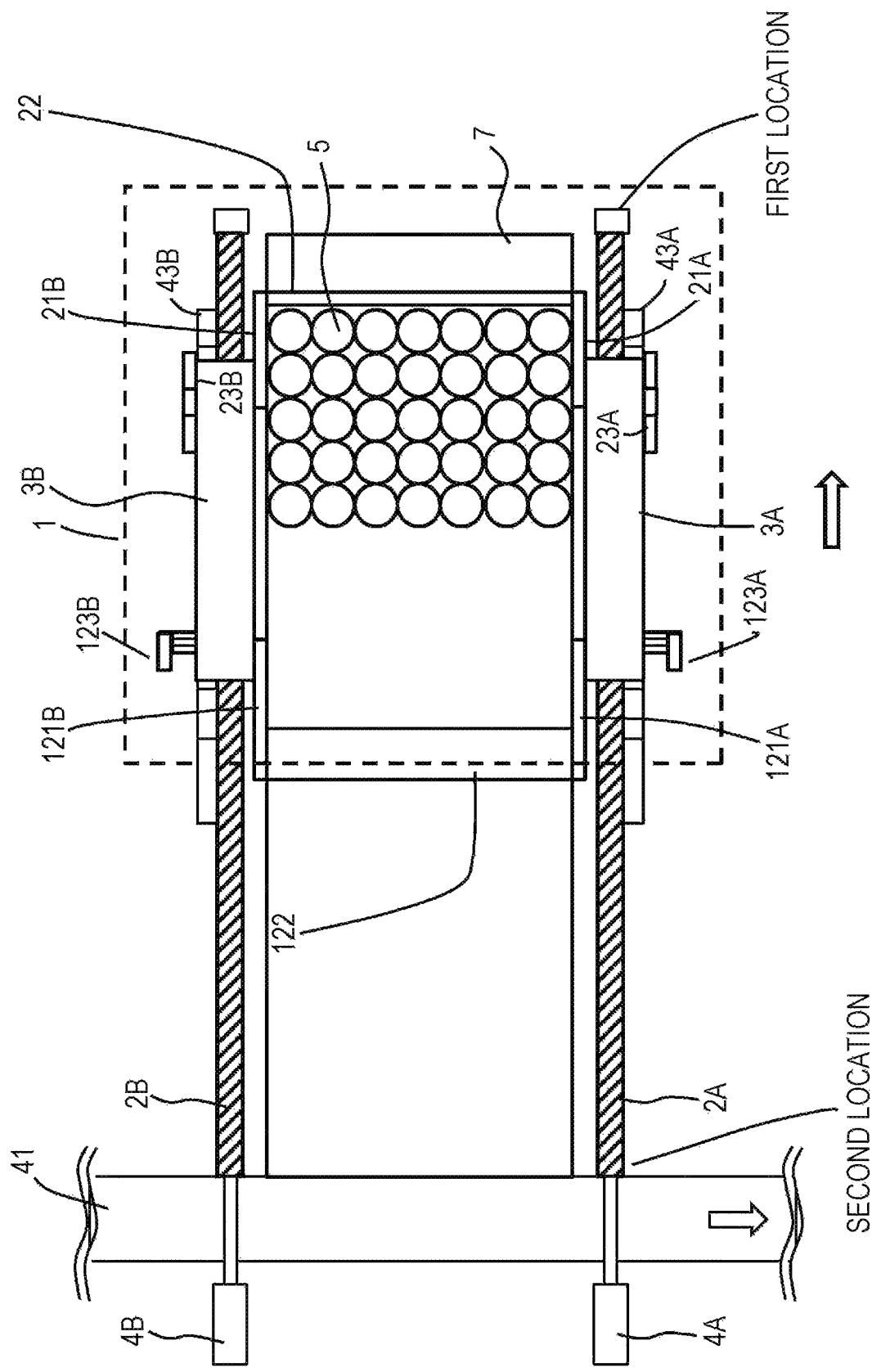
FIG. 54 is a schematic top view of the conveyance device according to the fourth embodiment.
Figure 55:
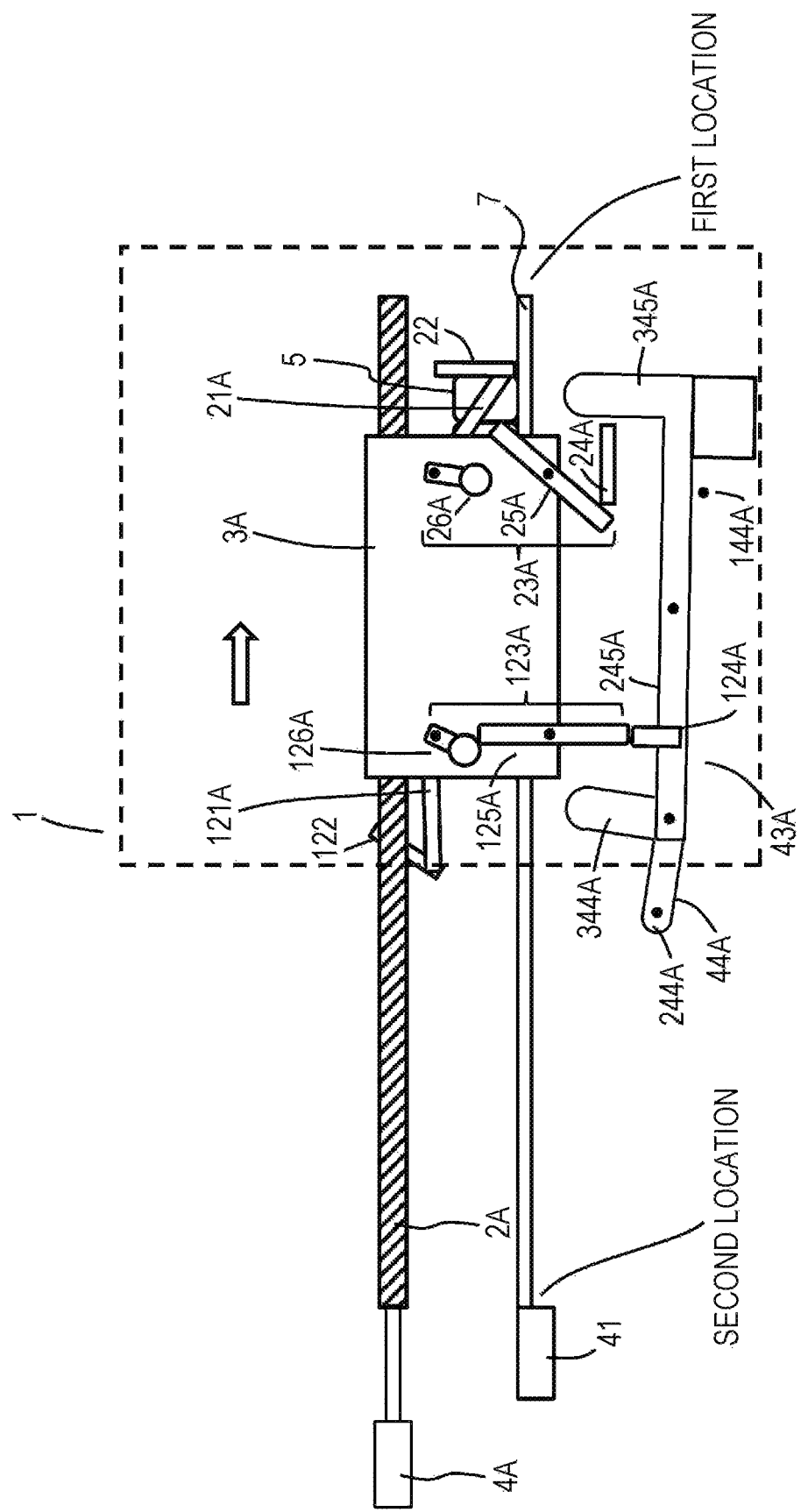
FIG. 55 is a schematic side view of the conveyance device according to the fourth embodiment.

As illustrated in FIG. 54 and FIG. 55, the first inhibiting mechanisms 23A and 23B respectively come into contact, at the back portion of the chamber 1 and on the side of the second location with respect to a location where the moving member 3A comes into contact with the first contact portion 345A, with the first dogs 24A and 249, and inhibition of the rotation of the first shafts 21A and 21B is deactivated. Thus, the first contact member 22 descends together with the first shafts 21A and 21B toward the table 7. The second inhibiting mechanism 123A passes above the second dog 124A; however, the second inhibiting mechanism 123A is not deactivated because the second dog 124A is held by the dog holding member 43A so as not to reach the first rotary member 125A included in the second inhibiting mechanism 123A. The same is true of the second inhibiting mechanism 123B.

Figure 56:
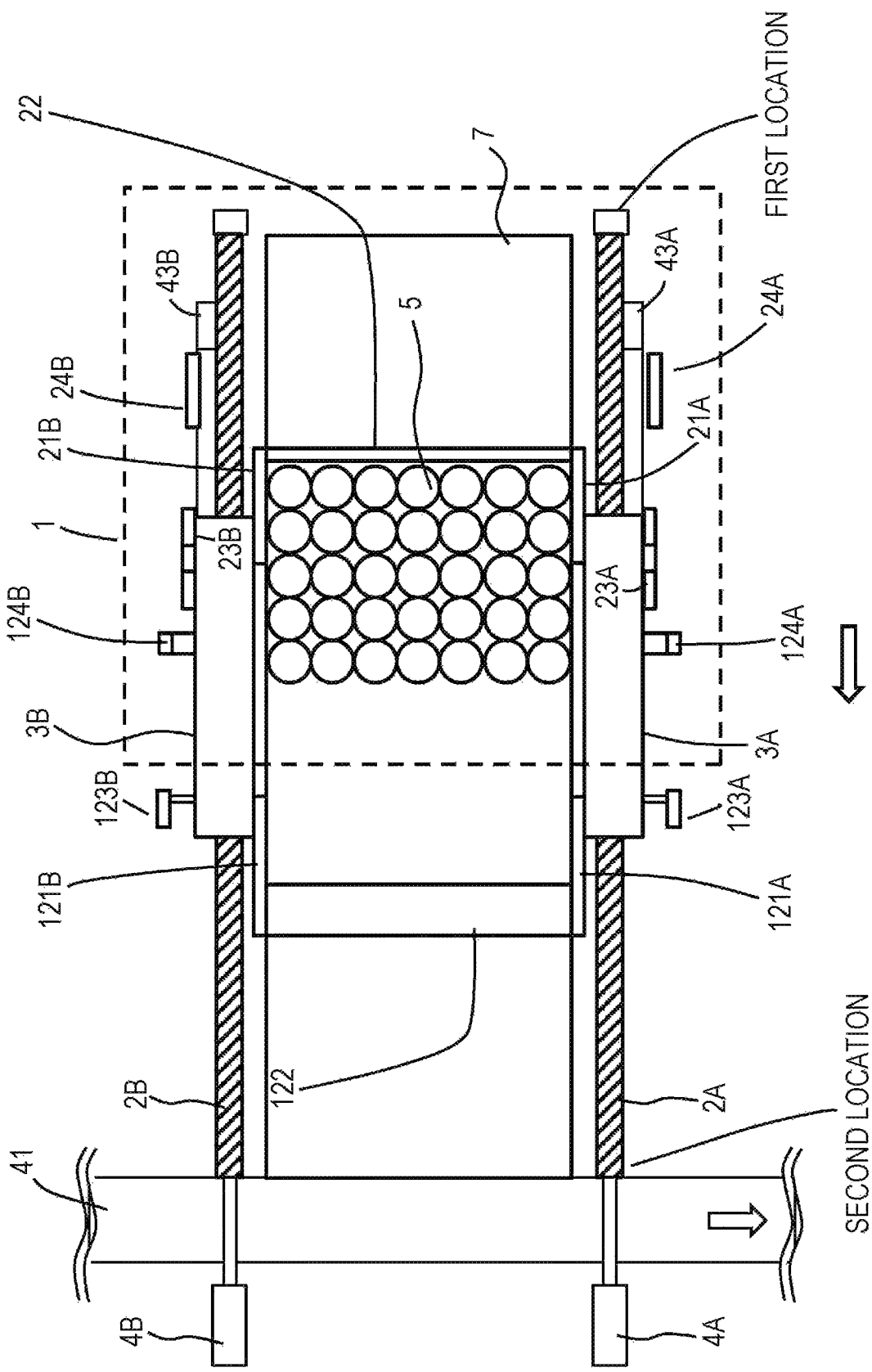
FIG. 56 is a schematic top view of the conveyance device according to the fourth embodiment.
Figure 57:
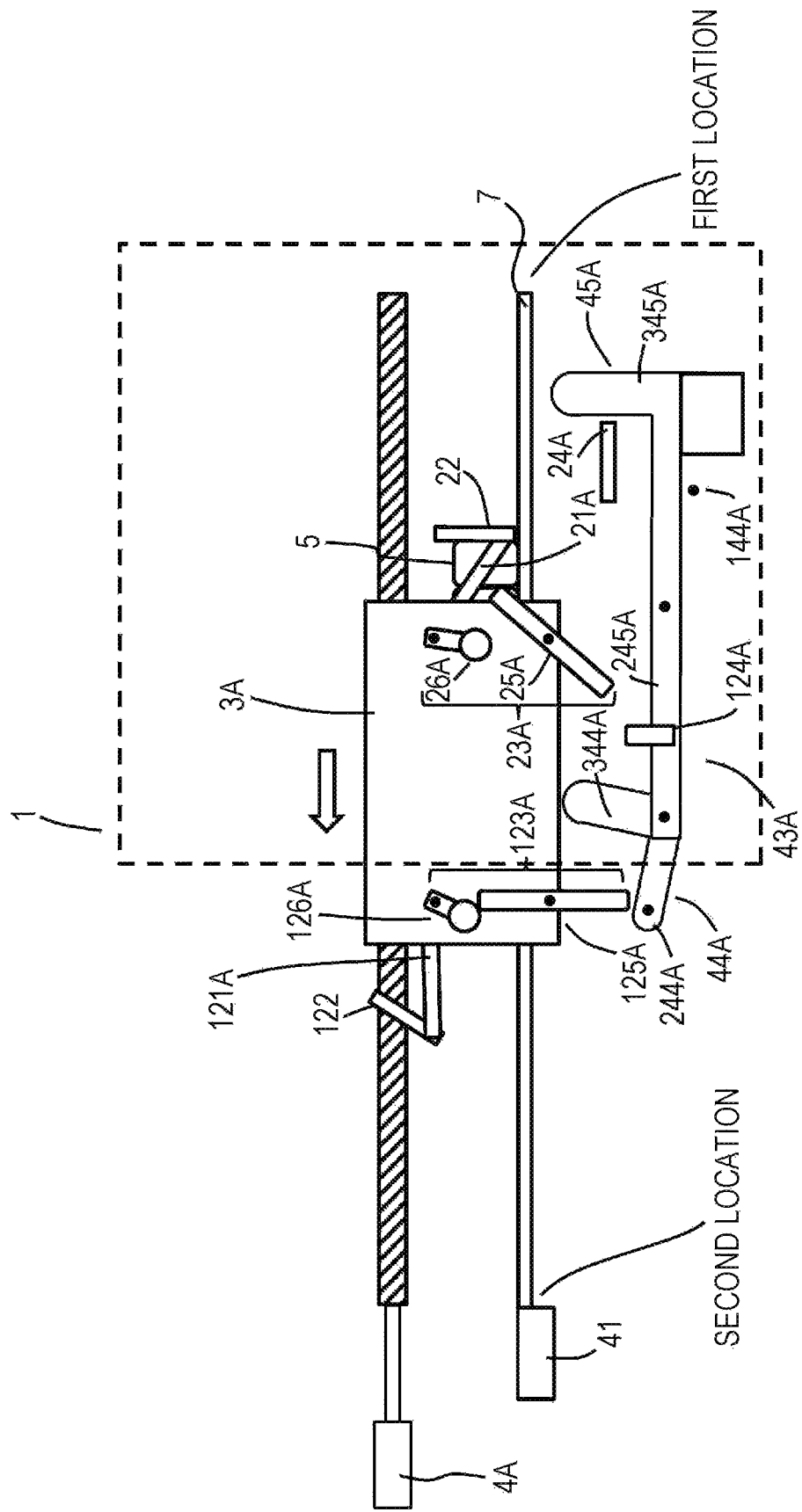
FIG. 57 is a schematic side view of the conveyance device according to the fourth embodiment.
Figure 58:
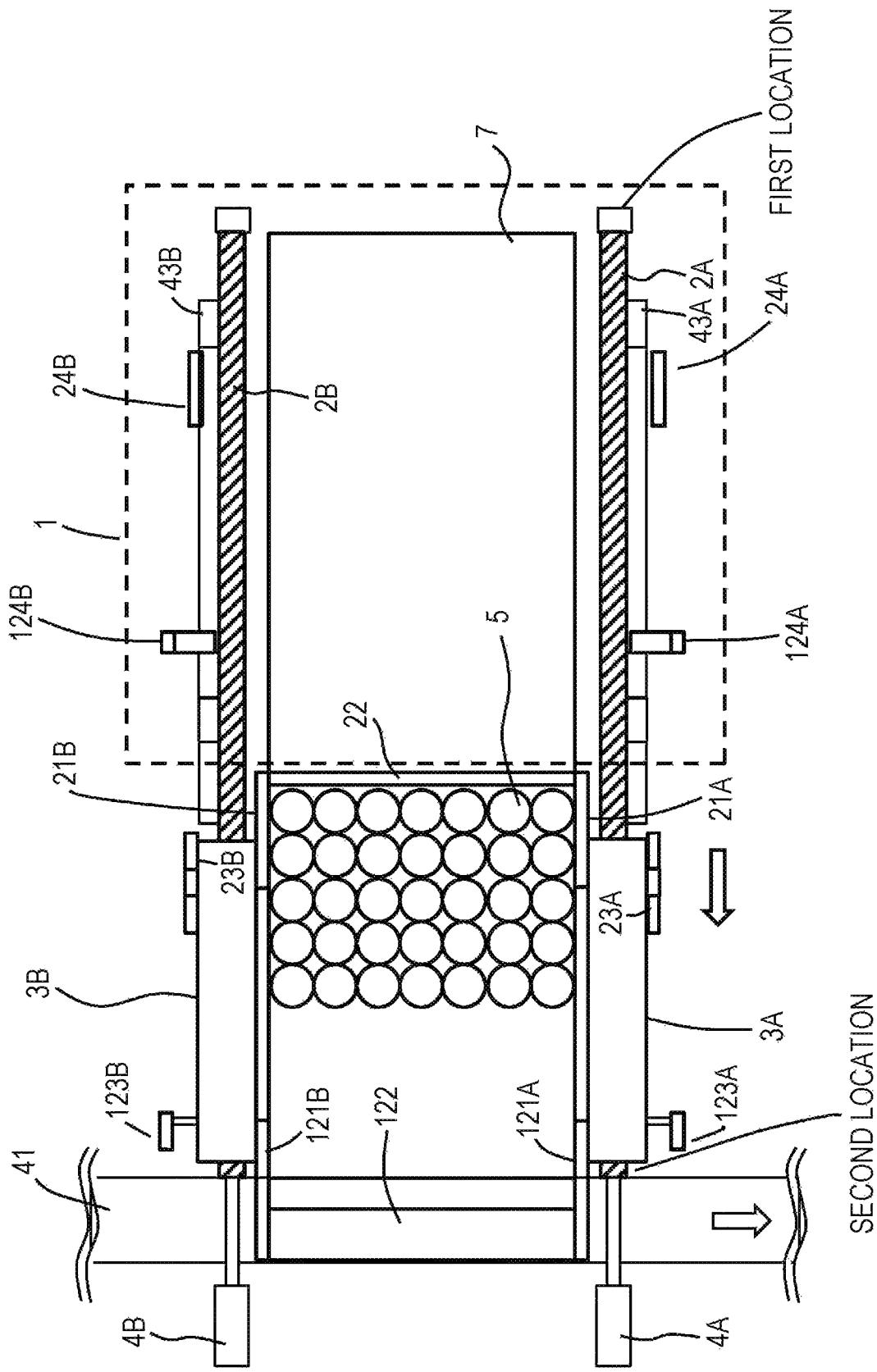
FIG. 58 is a schematic top view of the conveyance device according to the fourth embodiment.
Figure 59:
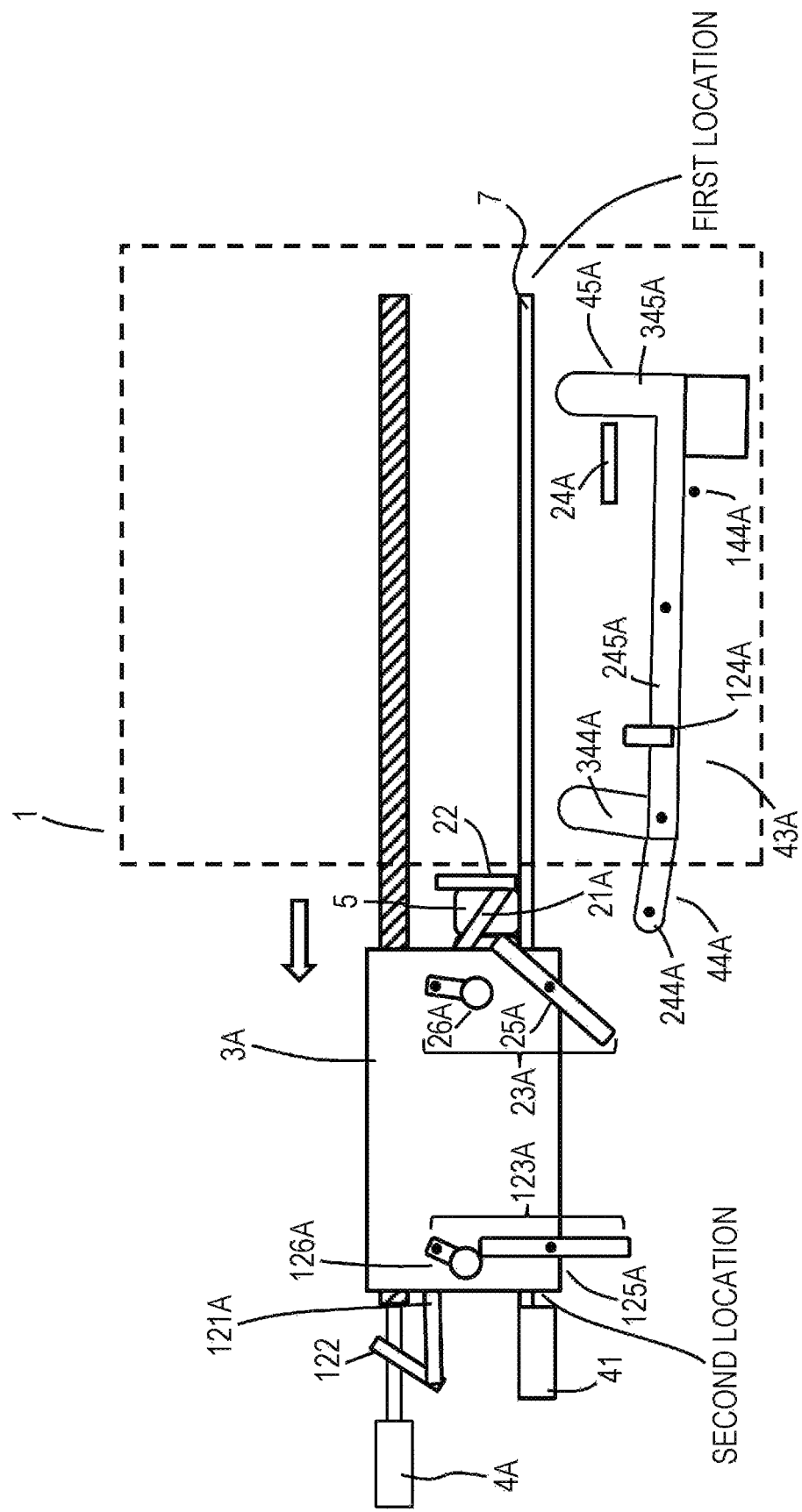
FIG. 59 is a schematic side view of the conveyance device according to the fourth embodiment.

As illustrated in FIG. 56 and FIG. 57, after the first contact member 22 descends, the moving members 3A and 3B move in the direction toward the second location outside the chamber 1 to push the article 5 by using the first contact member 22, thereby moving the article 5 in the direction toward the second location outside the chamber 1. Here, as illustrated in FIG. 58 and FIG. 59, there may be a circumstance in which it is not possible, even when the moving members 3A and 3B move to the second location, to move the article 5 that is on the table 7 onto the conveyor 41 disposed on the side of the second location so as to be adjacent to the table 7.

Figure 60:
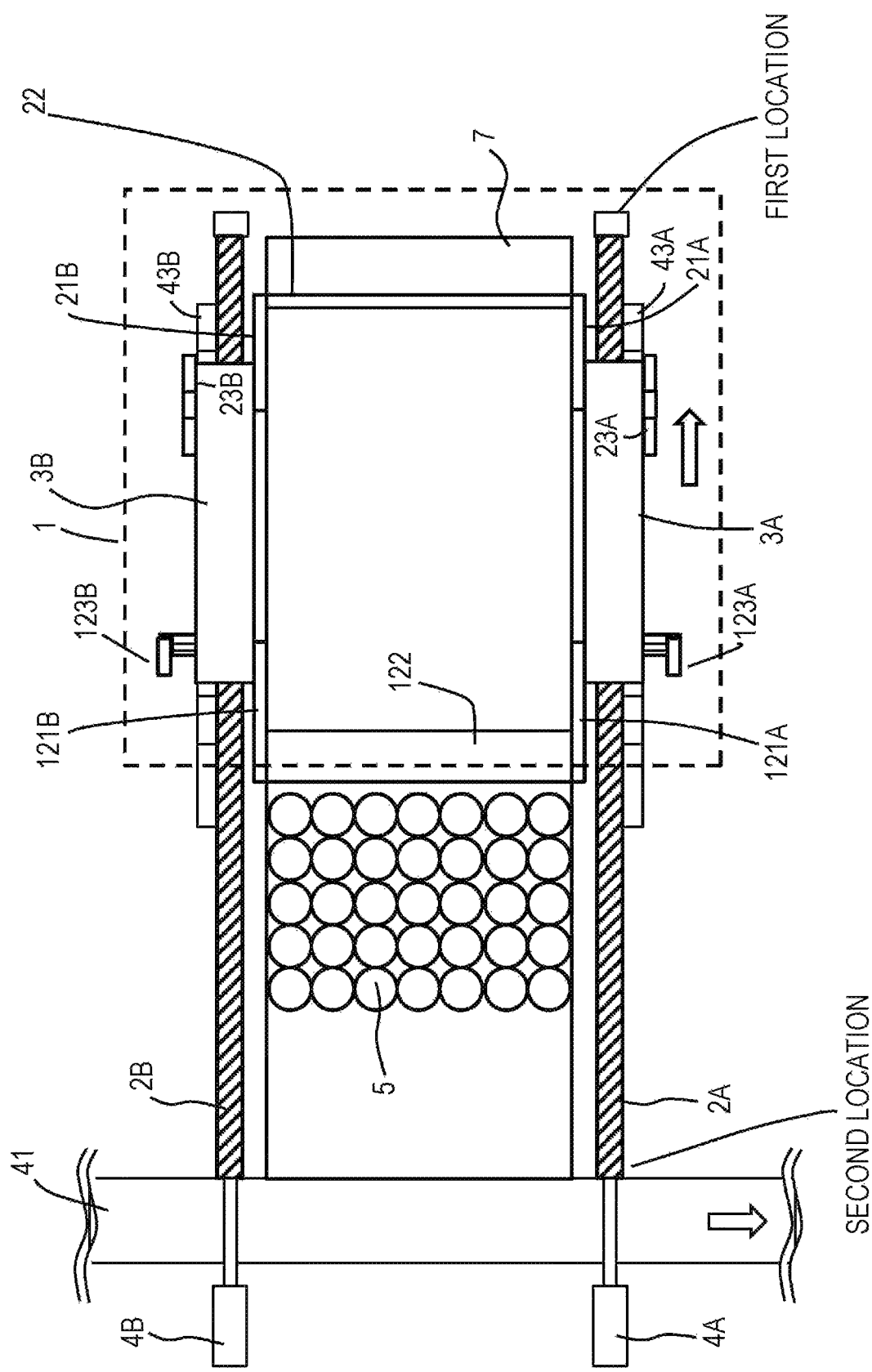
FIG. 60 is a schematic top view of the conveyance device according to the fourth embodiment.
Figure 61:
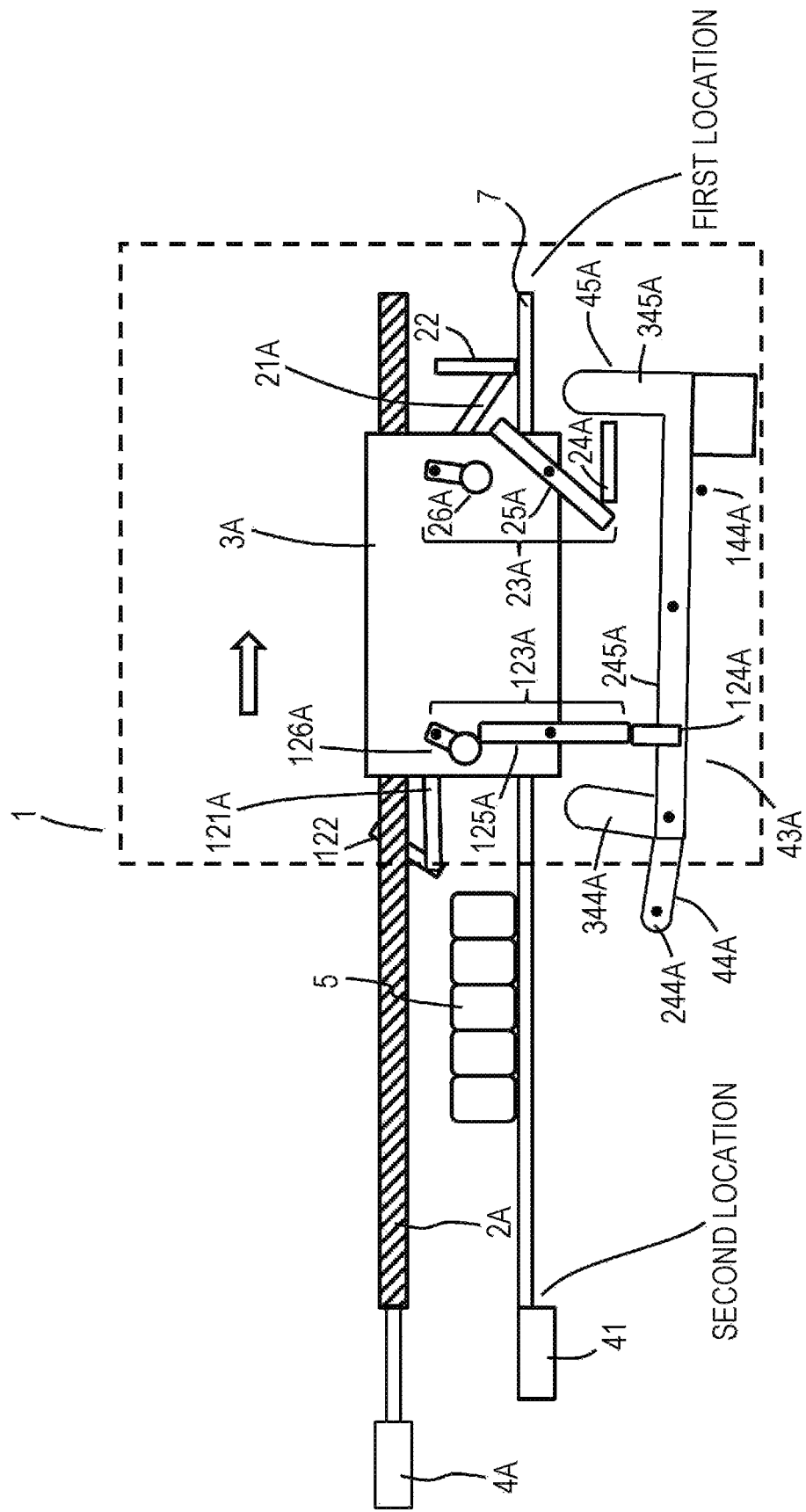
FIG. 61 is a schematic side view of the conveyance device according to the fourth embodiment.
Figure 62:
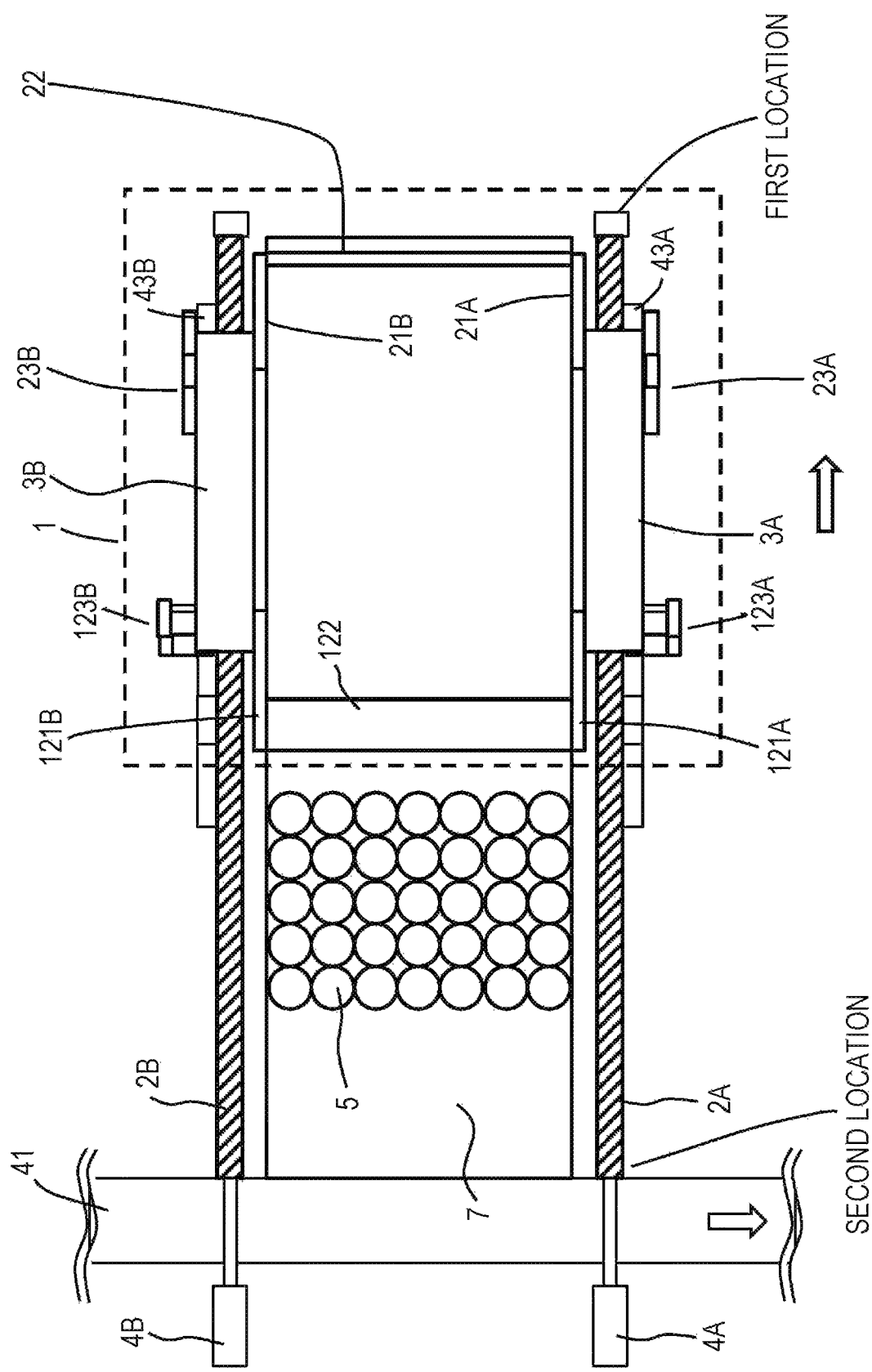
FIG. 62 is a schematic top view of the conveyance device according to the fourth embodiment.
Figure 63:
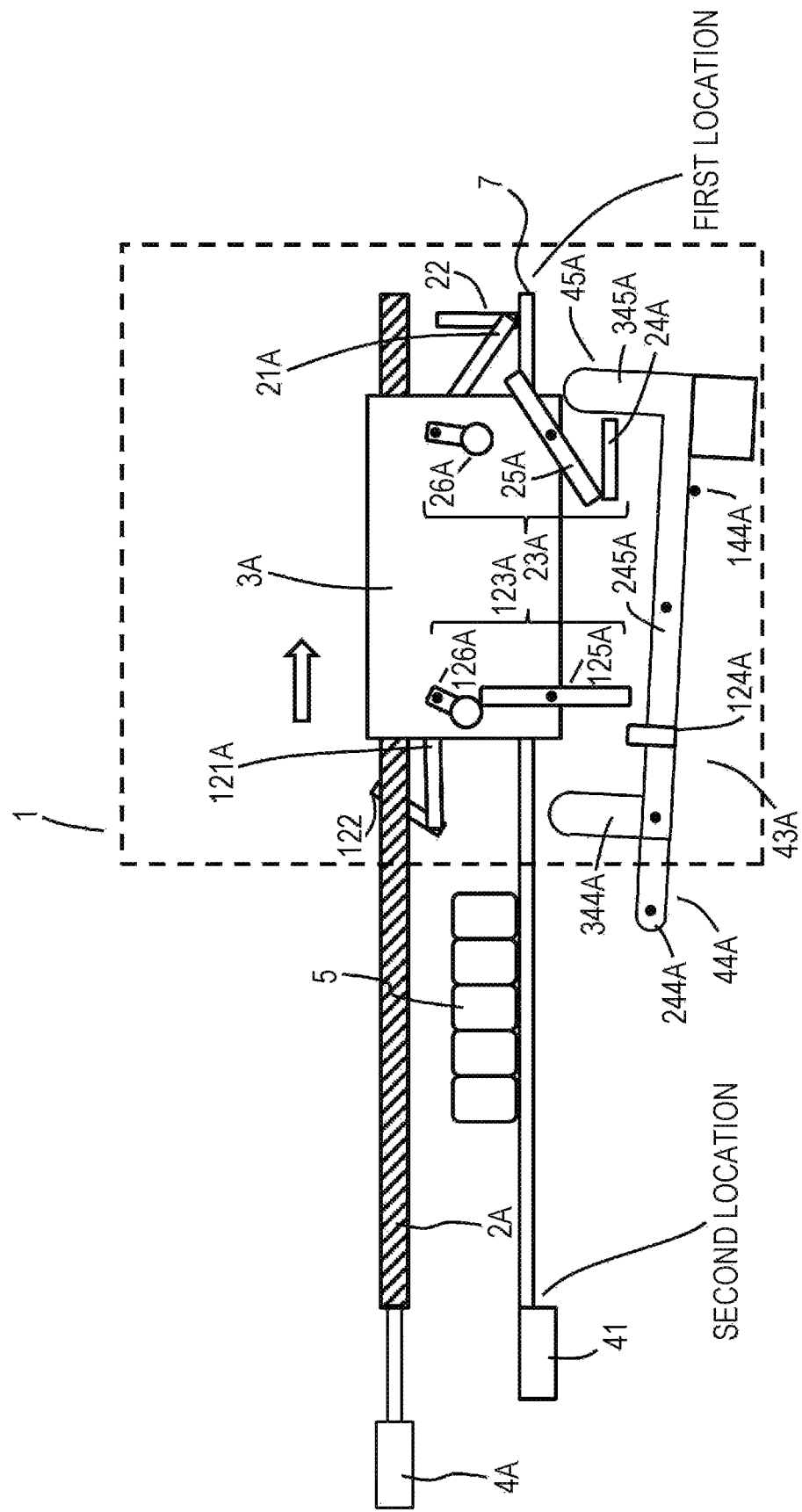
FIG. 63 is a schematic side view of the conveyance device according to the fourth embodiment.

In such a circumstance, as illustrated in FIG. 60 and FIG. 61, the moving members 3A and 3B move again in the direction toward the first location at the back portion of the chamber 1. As illustrated in FIG. 62 and FIG. 63, the moving members 3A and 3B move until the second inhibiting mechanisms 123A and 123B are positioned on the side of the first location with respect to the second dogs 124A and 124B. Here, the moving member 3A comes into contact with the first contact portion 345A of the first link 45A of the dog holding member 43A. The first link 45A whose the first contact portion 345A is pushed by the moving member 3A rotates such that the second dog 124A ascends. At this time, when the rotating shaft of the first link 45A, the movable pin connecting the first horizontal shaft portion 245A and the second horizontal shaft portion 244A to each other, and the rotating shaft of the second link 44A are aligned with each other, the second dog 124A does not easily descend even when an external force is applied to an upper end of the second dog 124A. The same is true of the moving member 3B, the dog holding member 43B, and the second dog 124B.

Figure 64:
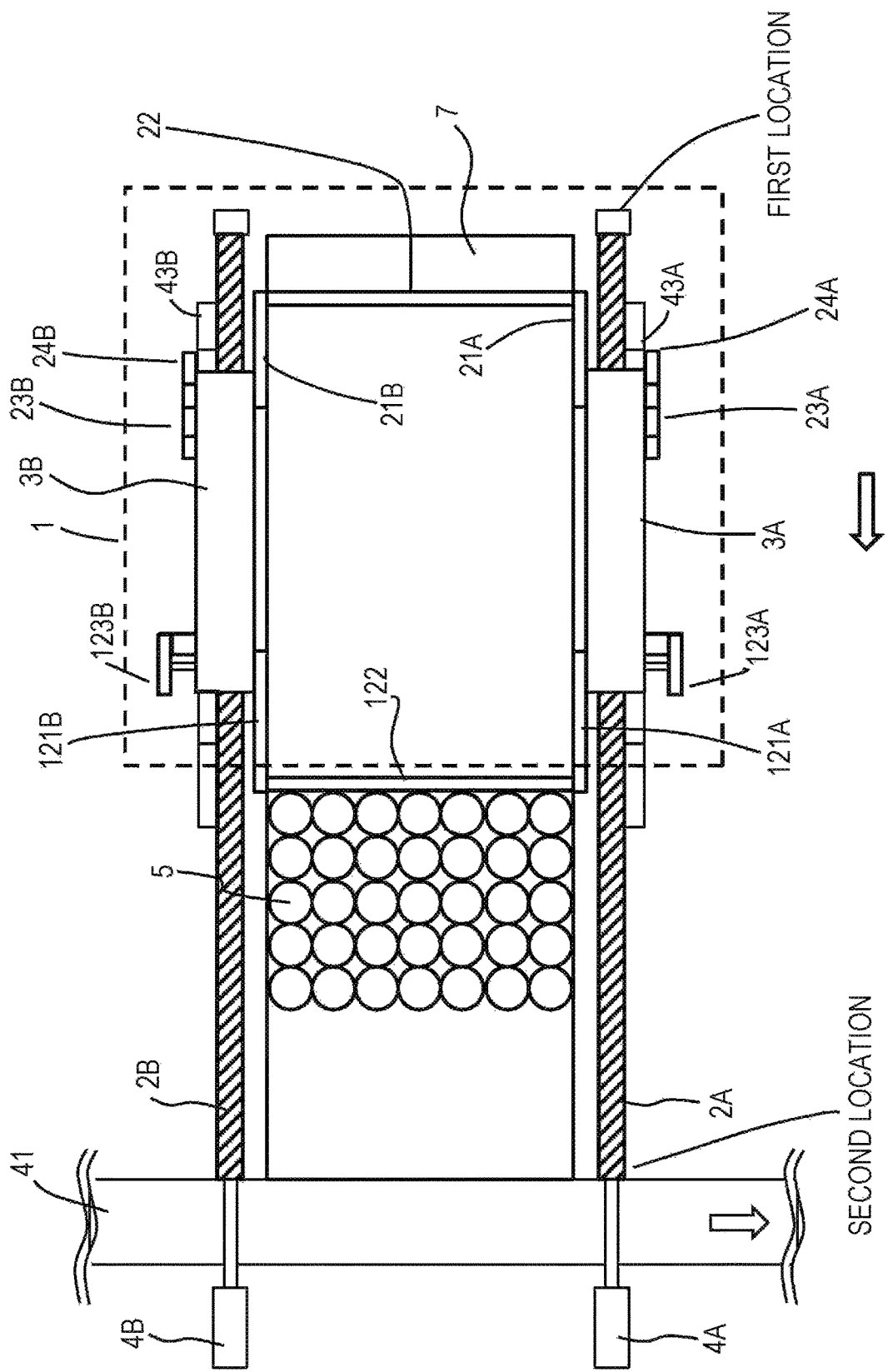
FIG. 64 is a schematic top view of the conveyance device according to the fourth embodiment.
Figure 65:
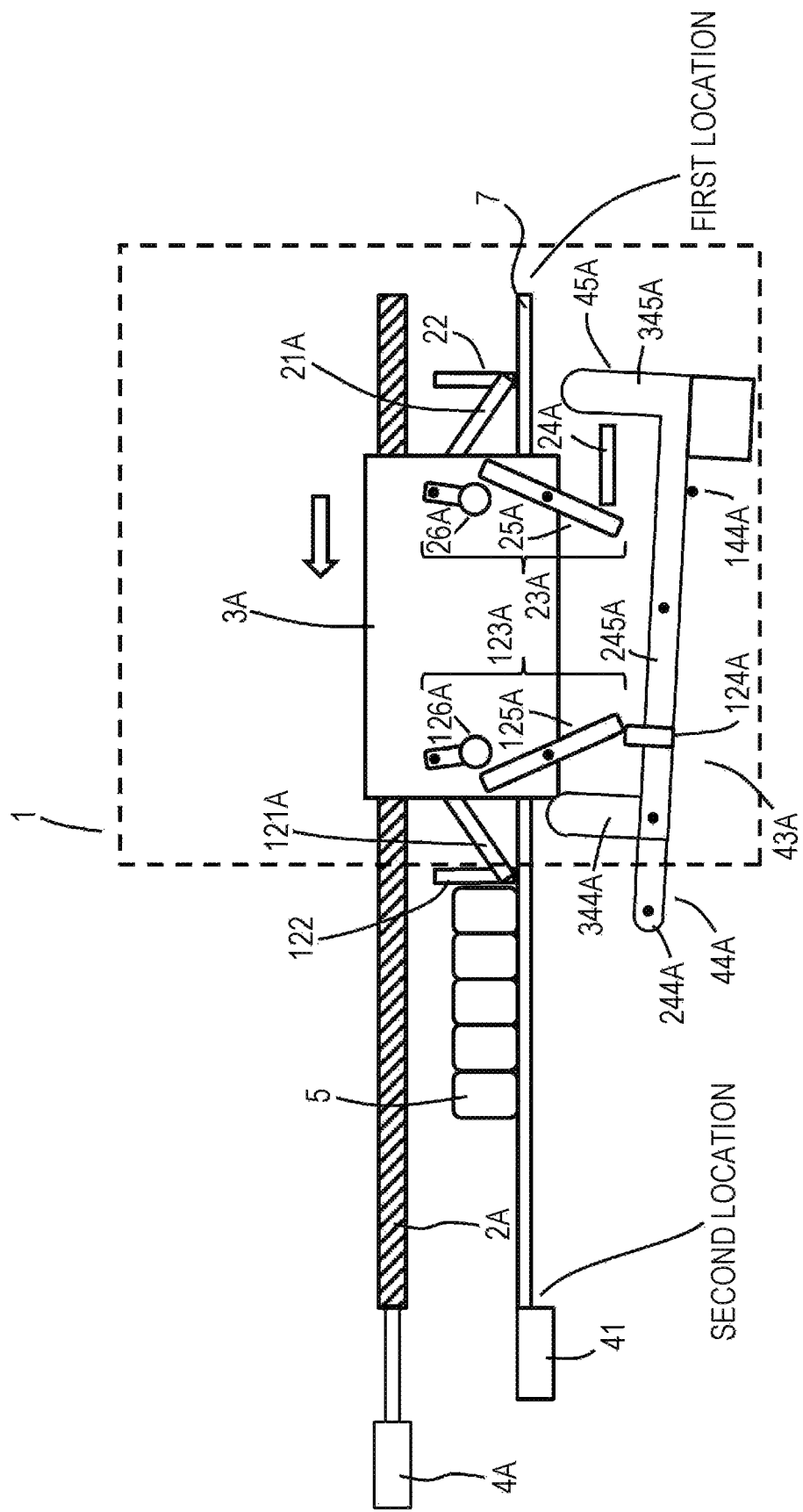
FIG. 65 is a schematic side view of the conveyance device according to the fourth embodiment.

Next, as illustrated in FIG. 64 and FIG. 65, when the moving members 3A and 3B move in the direction toward the second location outside the chamber 1, the second dog 124A pushes and rotates the first rotary member 125A of the second inhibiting mechanism 123A to deactivate the second inhibiting mechanism 123A. The same is true of the second inhibiting mechanism 123B. Consequently, inhibition of the rotation of the second shafts 121A and 121B is deactivated, and the second contact member 122 descends together with the second shafts 121A and 121B toward the table 7.

Figure 66:
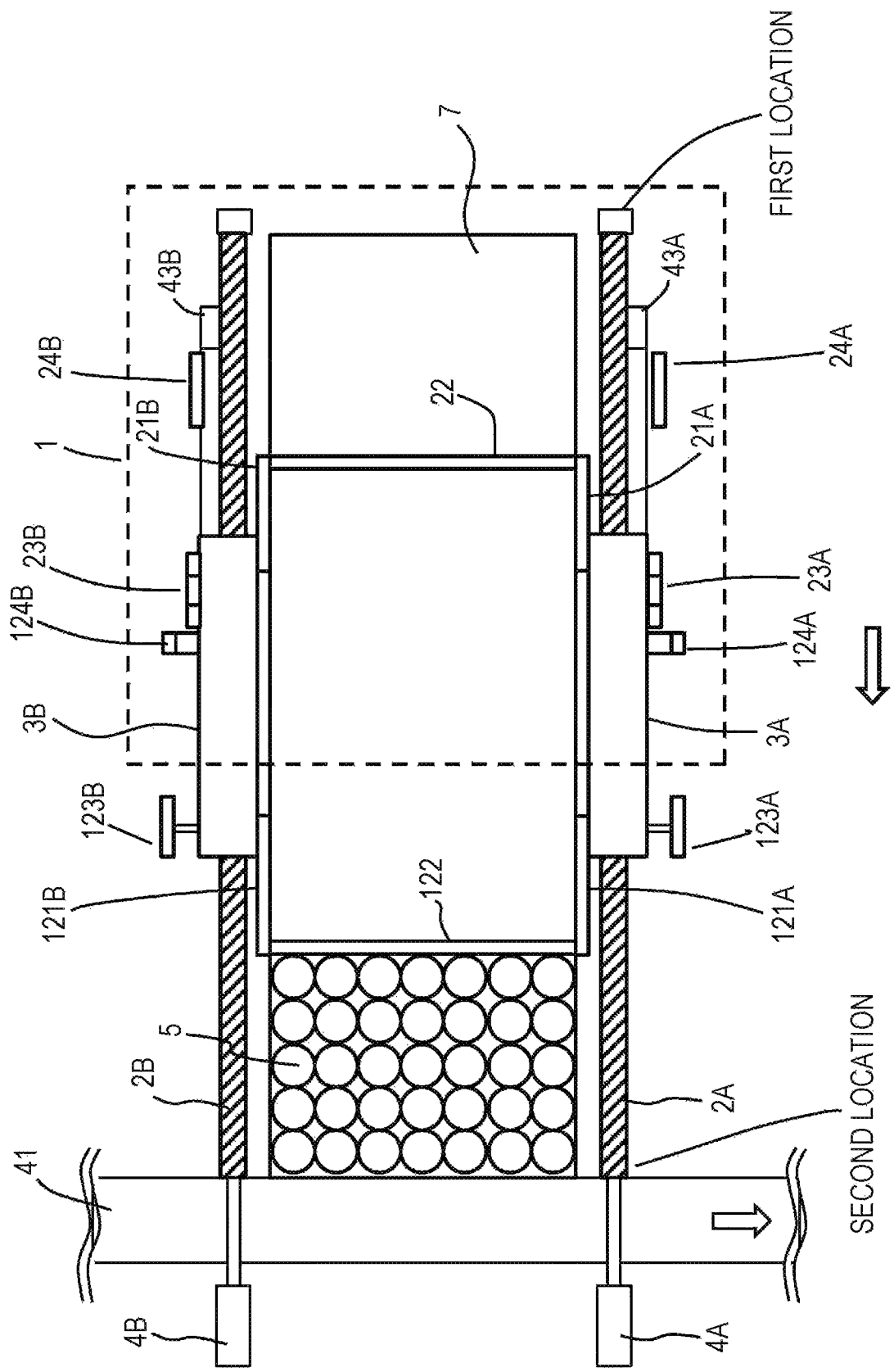
FIG. 66 is a schematic top view of the conveyance device according to the fourth embodiment.
Figure 67:
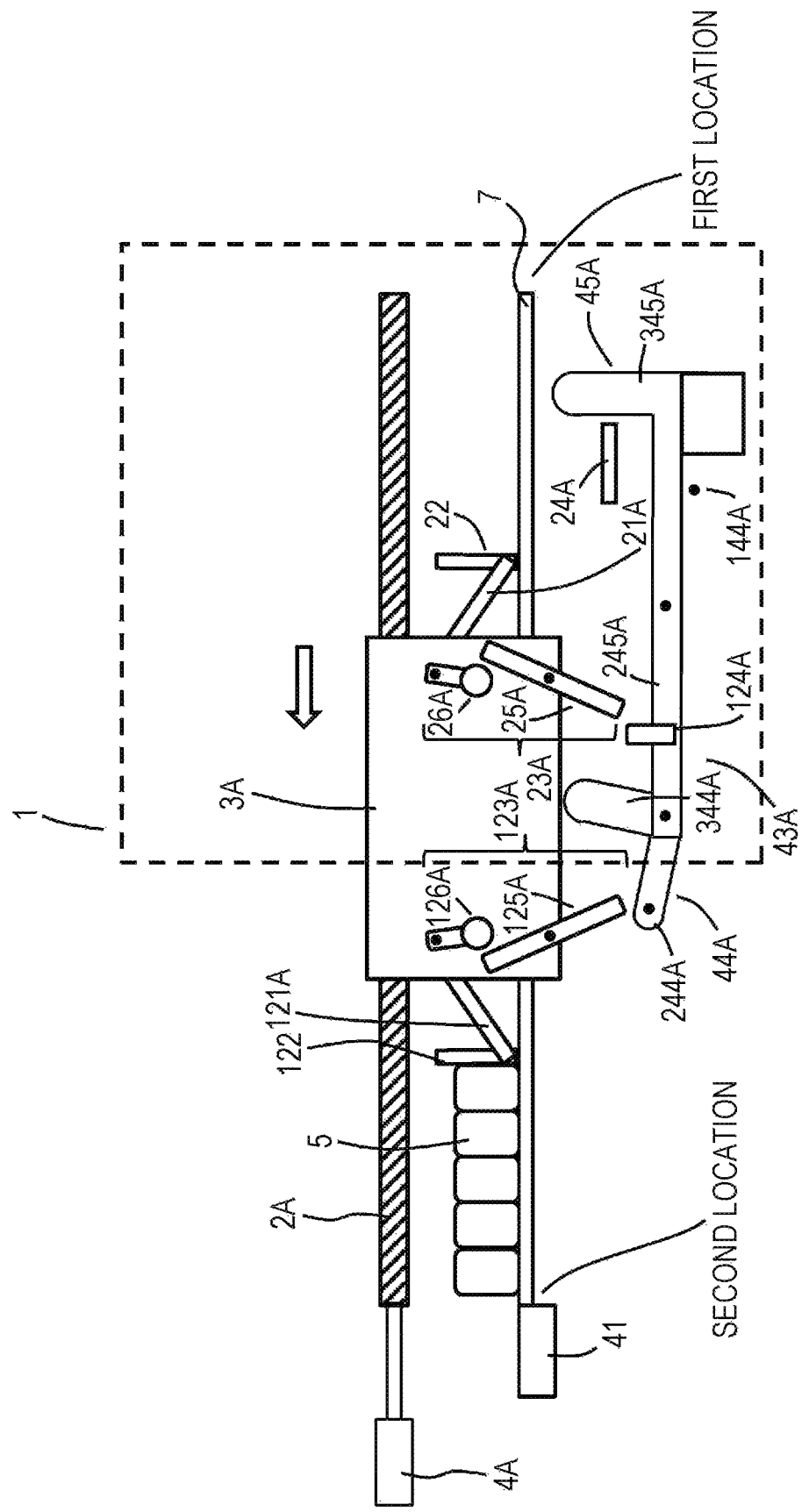
FIG. 67 is a schematic side view of the conveyance device according to the fourth embodiment.

As illustrated in FIG. 66 and FIG. 67, after the second contact member 122 descends, the moving members 3A and 3B move in the direction toward the second location outside the chamber 1 to push the article 5 by using the second contact member 122, thereby moving the article 5 in the direction toward the second location. The moving member 3A comes into contact with the second contact portion 344A of the second link 44A. The second link 44A whose the second contact portion 344A is pushed by the moving member 3A rotates the first link 45A such that the second dog 124A descends. The same is true of the moving member 3B, the dog holding member 43B, and the second dog 124B.

Figure 68:
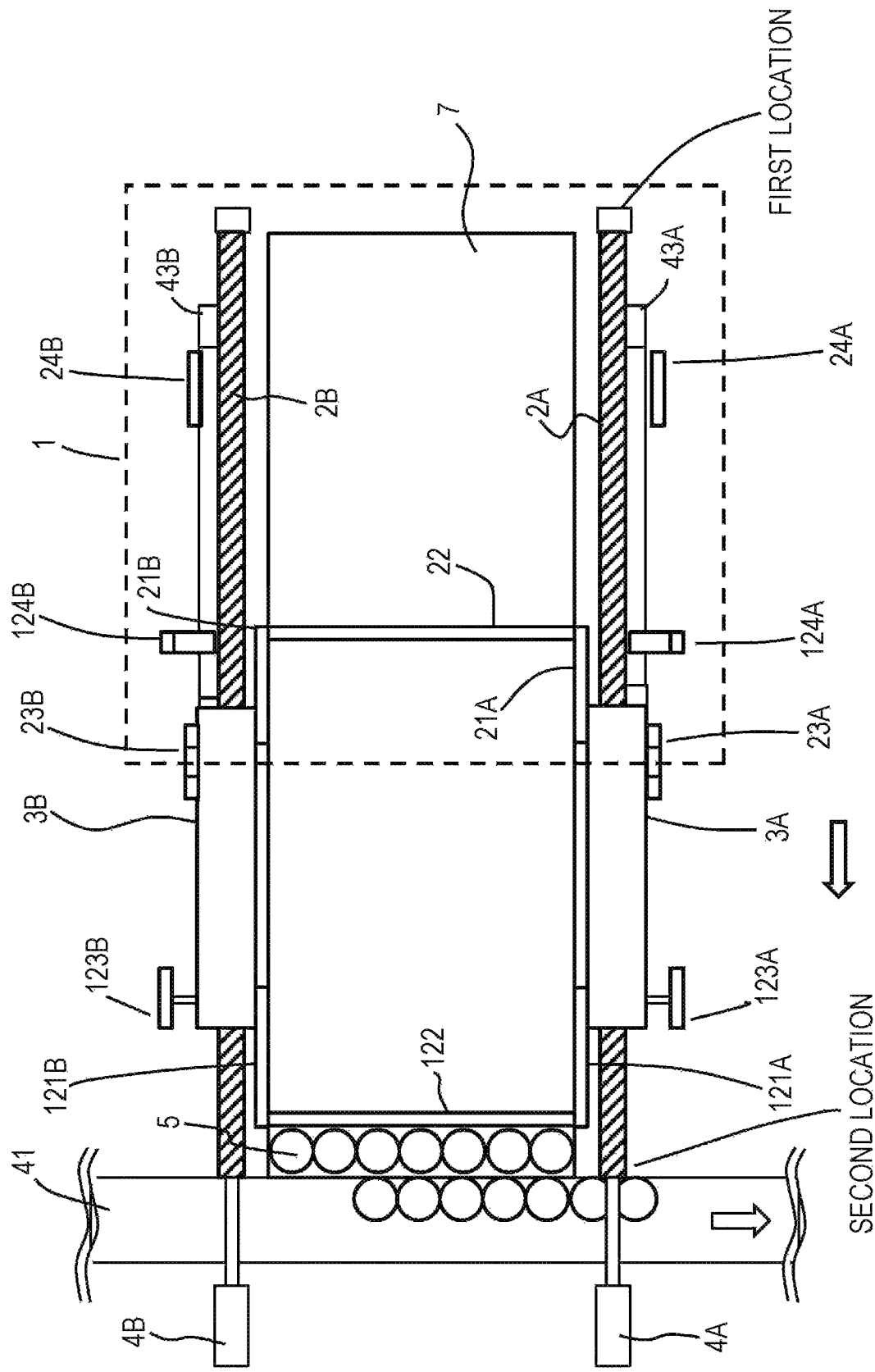
FIG. 68 is a schematic top view of the conveyance device according to the fourth embodiment.
Figure 69:
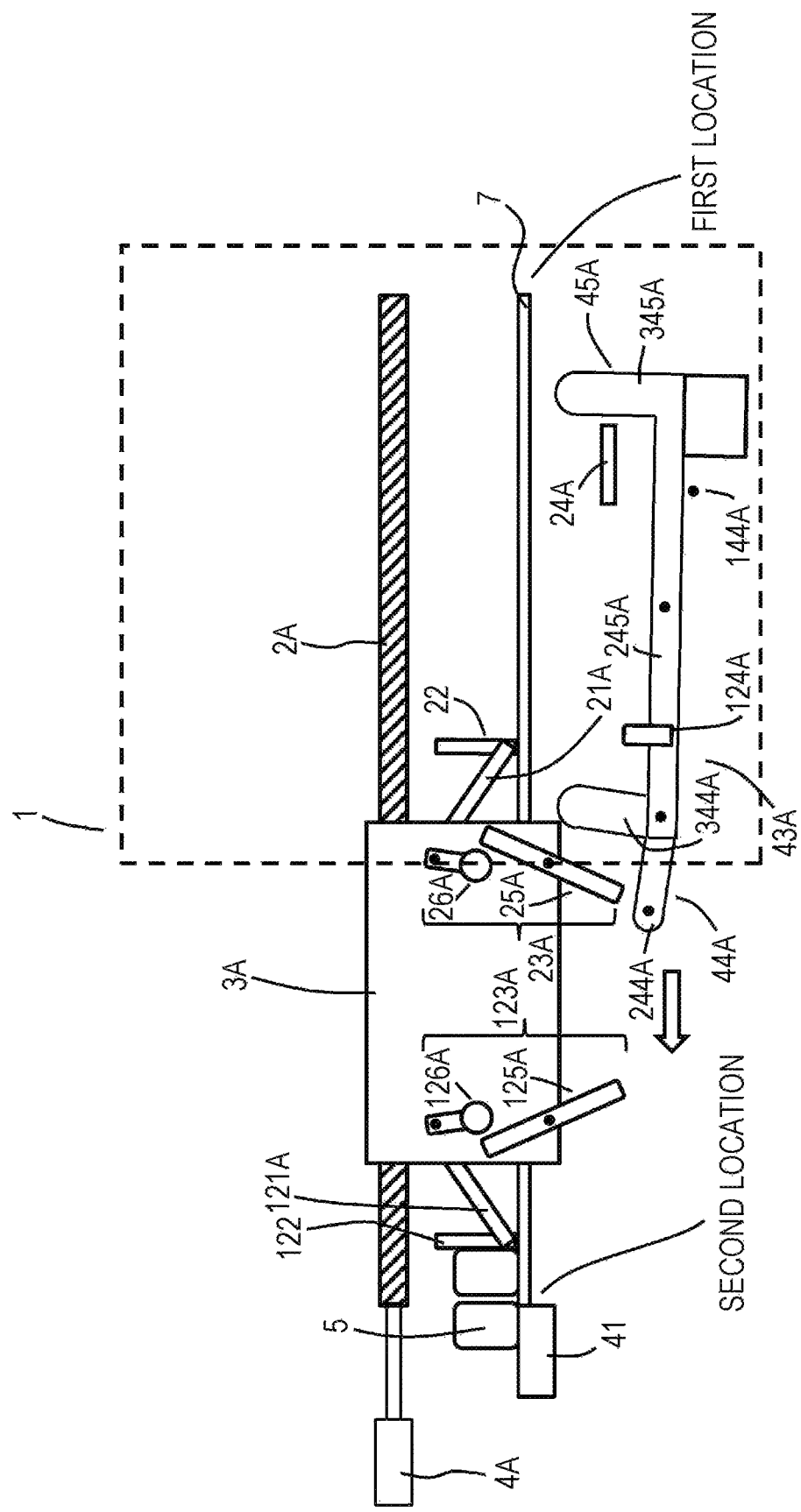
FIG. 69 is a schematic side view of the conveyance device according to the fourth embodiment.

As illustrated in FIG. 68 and FIG. 69, the second contact member 122 is connected to the moving members 3A and 3B on the side of the second location and is thus capable of moving the article 5 that is on the table 7 onto the conveyor 41 disposed on the side of the second location so as to be adjacent to the table 7.

Fifth Embodiment

Figure 70:
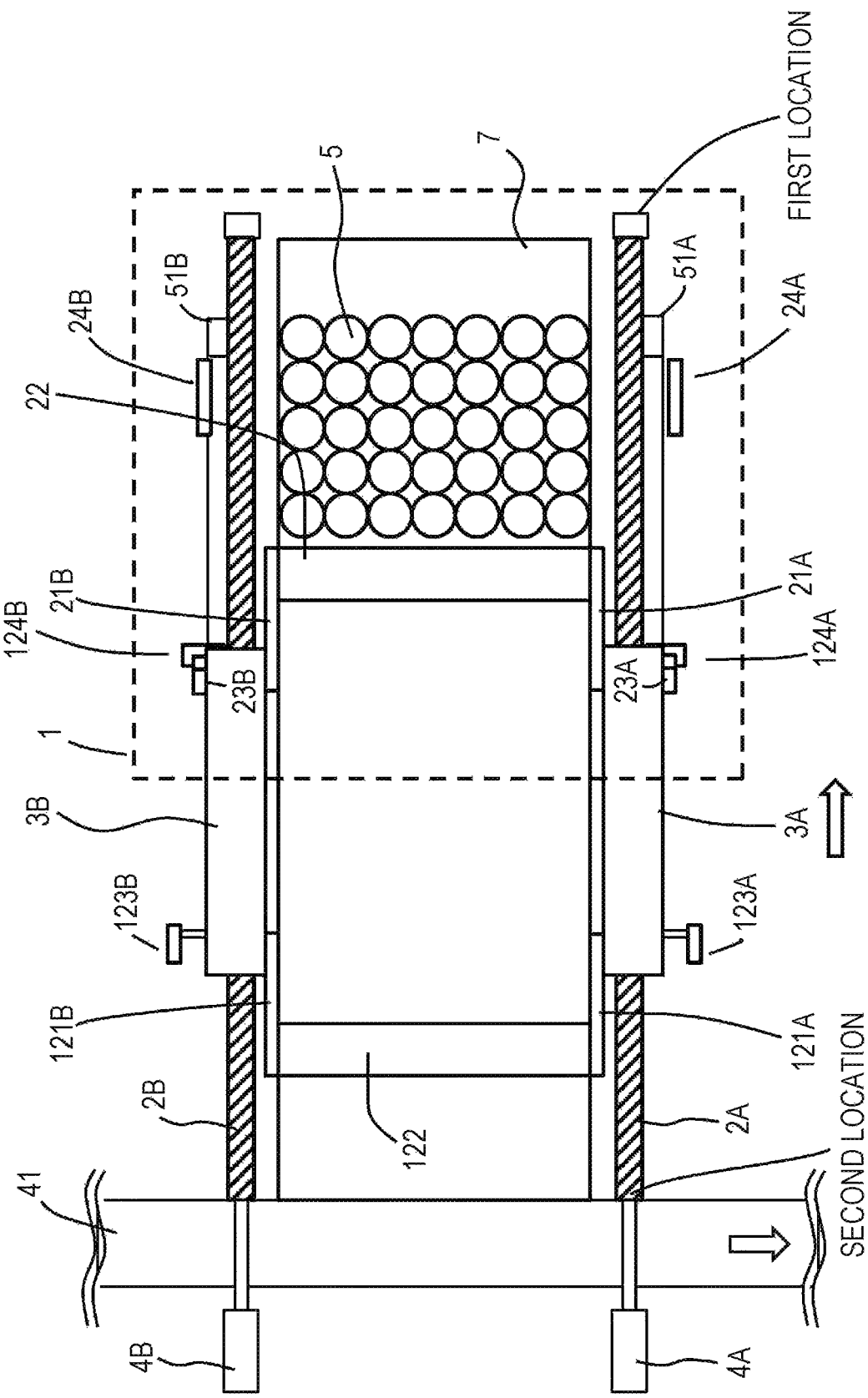
FIG. 70 is a schematic top view of a conveyance device according to a fifth embodiment.
Figure 71:
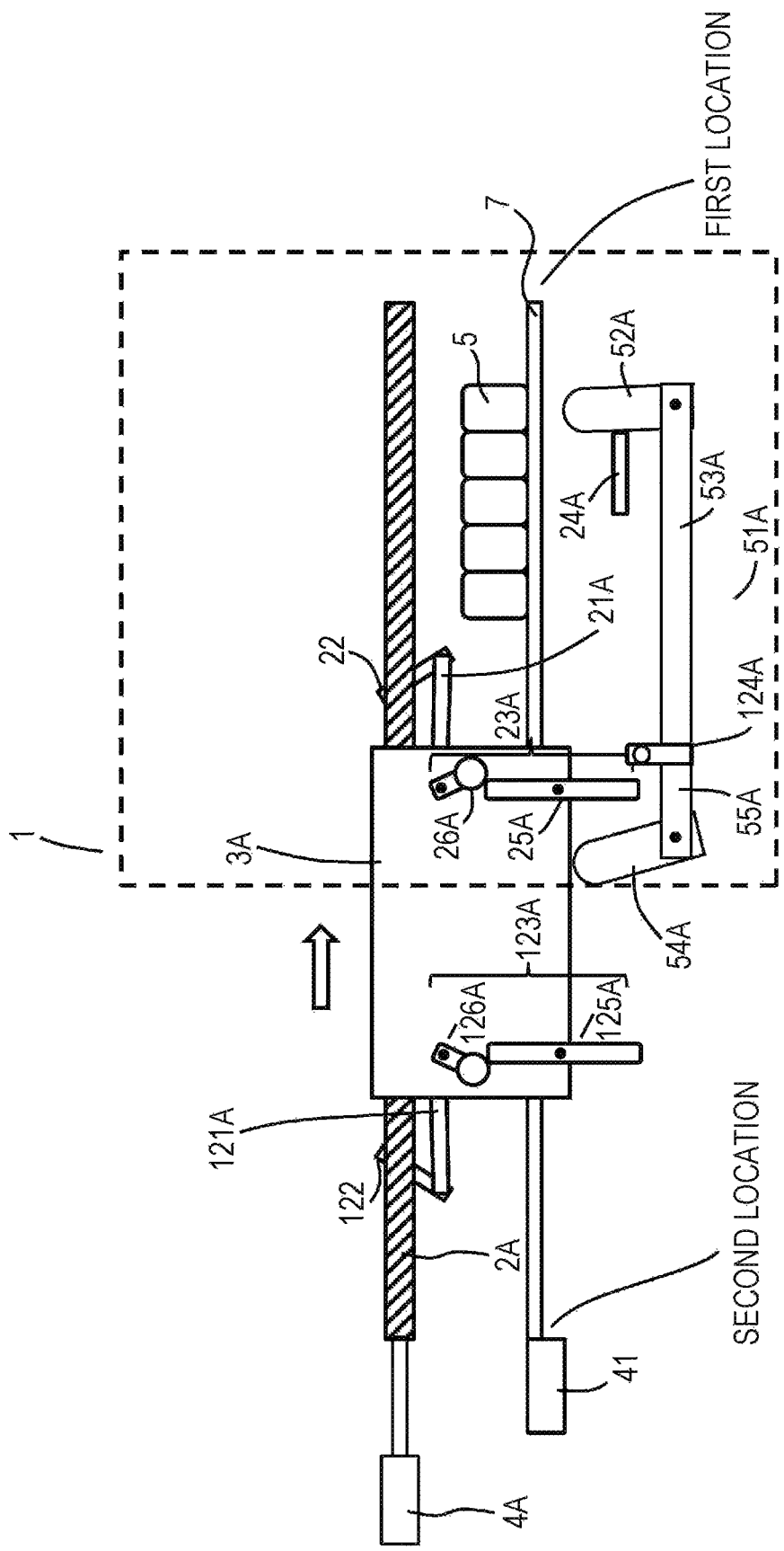
FIG. 71 is a schematic side view of the conveyance device according to the fifth embodiment.

In the conveyance device according to a fifth embodiment, as illustrated in FIG. 70 and FIG. 71, the second dog 124A is held by a dog holding member 51A. the dog holding member 51A includes a first contact link 52A that is disposed on the side of the first location and that comes into contact with the moving member 3A to receive a force, a first follower link 53A that is connected to the first contact link 52A with a movable pin and that receives a force toward the second location from the first contact link 52A, a second contact link 54A that is disposed on the side of the second location and that comes into contact with the moving member 3A to receive a force, and a second follower link 55A that is connect to the second contact link 54A with a movable pin and that receives a force toward the first location from the second contact link 54A.

When the first contact link 52A receives a downward force, the first follower link 53A moves in the direction toward the second location. When the first follower link 53A moves in the direction toward the second location, the second follower link 55A is pushed via the second dog 124A and moves in the direction toward the second location. When the second follower link 55A moves in the direction toward the second location, the second contact link 54A ascends.

When the second contact link 54A receives a downward force, the second follower link 55A moves in the direction toward the first location. When the second follower link 55A moves in the direction toward the first location, the first follower link 53A is pushed via the second dog 124A and moves in the direction toward the first location. When the first follower link 53A moves in the direction toward the first location, the first contact link 52A ascends.

Figure 72:
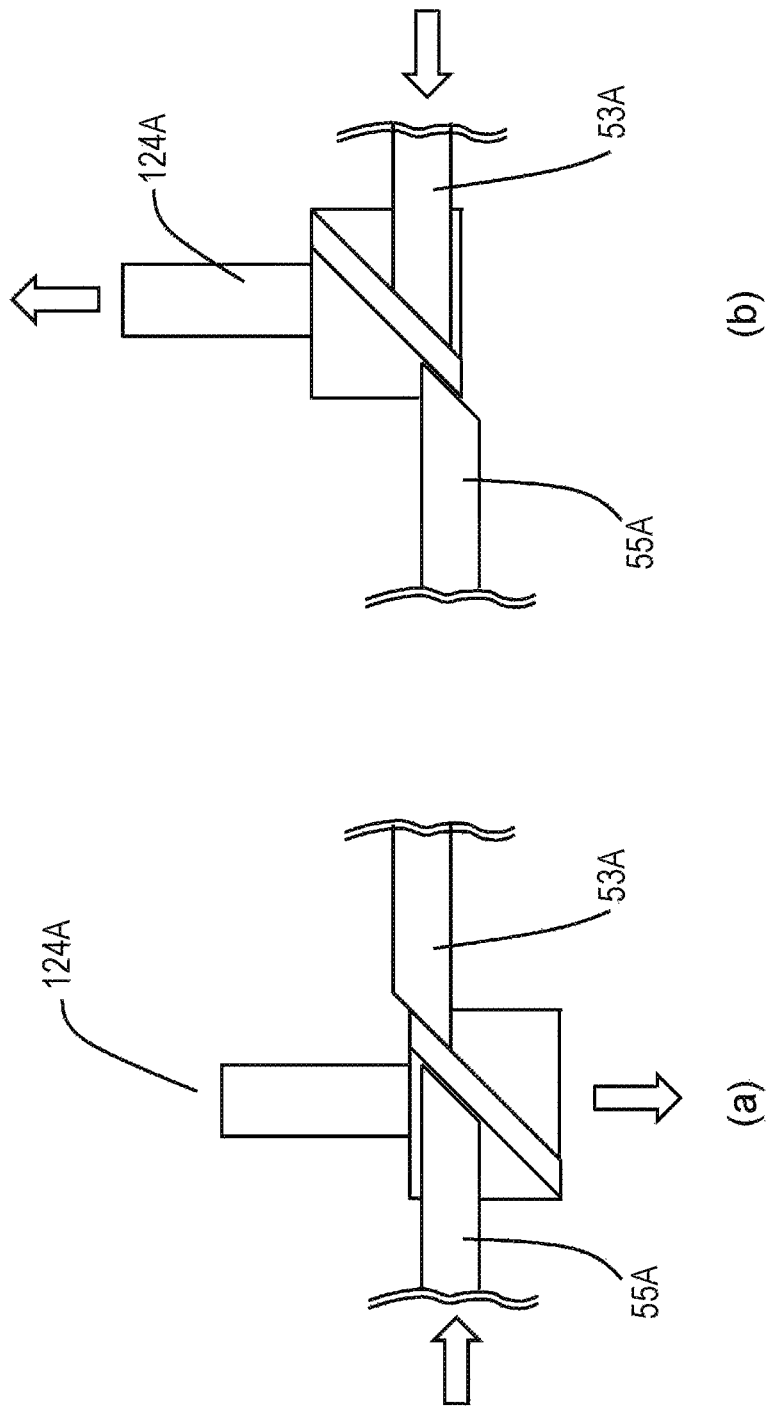
FIG. 72 is a schematic bottom view of a dog holding member of the conveyance device according to the fifth embodiment.

As illustrated in FIG. 72(a), the second dog 124A is pushed by the second follower link 55A and moves, due to an orthogonal slide mechanism, to a location where deactivation of the second inhibiting mechanism 123A is not possible. For example, when pushed by the second follower link 55A, the second dog 124A moves, due to the orthogonal slide mechanism, in a direction parallel to a side surface of the table 7 and perpendicular to the advancing direction of the moving member 3A and becomes away from a path of the second inhibiting mechanism 123A.

As illustrated in FIG. 72(b), the second dog 124A is pushed by the first follower link 53A and moves, due to the orthogonal slide mechanism, to a location where deactivation of the second inhibiting mechanism 123A is possible. For example, when pushed by the first follower link 53A, the second dog 124A moves, due to the orthogonal slide mechanism, in the direction parallel to the side surface of the table 7 and perpendicular to the advancing direction of the moving member 3A and becomes close to the path of the second inhibiting mechanism 123A.

The first contact link 52A, illustrated in FIG. 71, has a size with which the first contact link 52A comes into contact with the moving member 3A when positioned closest to the moving member 3A. The second contact link 54A also has a size with which the second contact link 54A comes into contact with the moving member 3A when positioned closest to the moving member 3A.

The second dog 124A has a size with which the second dog 124A comes into contact, when the first contact link 52A is pushed by the moving member 3A and when the first follower link 53A moves in the direction toward the second location, with the second inhibiting mechanism 123A to deactivate the second inhibiting mechanism 123A. The second dog 124A has a size with which the second dog 124A does not deactivate the second inhibiting mechanism 123A when the second contact link 54A is pushed by the moving member 3A and when the second follower link 55A moves in the direction toward the first location.

The same is true of the second dog 124B, illustrated in FIG. 70, and a dog holding member 51B that holds the second dog 124B. The other components of the conveyance device according to the fifth embodiment are identical to those of the conveyance device according to the second embodiment.

Figure 73:
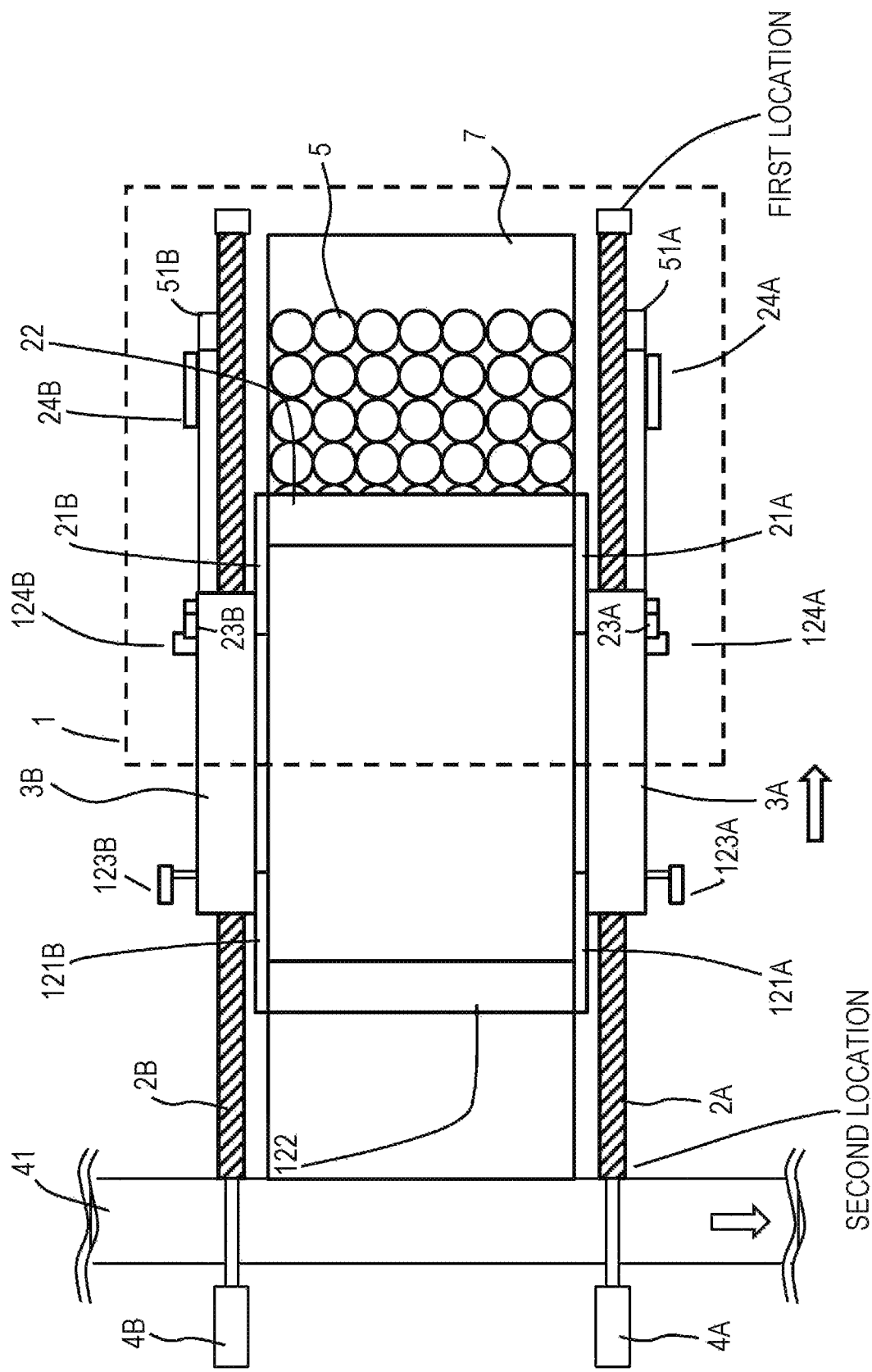
FIG. 73 is a schematic top view of the conveyance device according to the fifth embodiment.
Figure 74:
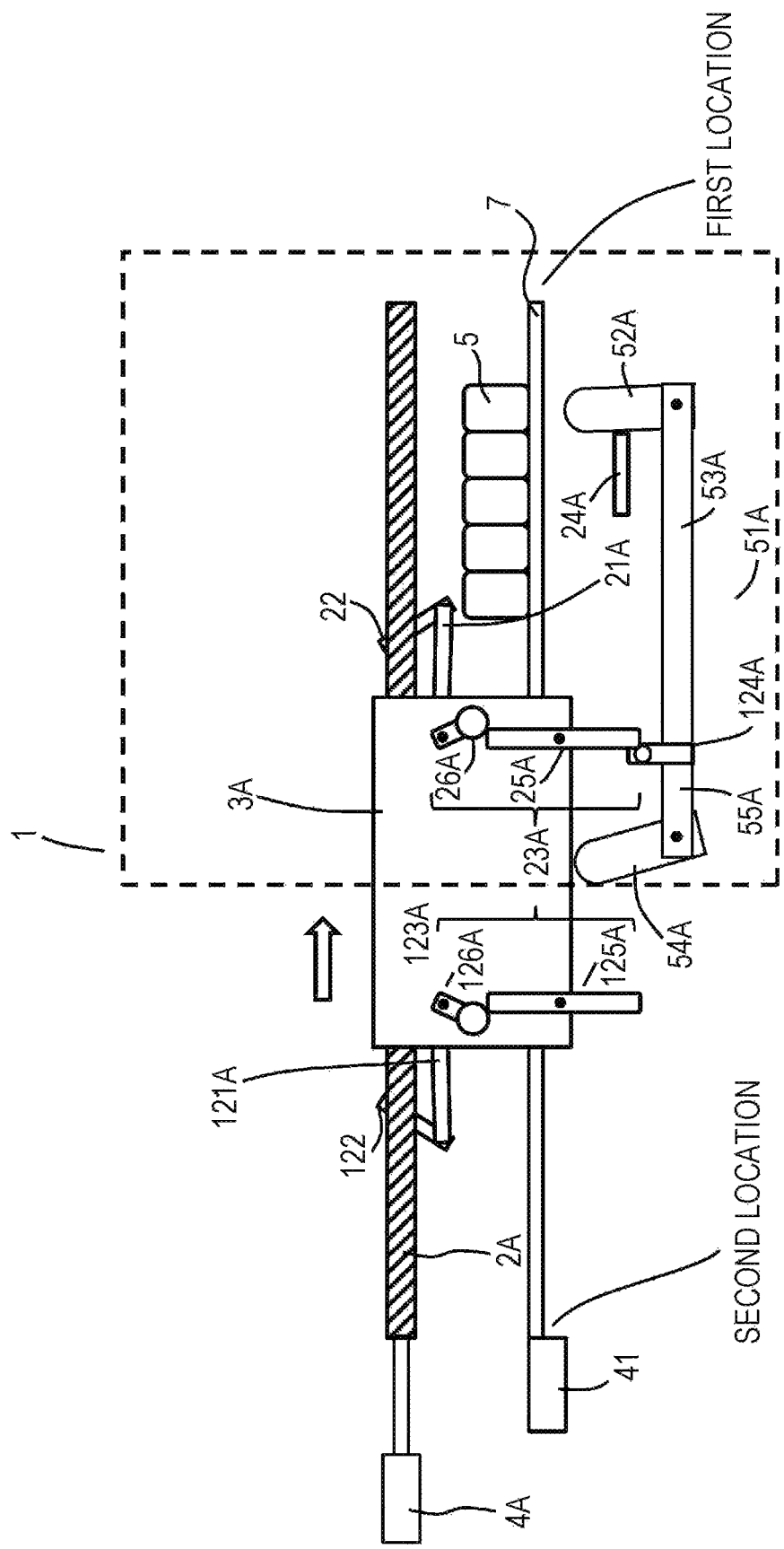
FIG. 74 is a schematic side view of the conveyance device according to the fifth embodiment.

Hereinafter, a method by which the conveyance device according to the fifth embodiment conveys out the article 5 that is inside the chamber 1. First, the moving members 3A and 3B move in the direction toward the first location at the back portion of the chamber 1. At this time, as illustrated in FIG. 71, the second contact link 54A is pushed by the moving member 3A and descends. Thus, the second dogs 124A and 124B move to a location where deactivation of the second inhibiting mechanisms 123A and 123B is not possible. As illustrated in FIG. 73 and FIG. 74, the first inhibiting mechanisms 23A and 23B pass by the second dogs 124A and 124B without coming into contact with the second dogs 124A and 124B.

Figure 75:
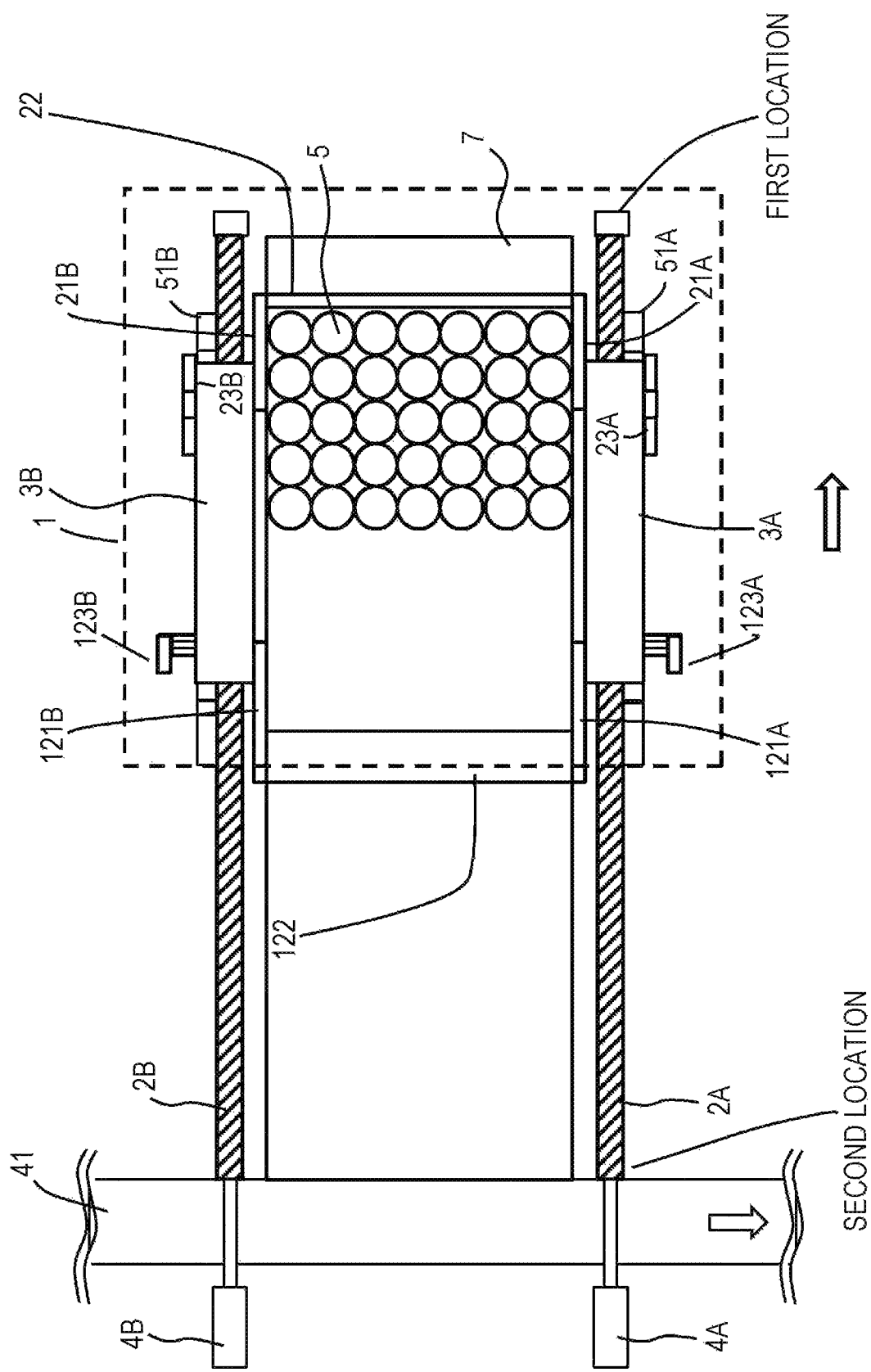
FIG. 75 is a schematic top view of the conveyance device according to the fifth embodiment.
Figure 76:
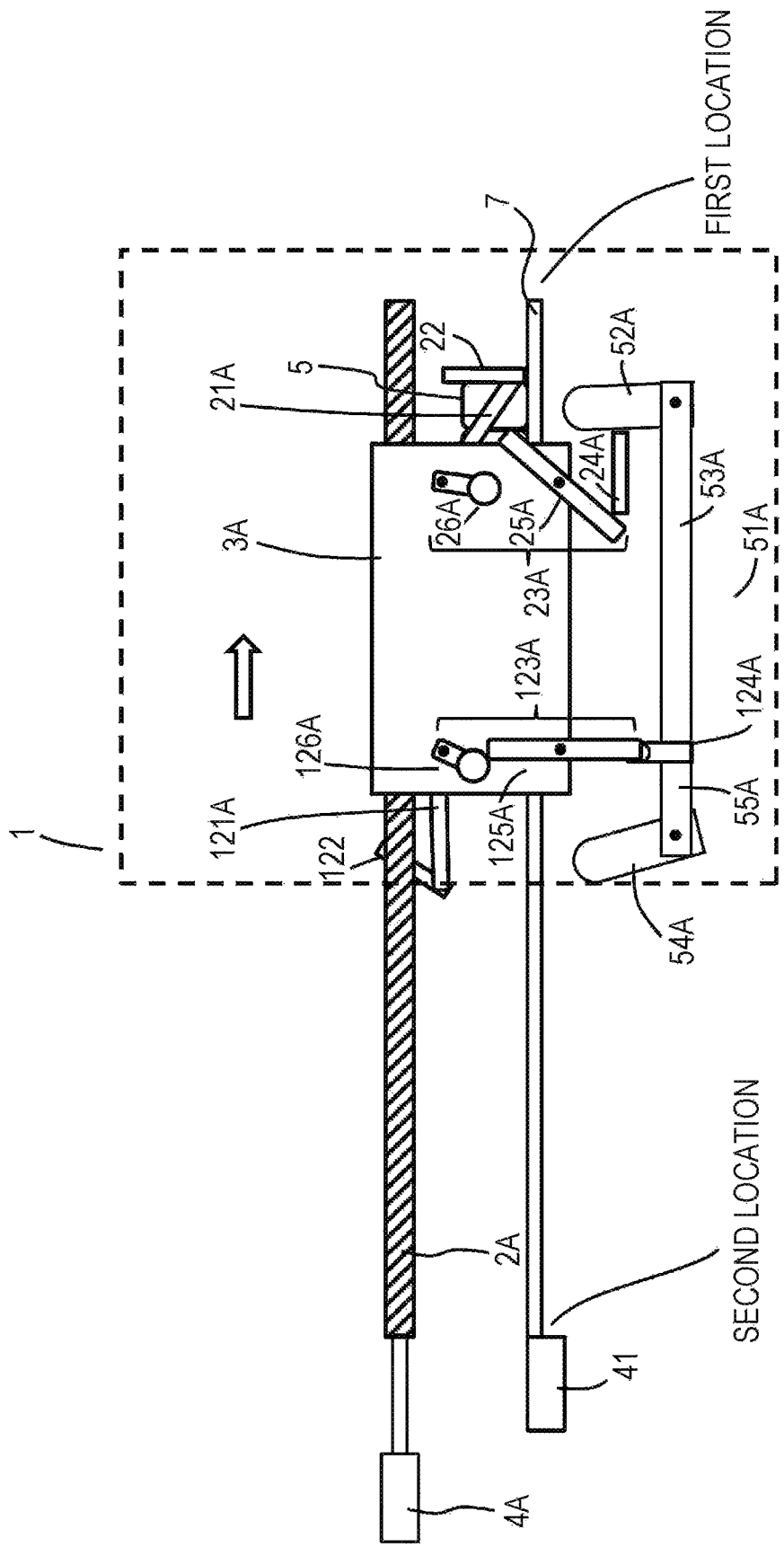
FIG. 76 is a schematic side view of the conveyance device according to the fifth embodiment.

As illustrated in FIG. 75 and FIG. 76, the first inhibiting mechanisms 23A and 23B respectively come into contact, at the back portion of the chamber 1 and on the side of the second location with respect to a location where the moving member 3A comes into contact with the first contact link 52A, with the first dogs 24A and 24B, and inhibition of the rotation of the first shafts 21A and 21B is deactivated. Thus, the first contact member 22 descends together with the first shafts 21A and 219 toward the table 7. The second inhibiting mechanism 123A passes by the second dog 124A; however, the second inhibiting mechanism 123A is not deactivated because the second dog 124A is held by the dog holding member 51A so as not to reach the first rotary member 125A included in the second inhibiting mechanism 123A. The same is true of the second inhibiting mechanism 123B.

Figure 77:
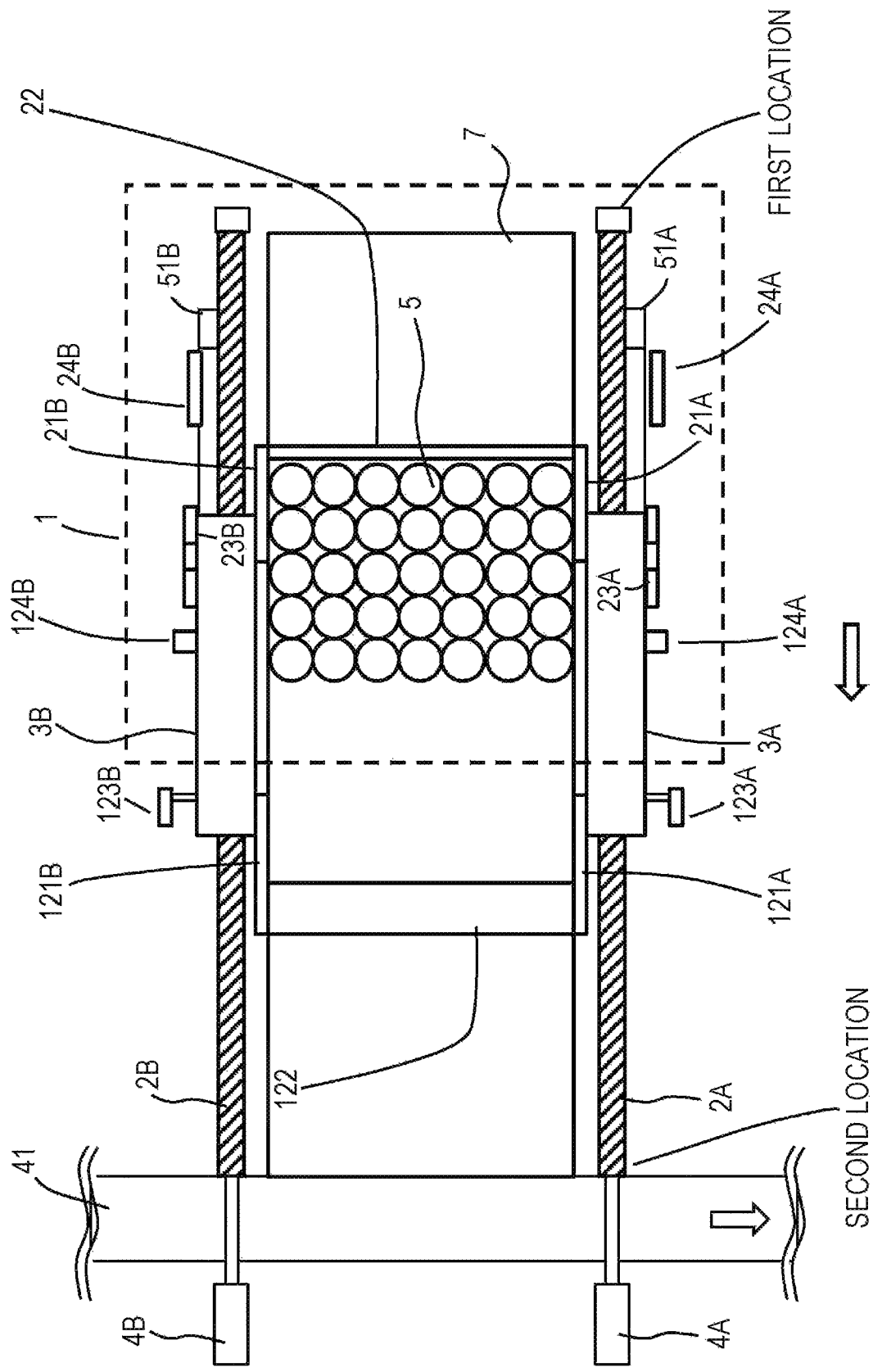
FIG. 77 is a schematic top view of the conveyance device according to the fifth embodiment.
Figure 78:
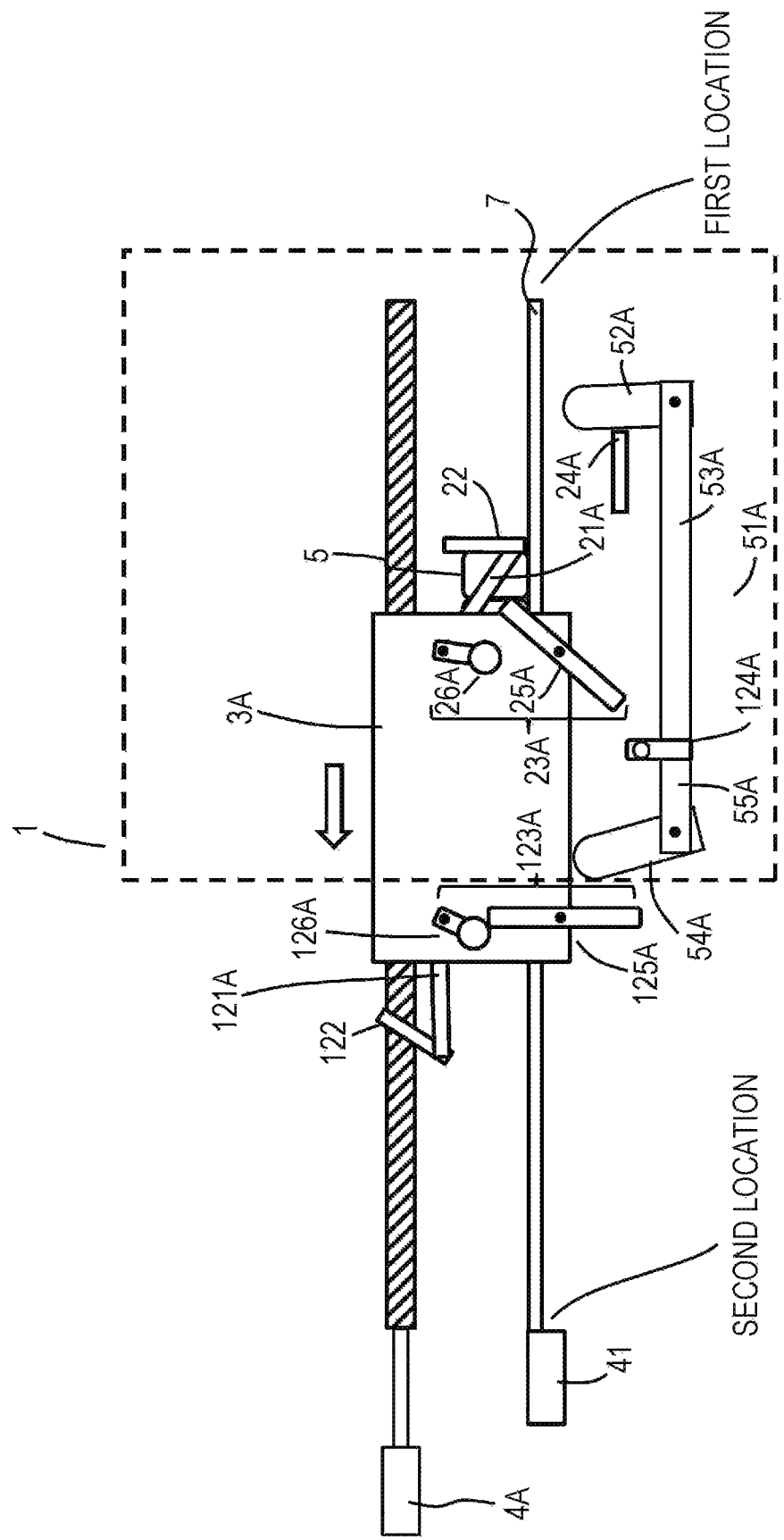
FIG. 78 is a schematic side view of the conveyance device according to the fifth embodiment.
Figure 79:
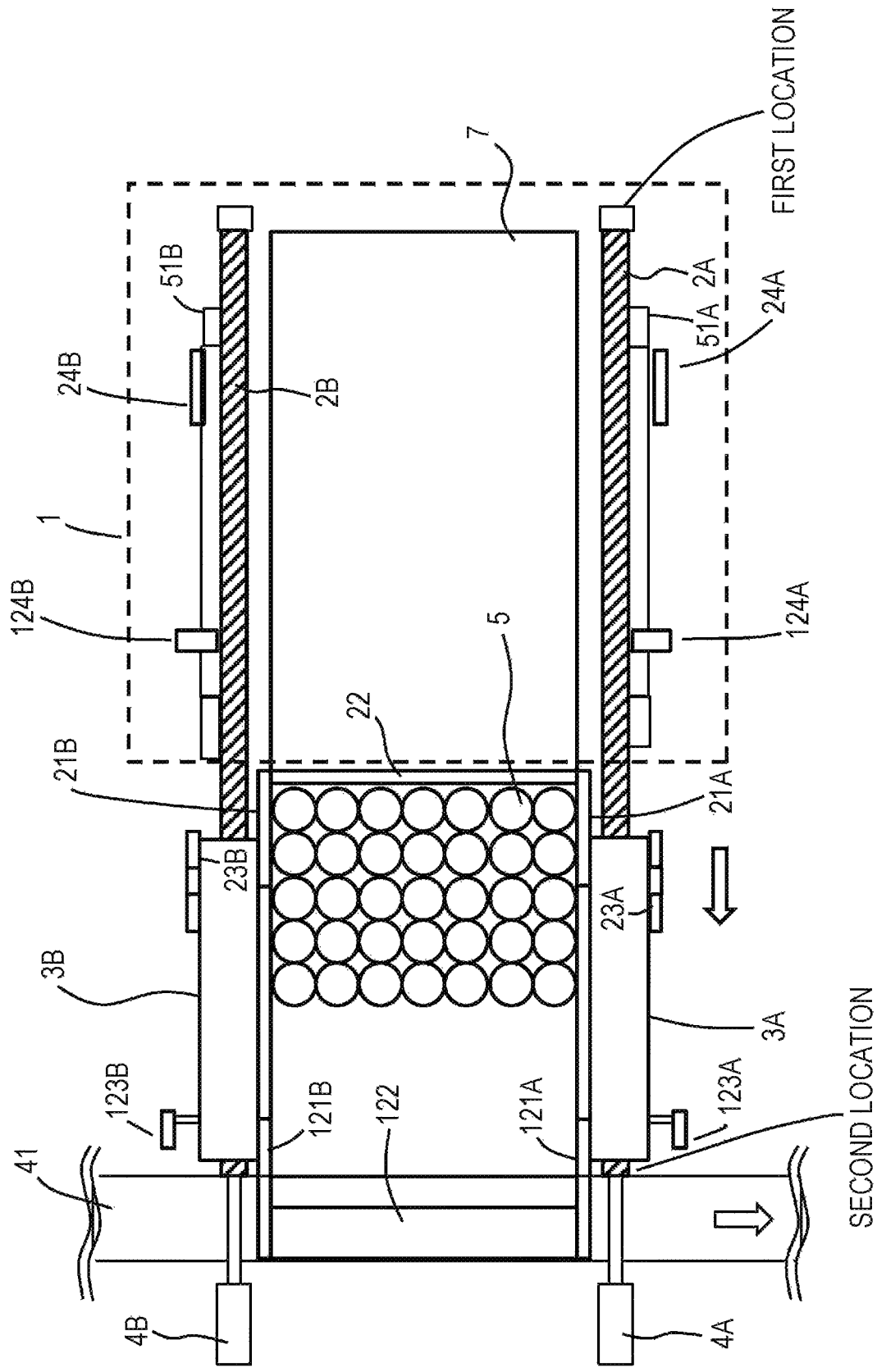
FIG. 79 is a schematic top view of the conveyance device according to the fifth embodiment.
Figure 80:
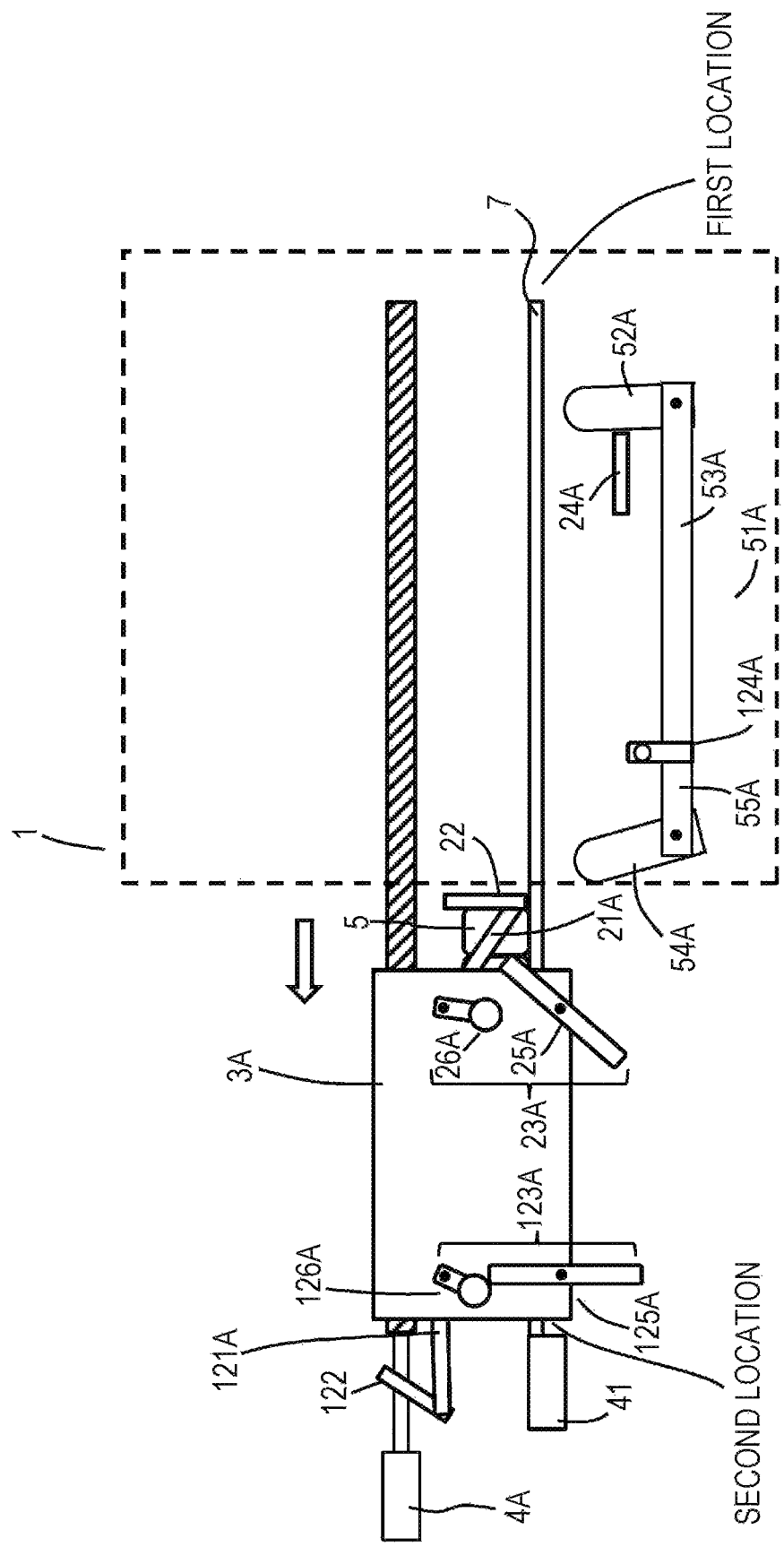
FIG. 80 is a schematic side view of the conveyance device according to the fifth embodiment.

As illustrated in FIG. 77 and FIG. 78, after the first contact member 22 descends, the moving members 3A and 3B move in the direction toward the second location outside the chamber 1 to push the article 5 by using the first contact member 22, thereby moving the article 5 in the direction toward the second location outside the chamber 1. Here, as illustrated in FIG. 79 and FIG. 80, there may be a circumstance in which it is not possible, even when the moving members 3A and 3B move to the second location, to move the article 5 that is on the table 7 onto the conveyor 41 disposed on the side of the second location so as to be adjacent to the table 7.

Figure 81:
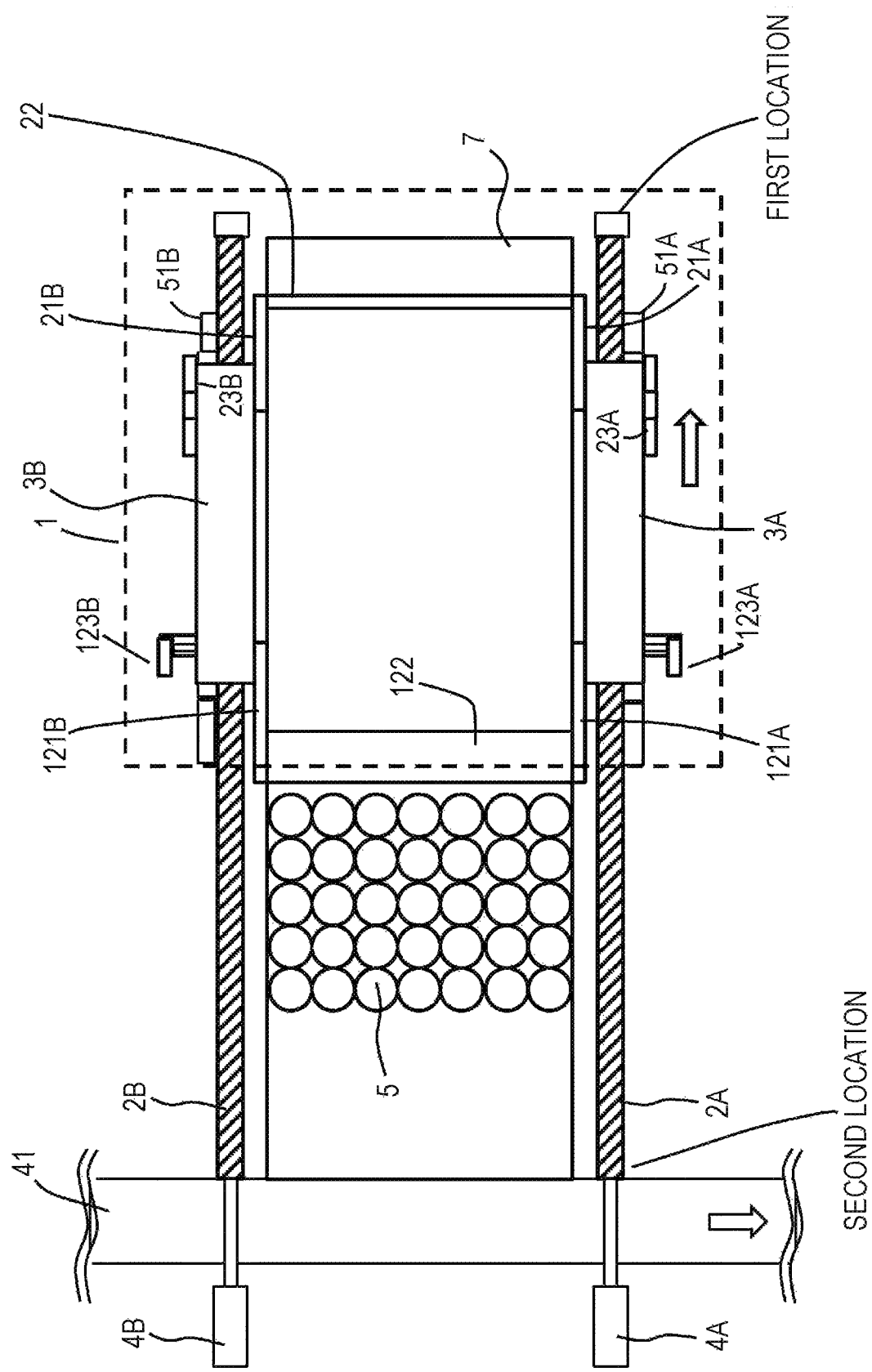
FIG. 81 is a schematic top view of the conveyance device according to the fifth embodiment.
Figure 82:
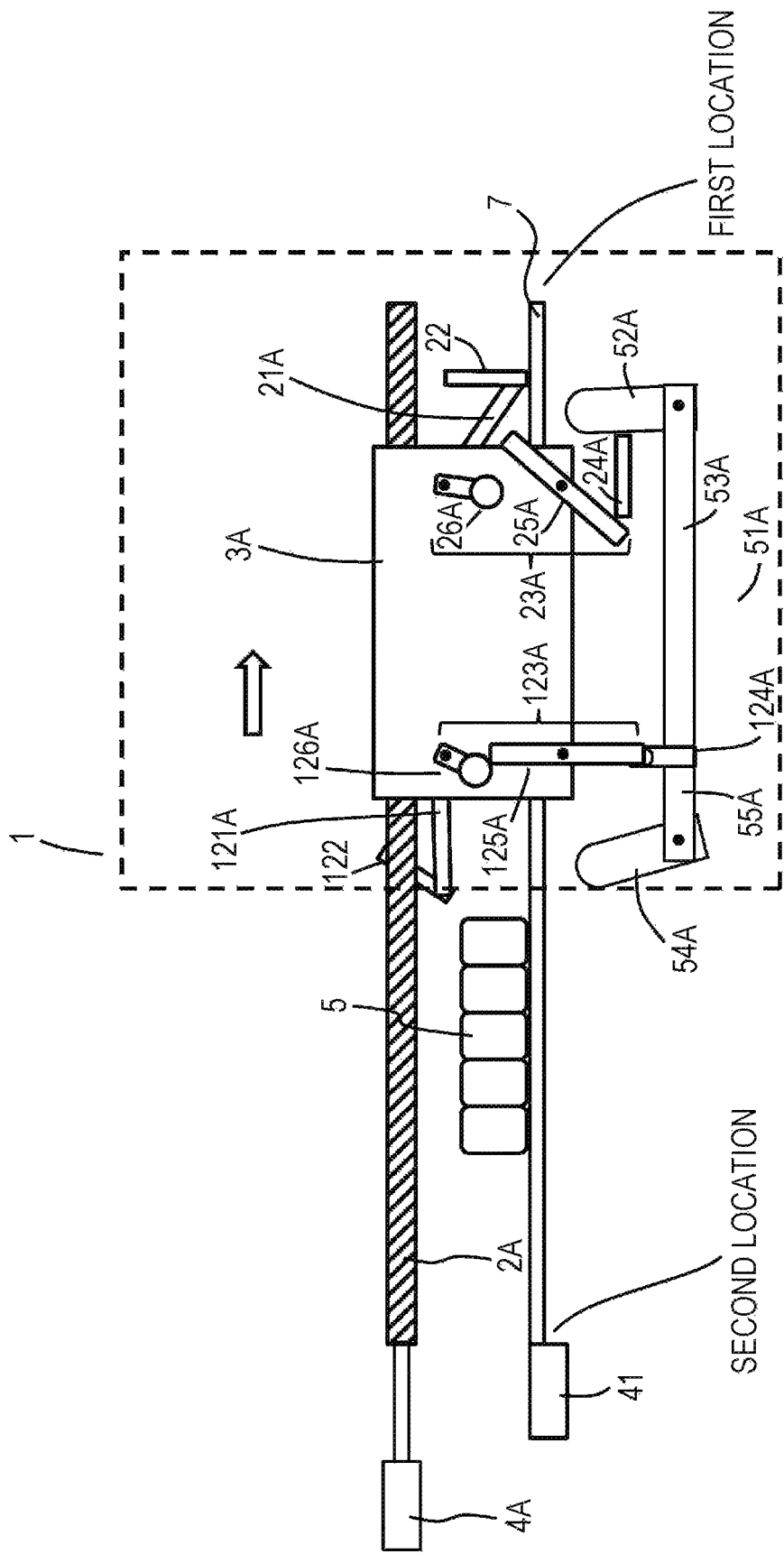
FIG. 82 is a schematic side view of the conveyance device according to the fifth embodiment.
Figure 83:
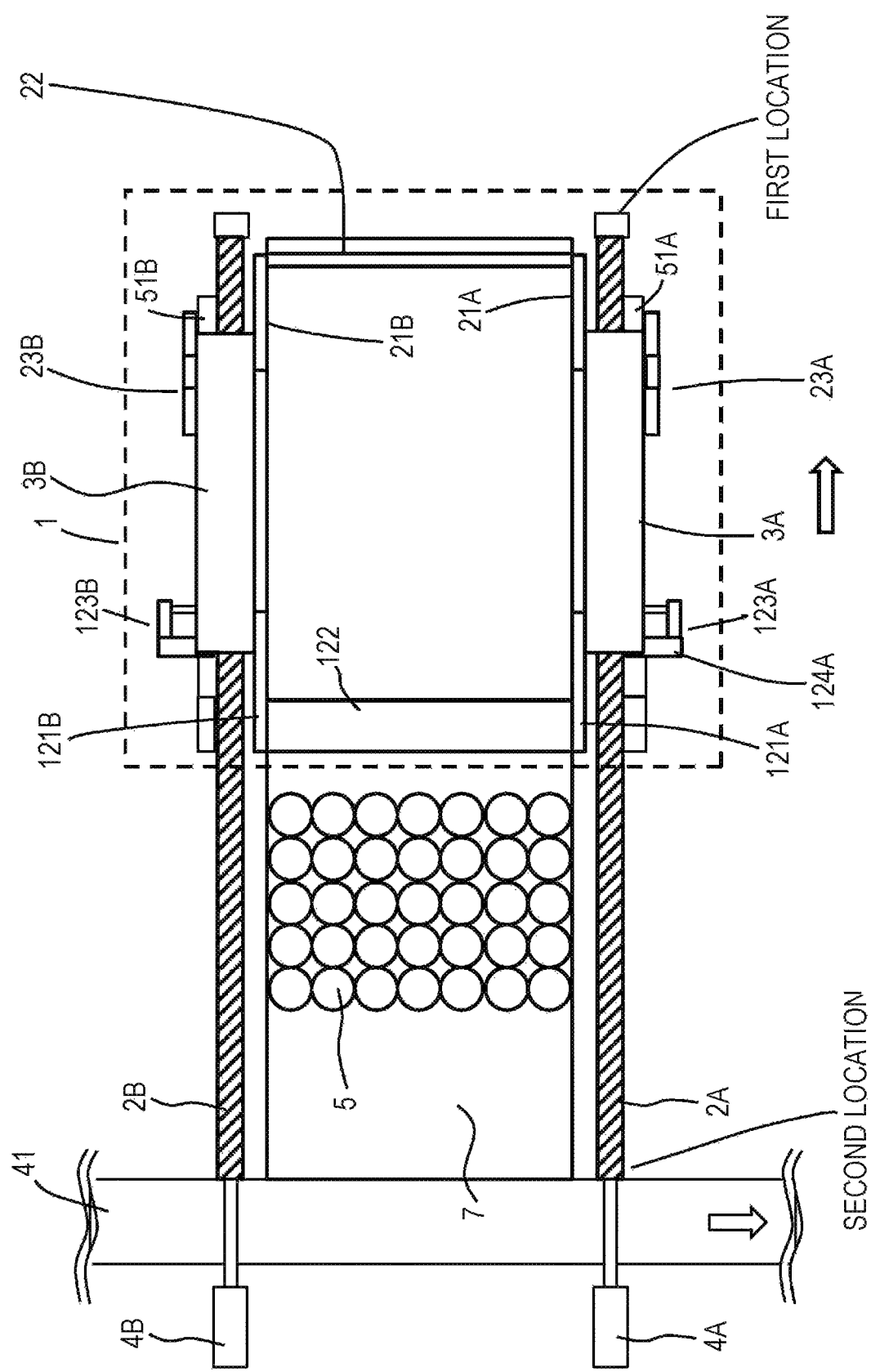
FIG. 83 is a schematic top view of the conveyance device according to the fifth embodiment.
Figure 84:
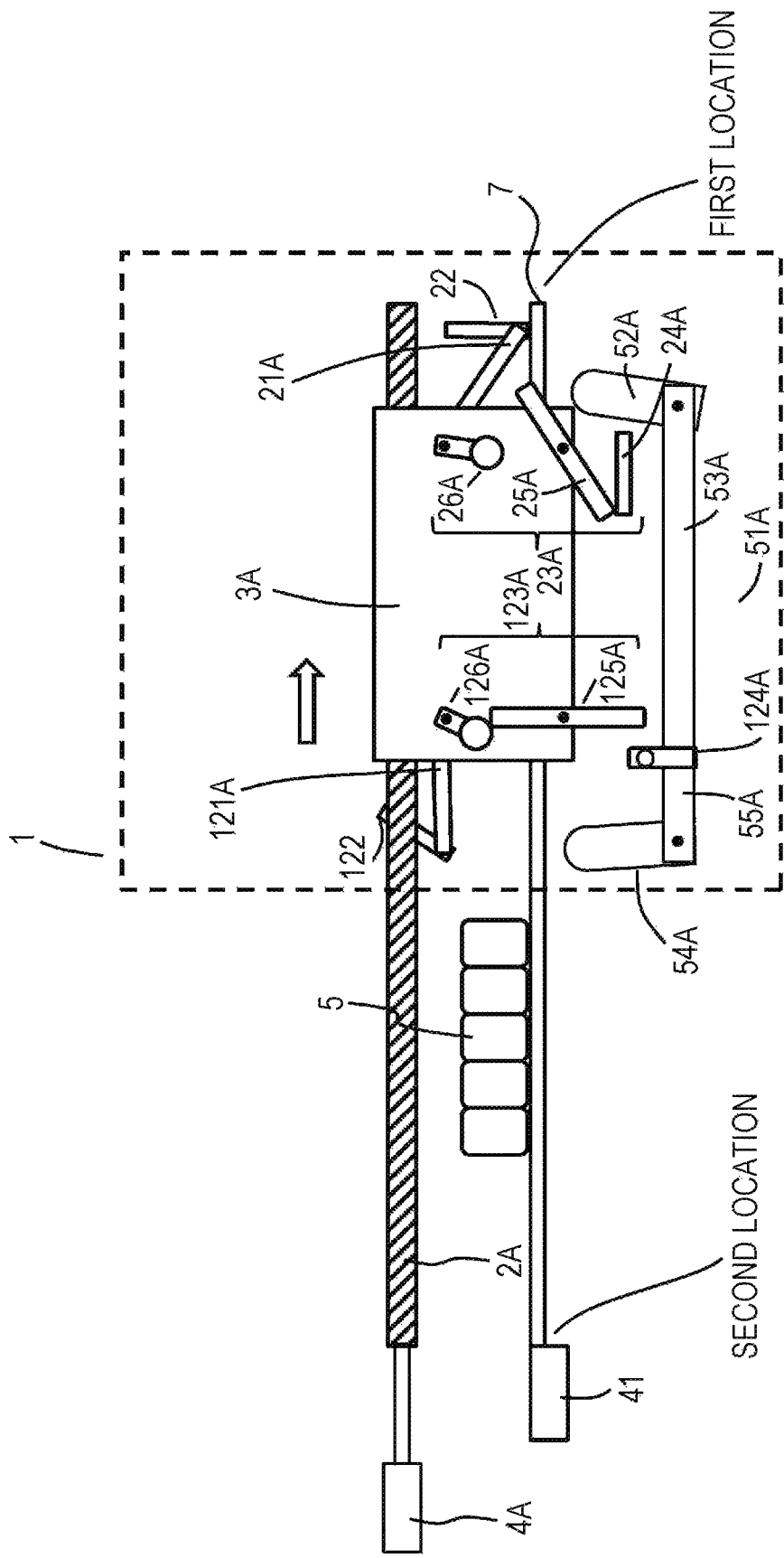
FIG. 84 is a schematic side view of the conveyance device according to the fifth embodiment.

In such a case, as illustrated in FIG. 81 and FIG. 82, the moving members 3A and 3B move again in the direction toward the first location at the back portion of the chamber 1. As illustrated in FIG. 83 and FIG. 84, the moving members 3A and 3B move until the second inhibiting mechanisms 123A and 123B are positioned on the side of the first location with respect to the second dogs 124A and 124B. Here, the moving member 3A comes into contact with the first contact link 52A of the dog holding member 51A. The first contact link 52A pushed by the moving member 3A moves the first follower link 53A in the direction toward the second location. Consequently, the second dog 124A moves onto the path of the second inhibiting mechanism 123A. The same is true of the moving member 3B, the dog holding member 51B, and the second dog 124B.

Figure 85:
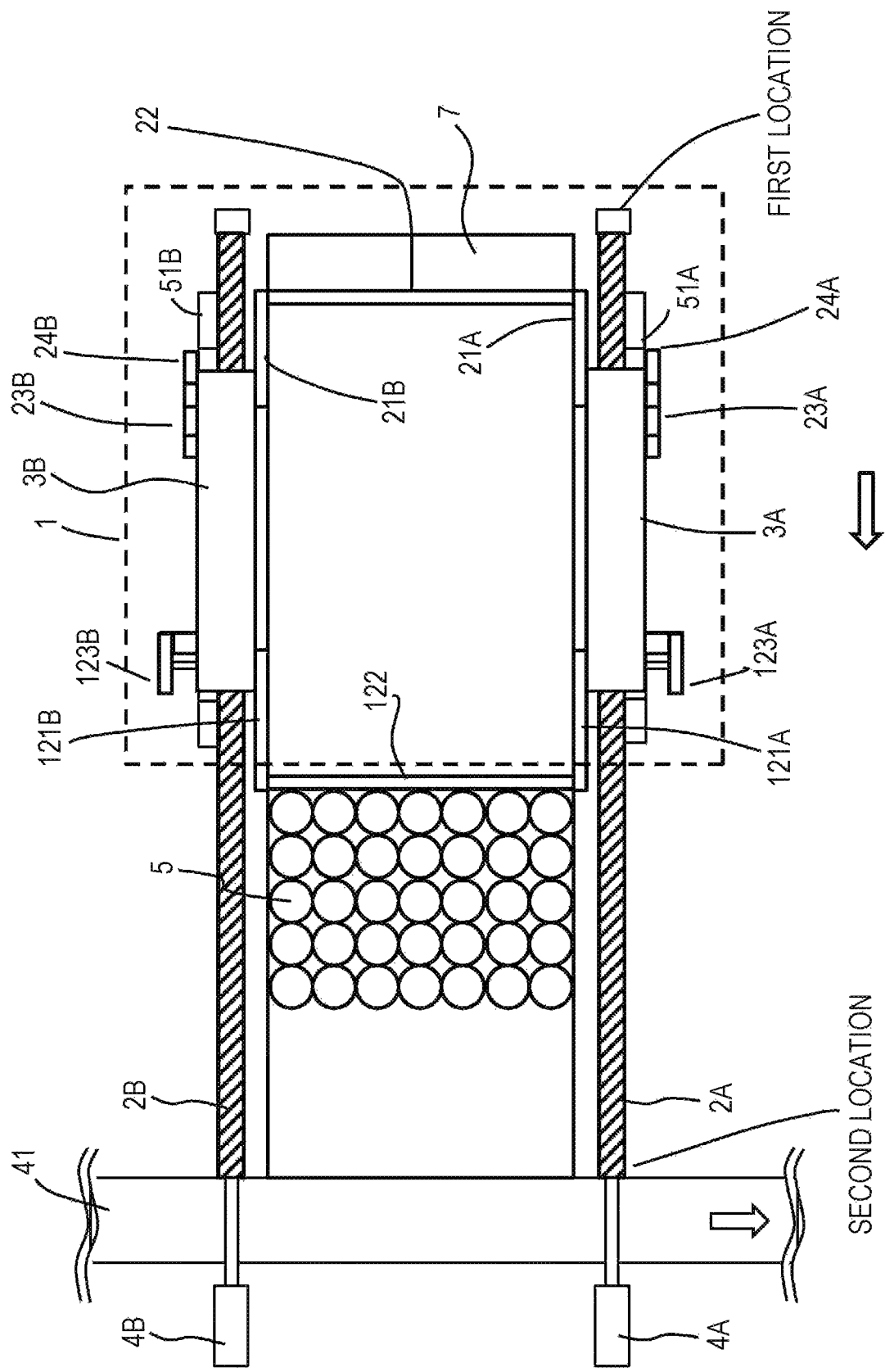
FIG. 85 is a schematic top view of the conveyance device according to the fifth embodiment.
Figure 86:
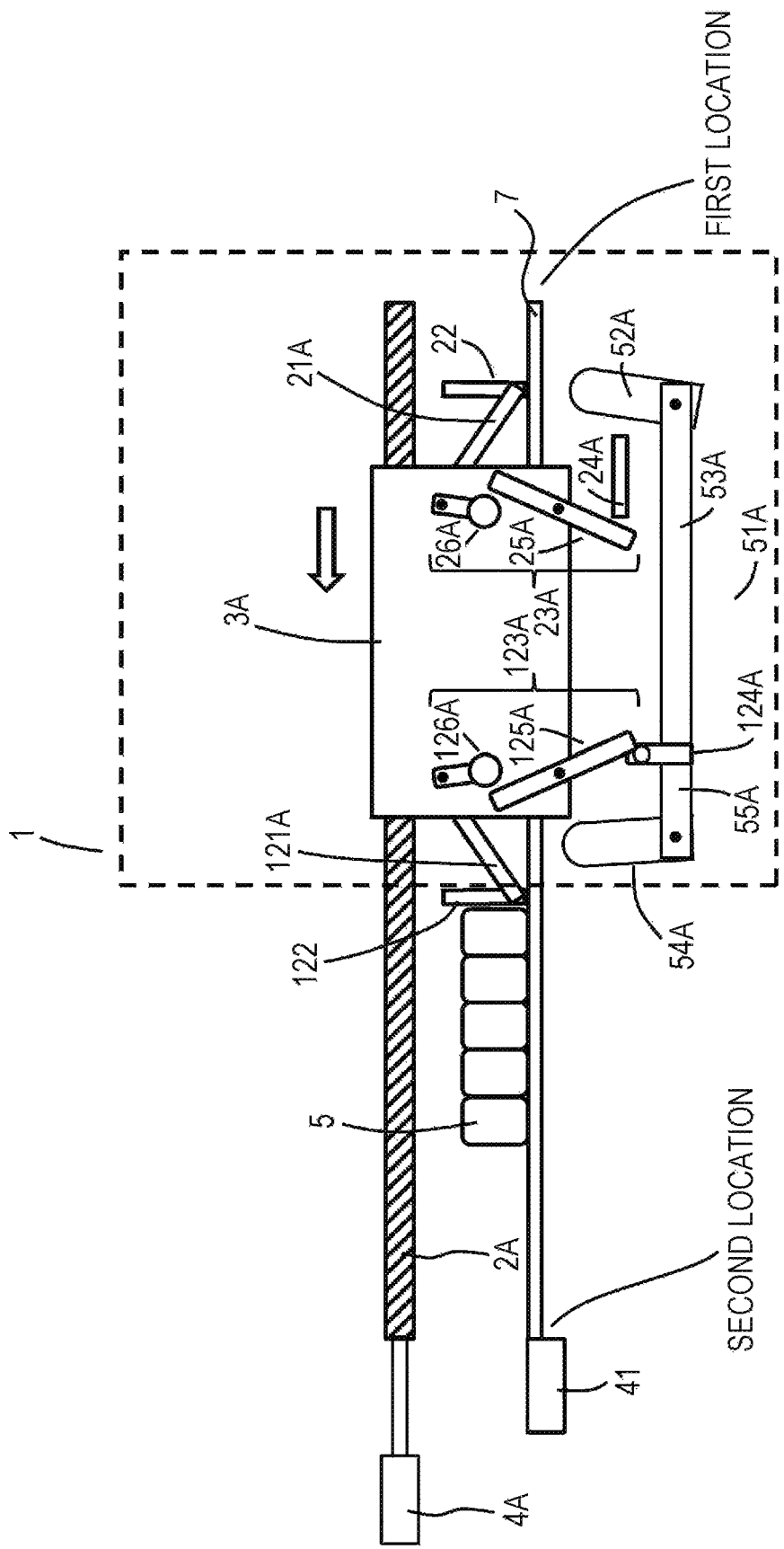
FIG. 86 is a schematic side view of the conveyance device according to the fifth embodiment.

Next, as illustrated in FIG. 85 and FIG. 86, when the moving members 3A and 3B move in the direction toward the second location outside the chamber 1, the second dog 124A pushes and rotates the first rotary member 125A of the second inhibiting mechanism 123A to deactivate the second inhibiting mechanism 123A. The same is true of the second inhibiting mechanism 123B. Consequently, inhibition of the rotation of the second shafts 121A and 121B is deactivated, and the second contact member 122 descends together with the second shafts 121A and 121B toward the table 7.

Figure 87:
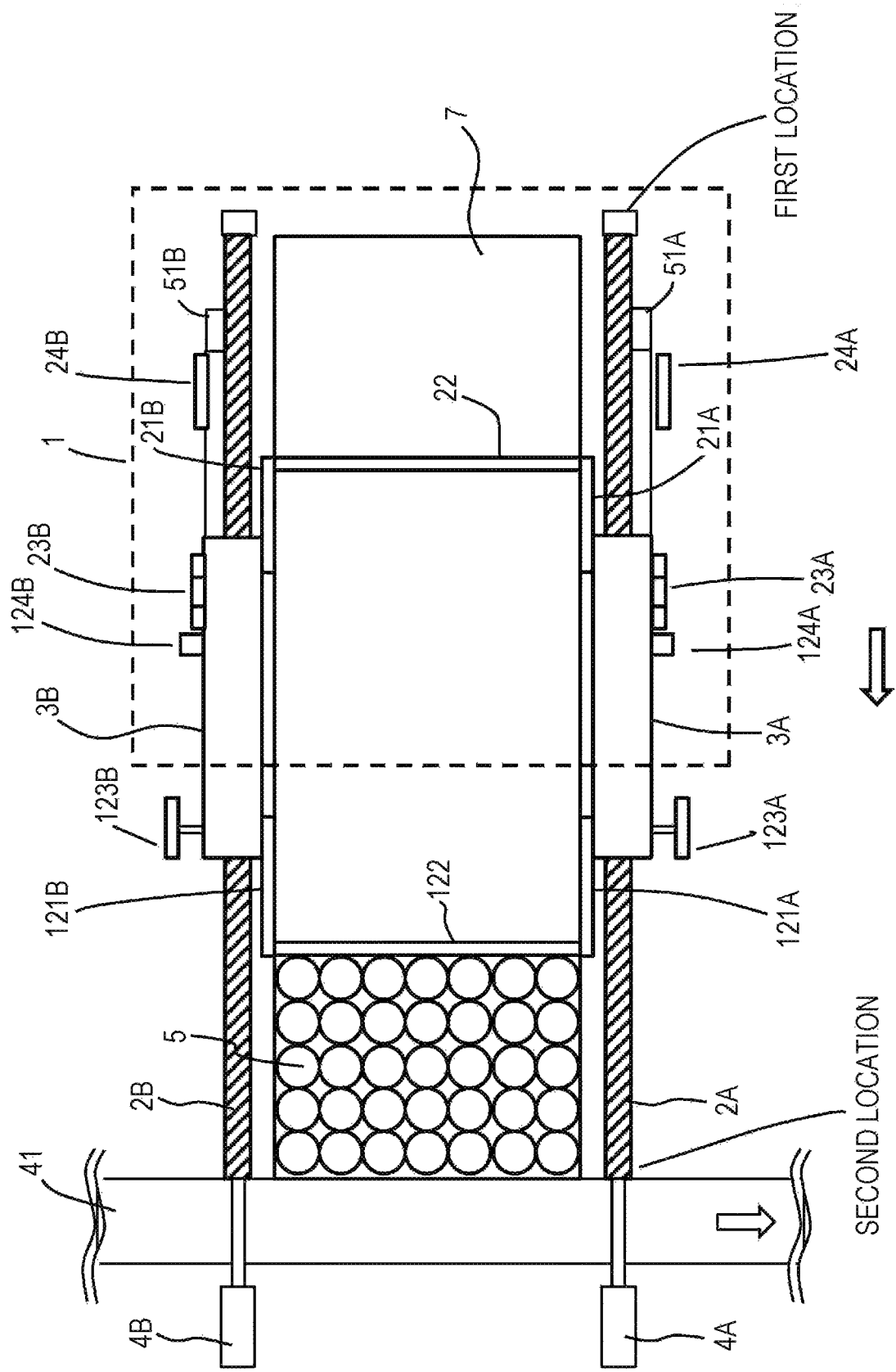
FIG. 87 is a schematic top view of the conveyance device according to the fifth embodiment.
Figure 88:
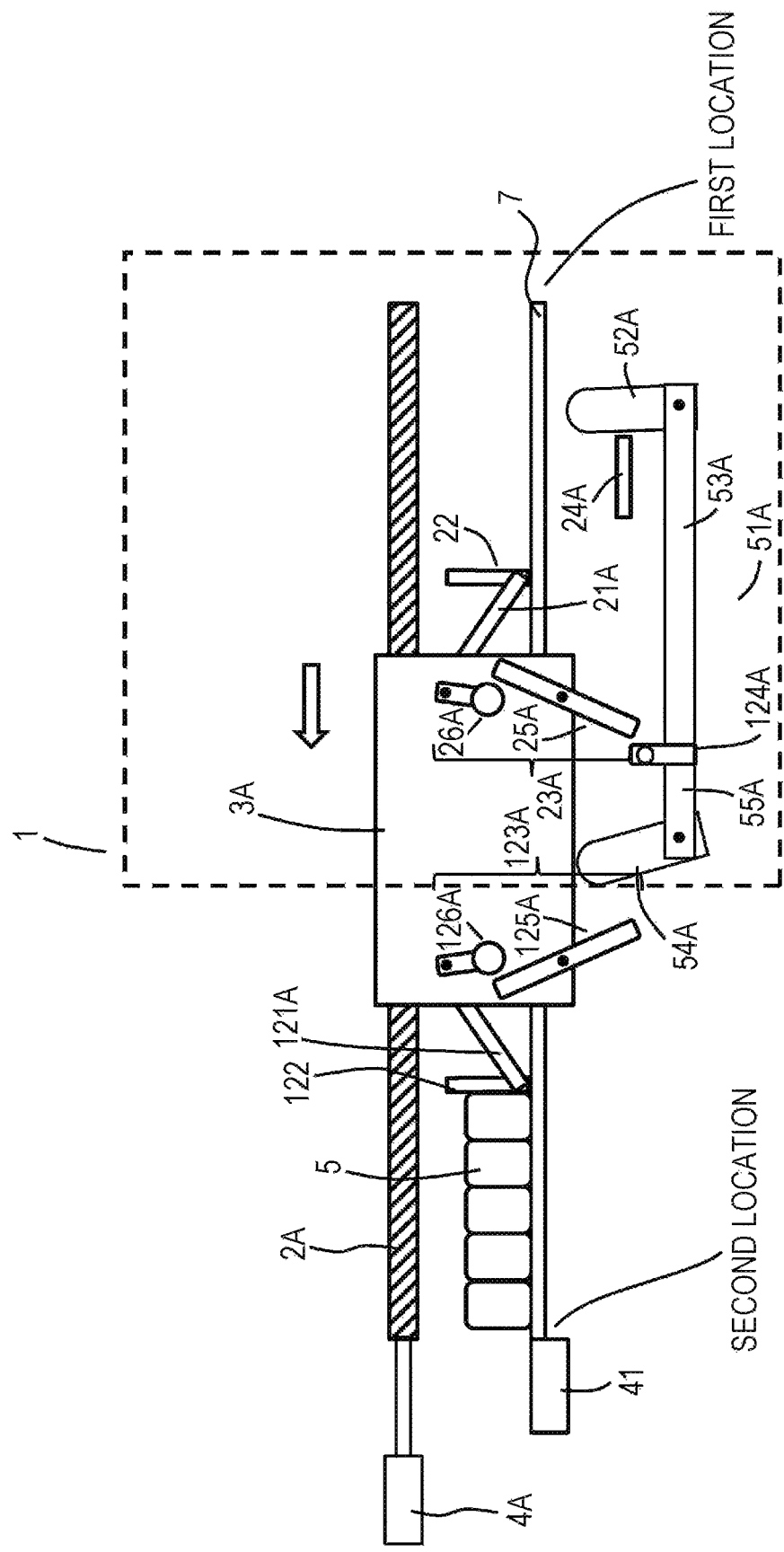
FIG. 88 is a schematic side view of the conveyance device according to the fifth embodiment.

As illustrated in FIG. 87 and FIG. 88, after the second contact member 122 descends, the moving members 3A and 3B move in the direction toward the second location outside the chamber 1 to push the article 5 by using the second contact member 122, thereby moving the article 5 in the direction toward the second location. The moving member 3A comes into contact with the second contact link 54A. The second contact link 54A pushed by the moving member 3A moves the second follower link 55A in the direction toward the first location to move the second dog 124A away from the path of the second inhibiting mechanism 123A. The same is true of the moving member 3B, the dog holding member 51B, and the second dog 124B.

Figure 89:
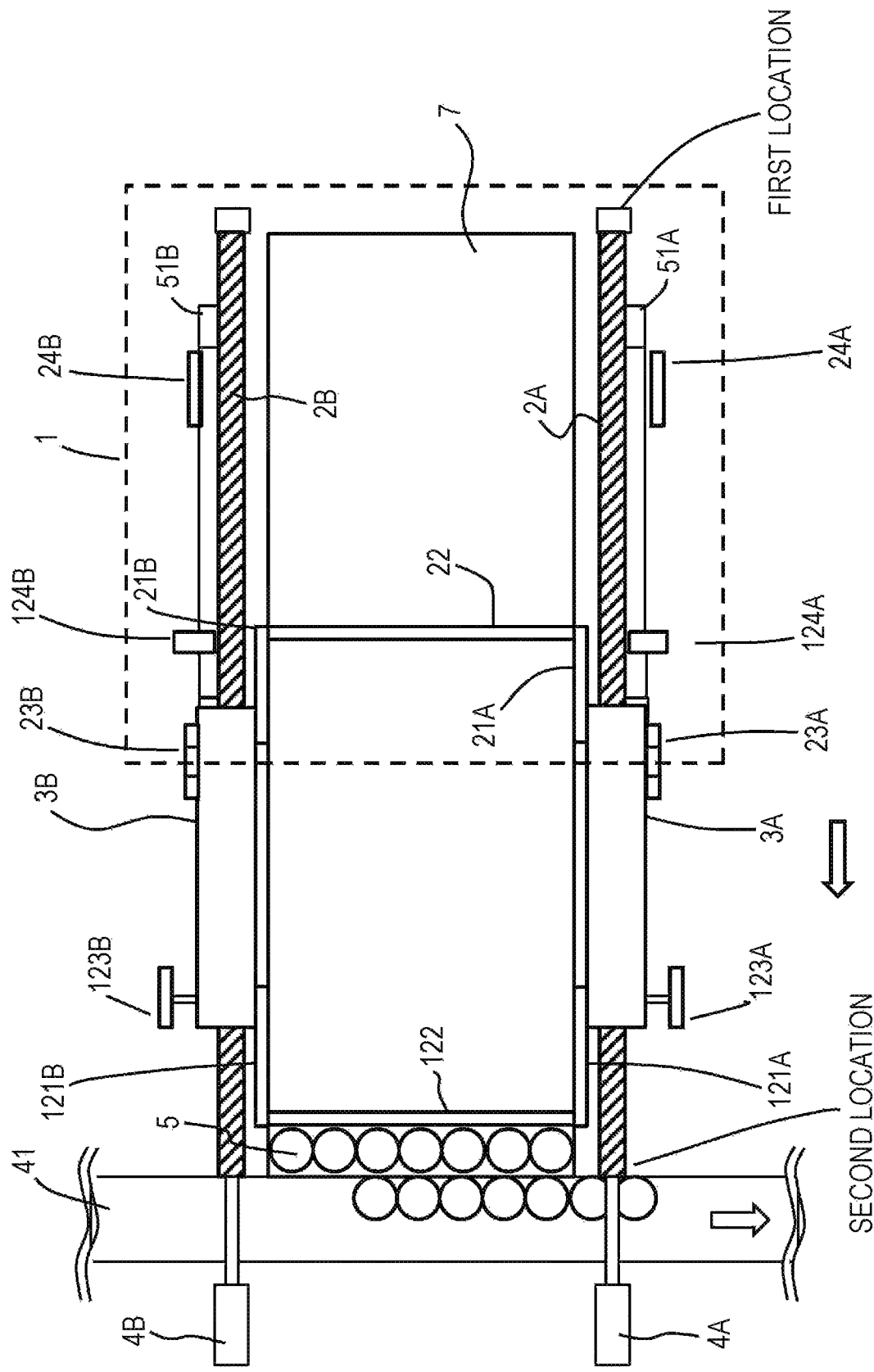
FIG. 89 is a schematic top view of the conveyance device according to the fifth embodiment.
Figure 90:
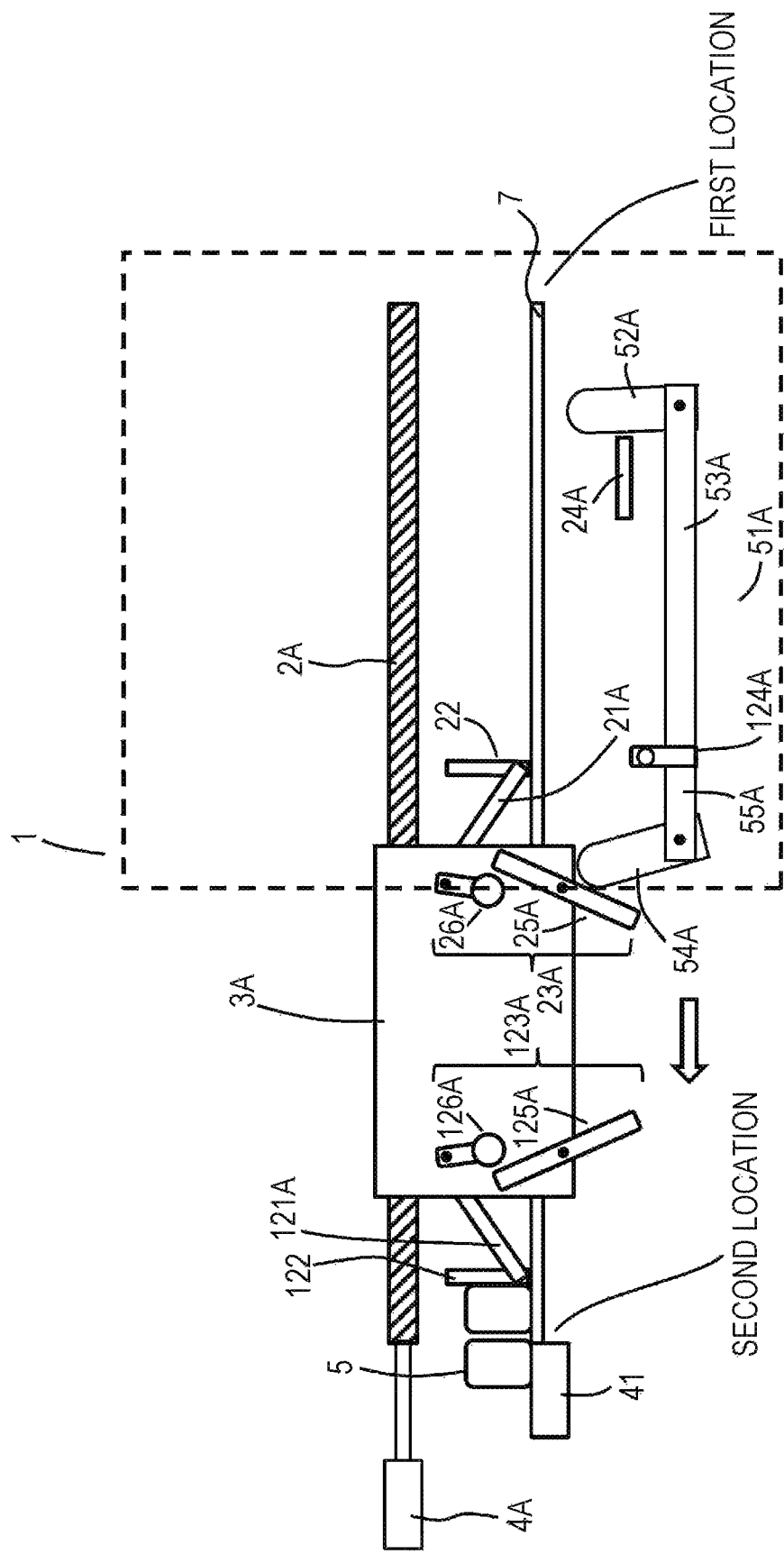
FIG. 90 is a schematic side view of the conveyance device according to the fifth embodiment.

As illustrated in FIG. 89 and FIG. 90, the second contact member 122 is connected to the moving members 3A and 3B on the side of the second location and is thus capable of moving the article 5 that is on the table 7 onto the conveyor 41 disposed on the side of the second location so as to be adjacent to the table 7.

OTHER EMBODIMENTS

Embodiments of the present invention have been described above; however, the wording and the drawings constituting part of the present disclosure should not be considered to limit the present invention. Various alternative embodiments, examples, and operational techniques will be apparent, from the present disclosure, to a person skilled in the art.

Figure 91:
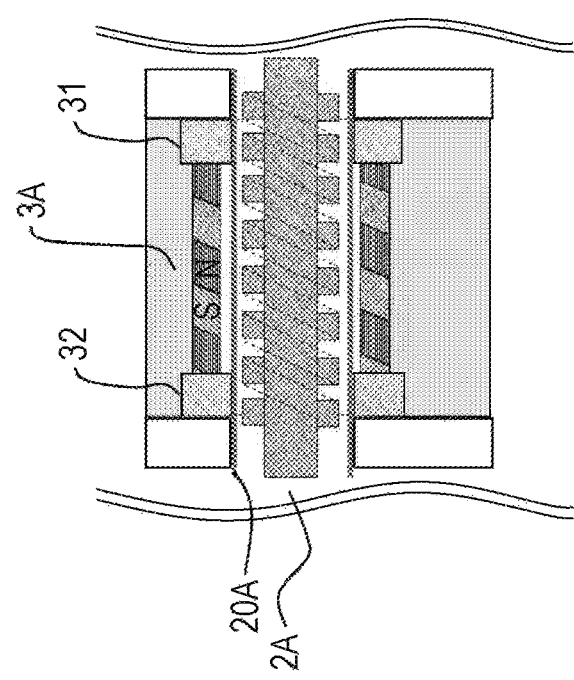
FIG. 91 is a schematic view of a bar-shaped member and a moving member according to another embodiment.

For example, the configurations of the bar-shaped member 2A and the moving member 3A are not limited to those in the example illustrated in FIG. 9. For example, as illustrated in FIG. 91, the bar-shaped member 2A may be a soft magnetic body including thread ridges. The configuration of the moving member 3A is identical to that in FIG. 9. The pitch of the thread ridges of the bar-shaped member 2A, illustrated in FIG. 91, is substantially identical to the pitch of the magnetized zones of the moving member 3A. The bar-shaped member 2A including the thread ridges may be inserted into the non-magnetized thin-walled pipe 20A. Consequently, it is possible to prevent a foreign material from adhering to thread grooves of the bar-shaped member 2A. When the bar-shaped member 2A is rotated, a magnetic force acts between the thread ridges of the bar-shaped member 2A and the magnetized zones of the moving member 3A, and the moving member 3A moves.

Figure 92:
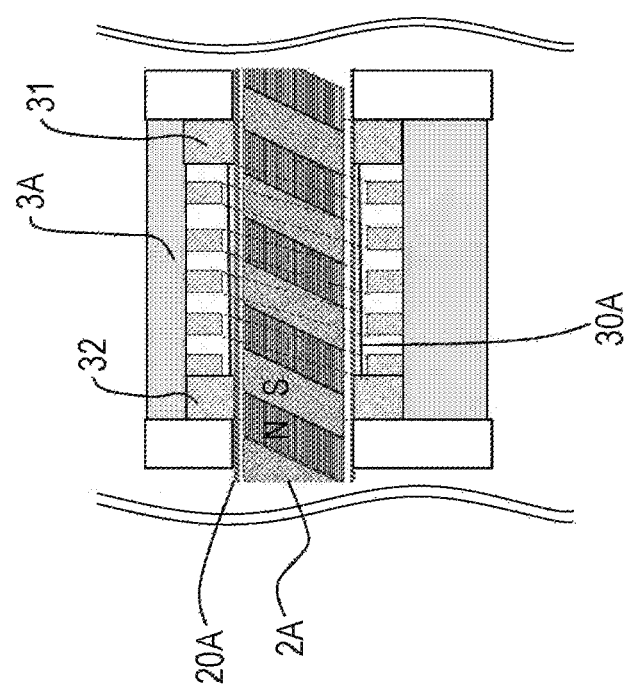
FIG. 92 is a schematic view of a bar-shaped member and a moving member according to another embodiment.

Alternatively, as illustrated in FIG. 92, the moving member 3A may be a soft magnetic body that includes thread ridges. The surface of the hole at which the thread ridges of the moving member 3A are provided may be covered with a non-magnetized thin-walled pipe 30A. Consequently, it is possible to prevent a foreign material to adhere to thread grooves of the moving member 3A. The configuration of the bar-shaped member 2A is identical to that in FIG. 9. The pitch of thread ridges of the moving member 3A, illustrated in FIG. 92, is substantially identical to the pitch of the magnetized zones of the bar-shaped member 2A. When the bar-shaped member 2A is rotated, a magnetic force acts between the magnetized zones of the bar-shaped member 2A and the thread ridges of the moving member 3A, and the moving member 3A moves.

In addition, for example, contents of the article to be conveyed to the inside and outside of the chamber are not limited to medicine and may be food, beverages, precision parts, or the like; examples of the article include any other articles. In addition, the chamber is not limited to the freeze-drying chamber and may be a fermentation chamber; alternatively, examples of the chamber include any chambers for which suppression of unevenness in internal temperature distribution and suppression of dust generation are desired. Moreover, the shape of each moving member is not limited to the nut shape and may be, for example, a concave shape. In this case, the bar-shaped member passes through a concave portion of the concave-shaped moving member. The S-pole magnetized zone and the N-pole magnetized zone are alternately provided on a side surface of the concave portion of the concave-shaped moving member. The mechanism that moves the moving members is not limited to the magnetic screw. The mechanism that moves the moving members may be a linear motor or a linear-motion motor.

After conveying-out of the article 5 is completed, as illustrated in FIG. 29, the shafts 21A and 121A and the contact member 22 may be lifted to a predetermined height, as illustrated in FIG. 11, with a robotic arm or with a hand of an operator, and the rotation of the shafts 21A and 121A may be inhibited by the inhibiting mechanisms 23A and 123A.

Figure 93:
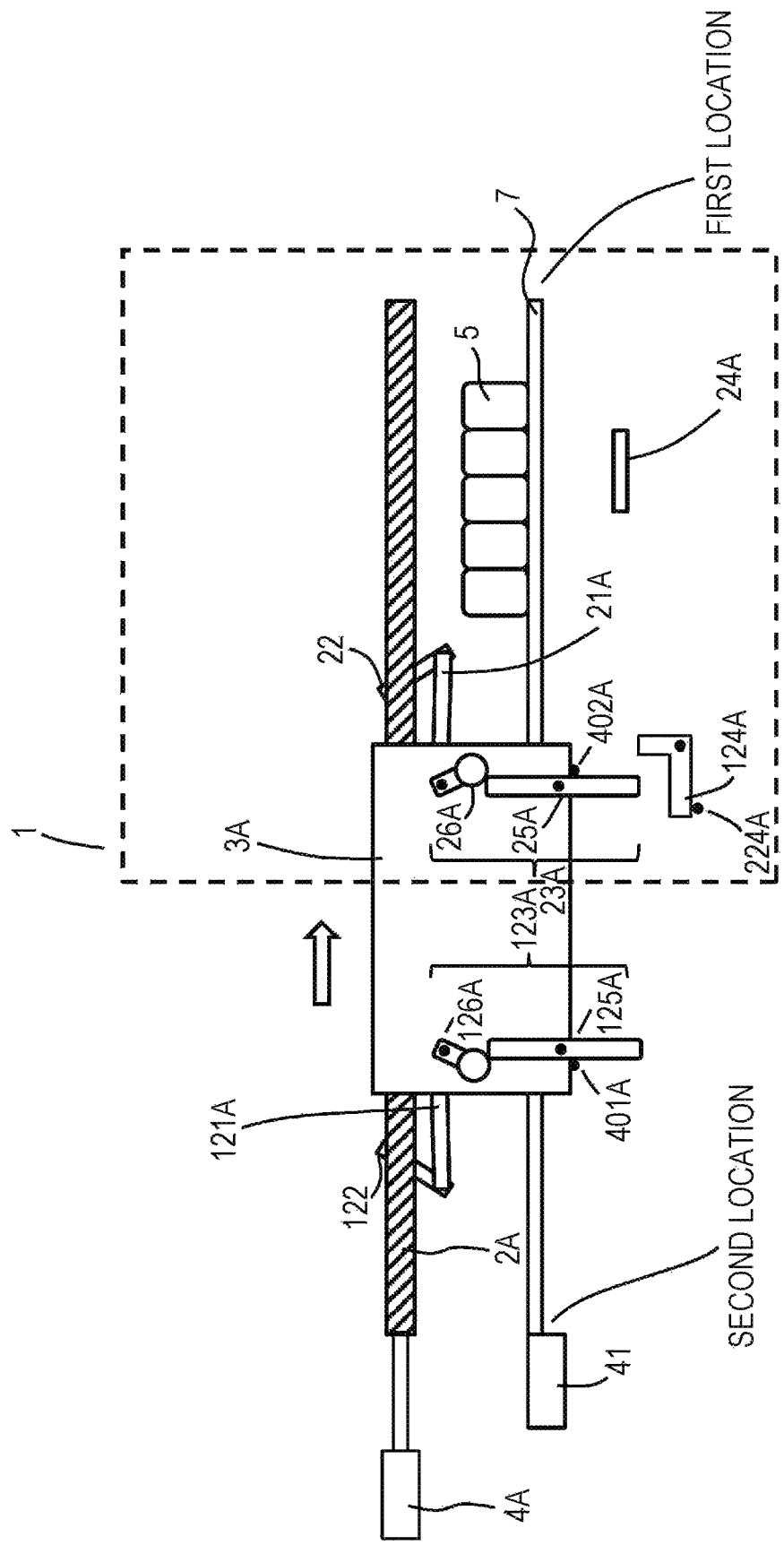
FIG. 93 is a schematic side view of a conveyance device according to another embodiment.

Alternatively, when the centroid of each of the first rotary members 25A and 125A is set below the rotating shaft of each of the first rotary members 25A and 125A, a moment is applied to the first rotary members 25A and 125A such that the first rotary members 25A and 125A return to be disposed parallel to the gravitational direction, as illustrated in FIG. 11. In this case, when only the shafts 21A and 121A are lifted, each of the first rotary members 25A and 125A naturally returns to a location where the rotation of the shafts 21A and 121A is inhibited. As illustrated in FIG. 93, rotation-angle regulating members 401A and 402A may be disposed to suppress the first rotary members 25A and 125A from excessively rotating when returning to be disposed parallel to the gravitational direction.

Figure 94:
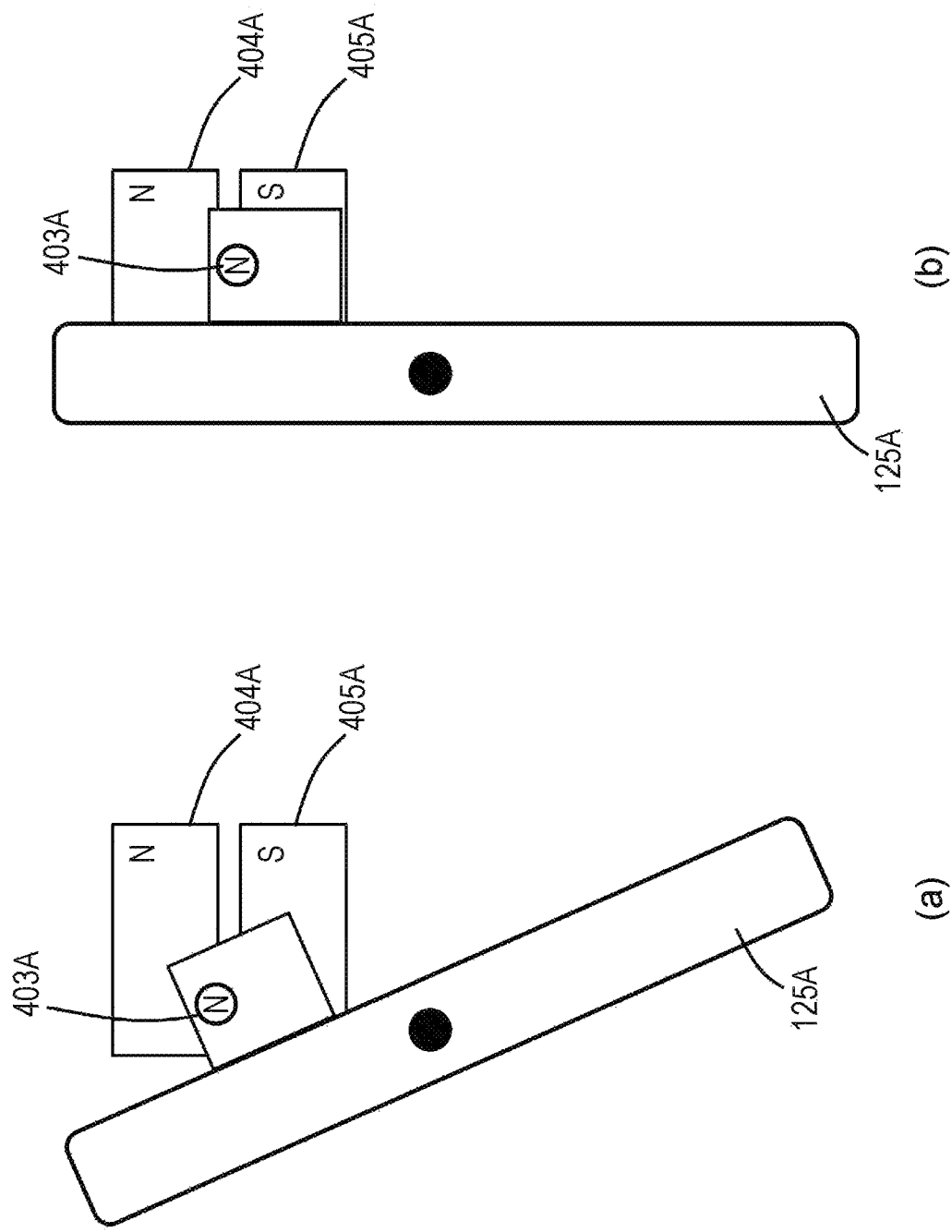
FIG. 94 is a schematic side view of a rotary member according to another embodiment.

Further alternatively, as illustrated in FIG. 94, a projecting portion may be provided on a side surface of a first rotary member 125A, and the projecting portion may be provided with a magnet 403A. In addition, a first magnet 404A that has polarity identical to that of the magnet 403A, and a second magnet 405A having polarity opposite to that of the magnet 403A may be provided on a side surface of the moving member 3A. Here, as illustrated in FIG. 94(a), when the first rotary member 125A is inclined and the shaft 121A is lowered, the magnet 403A is close to the first magnet 404A having identical polarity. Thus, due to the repulsive force between the magnets having identical polarity, the first rotary member 125A attempts to return to be disposed parallel to gravity. The magnetic force is not capable of lifting the weight of the shaft 121A and the like; however, when the shaft 121A is lifted, the first rotary member 125A returns to be disposed parallel to gravity, as illustrated in FIG. 94(b), due to the repulsive force between the magnets having identical polarity. At this time, the attractive force between the magnet 403A and the second magnet 405A supports the first rotary member 125A to return to be disposed parallel to gravity.

Figure 95:
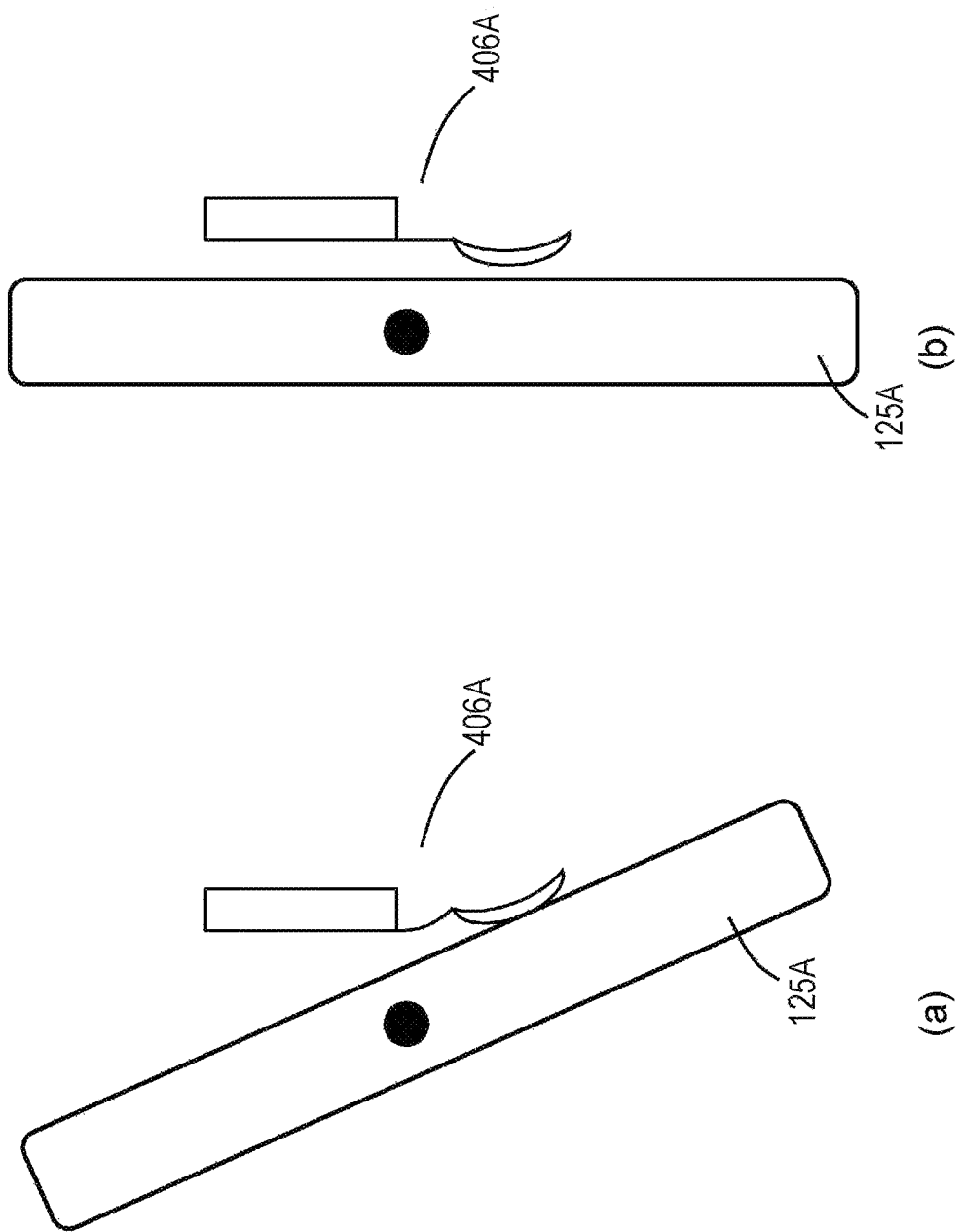
FIG. 95 is a schematic side view of a rotary member according to another embodiment.

Further alternatively, as illustrated in FIG. 95, an elastic member 406A, such as a plate spring, may be disposed on a side surface of the moving member 3A. Here, as illustrated in FIG. 95(a), when the first rotary member 125A is inclined and the shaft 121A is lowered, the first rotary member 125A is in contact with the elastic member 406A. Thus, due to a force from the elastic member 406A, the first rotary member 125A attempts to return to be disposed parallel to gravity. The force from the elastic member 406A is not capable of lifting the weight of the shaft 121A and the like; however, when the shaft 121A is lifted, the first rotary member 125A returns to be disposed parallel to gravity, as illustrated in FIG. 95(b), due to the force from the elastic member 406A.

Thus, it should be understood that the present invention includes various embodiments and the like not described herein.

REFERENCE SIGNS LIST 1 chamber
2A, 2B bar-shaped member
3A, 3B moving member
4A, 4B driving unit
5 article
7 table
20A, 30A thin-walled pipe
21A, 21B, 121A, 121B shaft
22, 122 contact member
23A, 239, 123A, 123B inhibiting mechanism
24A, 24B, 124A, 124B dog
25A, 125A first rotary member
26A, 126A second rotary member
27A rotation-angle regulating member
31 guide ring
41 conveyor
42A, 42B, 43A, 43B, 51A, 51B dog holding member
44A second link
45A first link
52A first contact link
53A first follower link
54A second contact link
55A second follower link
142A, 143A, 144A, 224A rotation constraining member
242A, 244A, 245A horizontal shaft portion
342A, 344A, 345A, 442A contact portion

The invention claimed is:

1. A conveyance device, comprising:
a moving member that moves at least in a first direction along a table for disposing an article thereon, the table ending at an end position in the first direction;
a shaft that is rotatably connected to the moving member;
a contact member configured to come into contact with the article, the contact member being connected to the shaft;
an inhibiting mechanism that inhibits rotation of the shaft so that the contact member is held above the article, the inhibiting mechanism being disposed on the moving member; and
a dog that comes into contact due to movement of the inhibiting mechanism in the first direction, at a predetermined location, with the inhibiting mechanism to deactivate inhibition of rotation of the shaft by the inhibiting mechanism, thereby lowering the contact member toward the table, the predetermined location being located before the end position of the table in the first direction.

2. The conveyance device according to claim 1, wherein the shaft for which the inhibition of the rotation by the inhibiting mechanism is deactivated rotates due to gravity applied to the shaft and to the contact member.

3. The conveyance device according to claim 1,
wherein the moving member moves between a first location and a second location, and
wherein the dog deactivates the inhibiting mechanism when the moving member moves toward the first location.

4. The conveyance device according to claim 1,
wherein the moving member moves between a first location and a second location, and
wherein the dog does not deactivate the inhibiting mechanism when the moving member moves toward the first location, and the dog deactivates the inhibiting mechanism when the moving member moves toward the second location.

5. The conveyance device according to claim 4,
wherein, when the moving member moves toward the first location, the dog is pushed by the inhibiting mechanism and rotates, and
wherein, when the moving member moves toward the second location, rotation of the dog is suppressed, and the dog pushes the inhibiting mechanism to deactivate the inhibiting mechanism.

6. The conveyance device according to claim 4, further comprising:
a dog holding member that holds the dog,
wherein, when the moving member comes into contact with a portion of the dog holding member on a side of the second location, the dog moves to a location where deactivation of the inhibiting mechanism is not possible, and
wherein, when the moving member comes into contact with a portion of the dog holding member on a side of the first location, the dog moves to a location where deactivation of the inhibiting mechanism is possible.

7. The conveyance device according to claim 4, further comprising:
a dog holding member that holds the dog,
wherein the dog holding member is rotatable,
wherein the dog holding member holds the dog on a side of the second location with respect to a rotating shaft of the dog holding member,
wherein, when the moving member comes into contact with a portion of the dog holding member on a side of the second location, the dog holding member descends on the side of the second location, and the dog does not deactivate the inhibiting mechanism, and
wherein, when the moving member comes into contact with a portion of the dog holding member on a side of the first location, the dog holding member ascends on the side of the second location, and the dog deactivates the inhibiting mechanism.

8. The conveyance device according to claim 4, further comprising:
a dog holding member that holds the dog,
wherein the dog holding member includes
a first link that is disposed on a side of the first location and is configured to come into contact with the moving member, and
a second link that is disposed on a side of the second location and is configured to come into contact with the moving member, the second link being connected to the first link with a movable pin,
wherein, when the moving member comes into contact with the second link, the dog descends, and the dog does not deactivate the inhibiting mechanism, and
wherein, when the moving member comes into contact with the first link, the dog ascends, and the dog deactivates the inhibiting mechanism.

9. The conveyance device according to claim 4, further comprising:
a dog holding member that holds the dog,
wherein the dog holding member includes
a first contact link that is disposed on a side of the first location and that comes into contact with the moving member to receive a force,
a first follower link that is connected to the first contact link with a movable pin and that receives a force toward the second location,
a second contact link that is disposed on a side of the second location and that comes into contact with the moving member to receive a force, and
a second follower link that is connected to the second contact link with a movable pin and that receives a force toward the first location,
wherein the dog is pushed by the second follower link and moves, due to an orthogonal slide mechanism, to a location where deactivation of the inhibiting mechanism is not possible, and
wherein the dog is pushed by the first follower link and moves, due to an orthogonal slide mechanism, to a location where deactivation of the inhibiting mechanism is possible.

10. The conveyance device according to claim 1, wherein, when the shaft is lifted to a predetermined location, the inhibiting mechanism inhibits rotation of the shaft.

11. A conveyance device, comprising:
a moving member that moves along a table for disposing an article thereon;
a shaft that is rotatably connected to the moving member;
a contact member configured to come into contact with the article, the contact member being connected to the shaft;
an inhibiting mechanism that inhibits rotation of the shaft so that the contact member is held above the article, the inhibiting mechanism being disposed at the moving member; and
a dog that comes into contact, at a predetermined location, with the inhibiting mechanism to deactivate inhibition of rotation of the shaft by the inhibiting mechanism, thereby lowering the contact member toward the table,
wherein the moving member moves between a first location and a second location,
the dog does not deactivate the inhibiting mechanism when the moving member moves toward the first location, and the dog deactivates the inhibiting mechanism when the moving member moves toward the second location,
when the moving member moves toward the first location, the dog is pushed by the inhibiting mechanism and rotates, and
when the moving member moves toward the second location, rotation of the dog is suppressed, and the dog pushes the inhibiting mechanism to deactivate the inhibiting mechanism.

12. A conveyance device, comprising:
a moving member that moves along a table for disposing an article thereon;
a shaft that is rotatably connected to the moving member;
a contact member configured to come into contact with the article, the contact member being connected to the shaft;
an inhibiting mechanism that inhibits rotation of the shaft so that the contact member is held above the article, the inhibiting mechanism being disposed at the moving member; and
a dog that comes into contact, at a predetermined location, with the inhibiting mechanism to deactivate inhibition of rotation of the shaft by the inhibiting mechanism, thereby lowering the contact member toward the table,
wherein the moving member moves between a first location and a second location,
the dog does not deactivate the inhibiting mechanism when the moving member moves toward the first location, and the dog deactivates the inhibiting mechanism when the moving member moves toward the second location,
the conveyance device further includes a dog holding member that holds the dog,
when the moving member comes into contact with a portion of the dog holding member on a side of the second location, the dog moves to a location where deactivation of the inhibiting mechanism is not possible, and
when the moving member comes into contact with a portion of the dog holding member on a side of the first location, the dog moves to a location where deactivation of the inhibiting mechanism is possible.

* * * * *